(12) United States Patent
Oh et al.

(10) Patent No.: US 11,558,597 B2
(45) Date of Patent: Jan. 17, 2023

(54) METHOD FOR TRANSMITTING VIDEO, APPARATUS FOR TRANSMITTING VIDEO, METHOD FOR RECEIVING VIDEO, AND APPARATUS FOR RECEIVING VIDEO

(71) Applicant: LG Electronics Inc., Seoul (KR)

(72) Inventors: Hyunmook Oh, Seoul (KR); Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 4 days.

(21) Appl. No.: 17/268,338

(22) PCT Filed: Aug. 12, 2019

(86) PCT No.: PCT/KR2019/010222
§ 371 (c)(1),
(2) Date: Feb. 12, 2021

(87) PCT Pub. No.: WO2020/036389
PCT Pub. Date: Feb. 20, 2020

(65) Prior Publication Data
US 2021/0329216 A1    Oct. 21, 2021

Related U.S. Application Data

(60) Provisional application No. 62/718,323, filed on Aug. 13, 2018.

(51) Int. Cl.
*H04N 13/194* (2018.01)
*H04N 13/156* (2018.01)
(Continued)

(52) U.S. Cl.
CPC ......... *H04N 13/194* (2018.05); *H04N 13/111* (2018.05); *H04N 13/122* (2018.05);
(Continued)

(58) Field of Classification Search
CPC .. H04N 13/194; H04N 13/122; H04N 13/161; H04N 13/156; H04N 13/178; H04N 13/111
(Continued)

(56) References Cited

U.S. PATENT DOCUMENTS

| | | | |
|---|---|---|---|
| RE47,897 E * | 3/2020 | Park | H04N 13/161 |
| 2010/0245372 A1* | 9/2010 | Gedik | H04N 13/111 |
| | | | 345/581 |

(Continued)

FOREIGN PATENT DOCUMENTS

KR      1020140035065      3/2014

OTHER PUBLICATIONS

PCT International Search Report and Written Opinion in International Appln. No. PCT/KR2019/010222, dated Dec. 6, 2019, 12 pages.

*Primary Examiner* — Thai Q Tran
*Assistant Examiner* — Stephen R Smith
(74) *Attorney, Agent, or Firm* — Fish & Richardson P.C.

(57) ABSTRACT

An apparatus for receiving a video according to embodiments of the present invention comprises a decoder configured to decode bitstream based on viewing position and viewport information; an unpacker configured to unpack pictures in the decoded bitstream; a view regenerator configured to perform view regenerating the unpacked pictures; and a view synthesizer configured to perform view synthesis on the view regenerated pictures. A method of transmitting a video, the method comprising inter-view redundancy removing pictures for multiple viewing positions; packing the inter-view redundancy removed pictures; and encoding the packed pictures and signaling information.

20 Claims, 32 Drawing Sheets

(51) Int. Cl.
   *H04N 13/178* (2018.01)
   *H04N 13/122* (2018.01)
   *H04N 13/161* (2018.01)
   *H04N 13/111* (2018.01)
(52) U.S. Cl.
   CPC ......... *H04N 13/156* (2018.05); *H04N 13/161* (2018.05); *H04N 13/178* (2018.05)
(58) Field of Classification Search
   USPC ..................................... 375/240.01; 345/419
   See application file for complete search history.

(56) References Cited

U.S. PATENT DOCUMENTS

| | | | | |
|---|---|---|---|---|
| 2011/0261050 | A1* | 10/2011 | Smolic | H04N 19/597 345/419 |
| 2012/0162193 | A1* | 6/2012 | Bae | H04N 13/117 345/419 |
| 2012/0250982 | A1* | 10/2012 | Ito | G06T 7/12 382/159 |
| 2014/0293028 | A1* | 10/2014 | Nguyen | H04N 13/305 348/59 |
| 2014/0328389 | A1 | 11/2014 | Fu et al. | |
| 2016/0029040 | A1* | 1/2016 | Deng | H04N 19/597 375/240.16 |
| 2017/0094192 | A1* | 3/2017 | Adsumilli | G06T 15/503 |
| 2018/0255290 | A1* | 9/2018 | Holzer | H04N 13/279 |
| 2018/0359489 | A1* | 12/2018 | Lakshman | H04N 13/111 |
| 2019/0139266 | A1* | 5/2019 | Budagavi | G06T 17/00 |
| 2020/0036955 | A1* | 1/2020 | Pesonen | H04N 13/111 |
| 2020/0045288 | A1* | 2/2020 | Boyce | H04N 13/167 |
| 2020/0228777 | A1* | 7/2020 | Dore | G06T 9/001 |
| 2021/0112236 | A1* | 4/2021 | Fleureau | H04N 21/85406 |
| 2021/0195162 | A1* | 6/2021 | Chupeau | H04N 21/21805 |
| 2021/0274147 | A1* | 9/2021 | Fleureau | H04N 21/816 |

* cited by examiner

[Fig. 5]
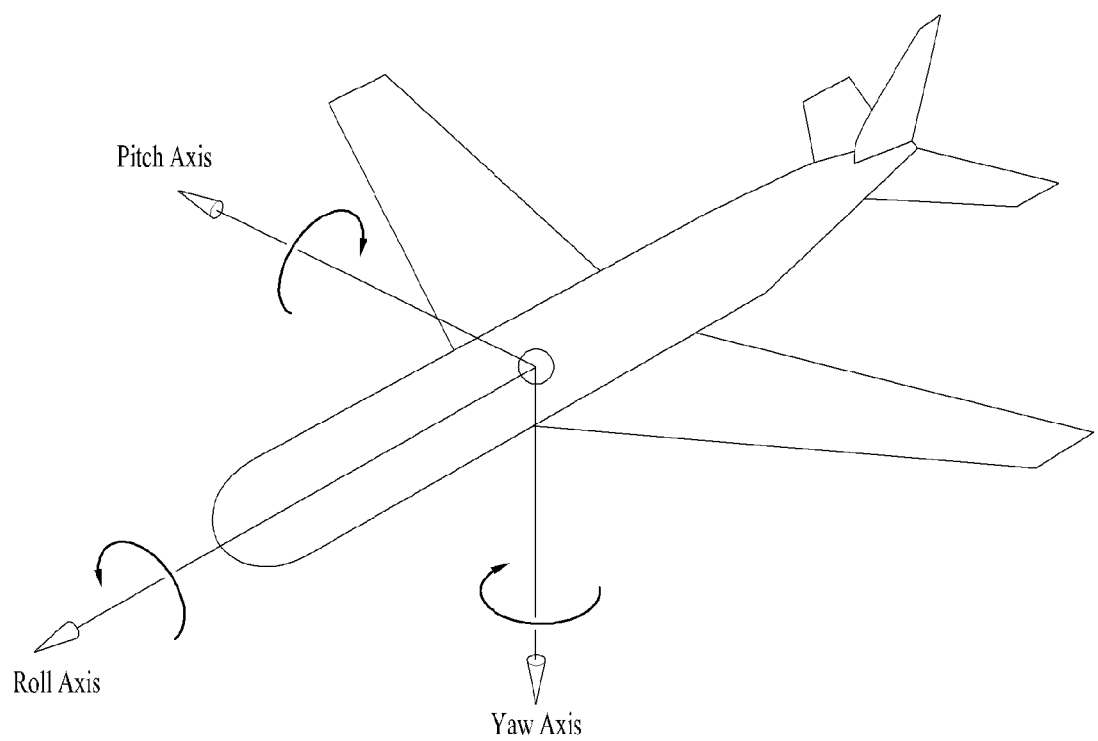

[Fig. 6]
(a) 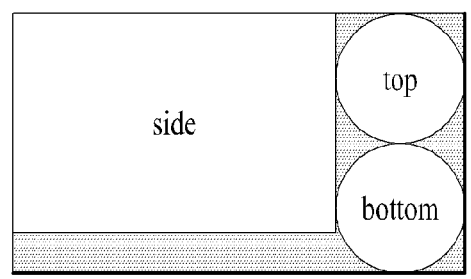 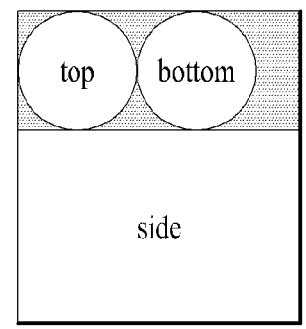
(b) 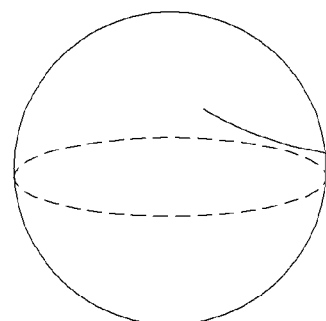 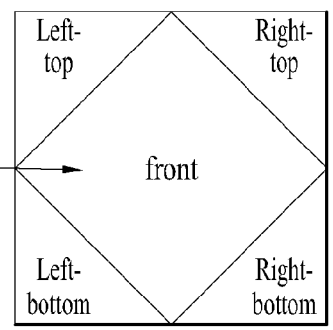
(c)

[Fig. 7]
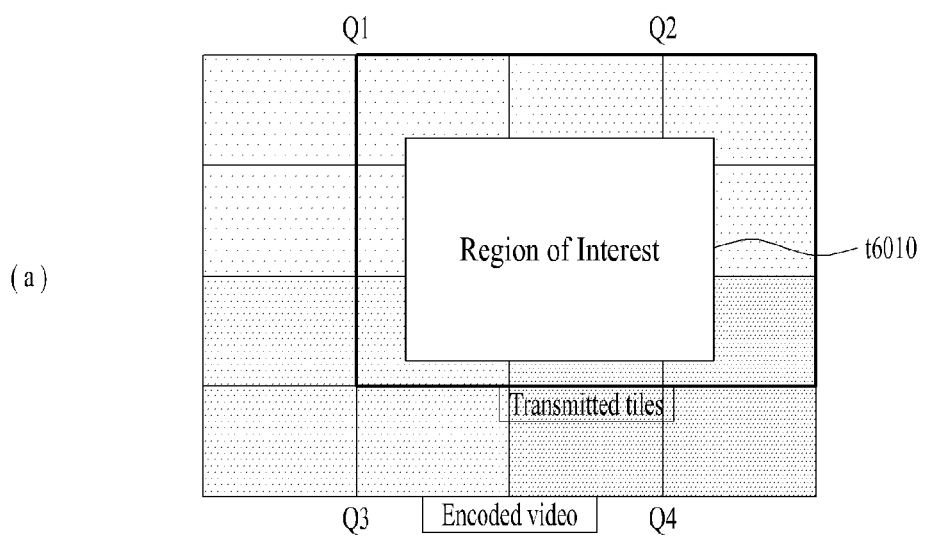
(a)
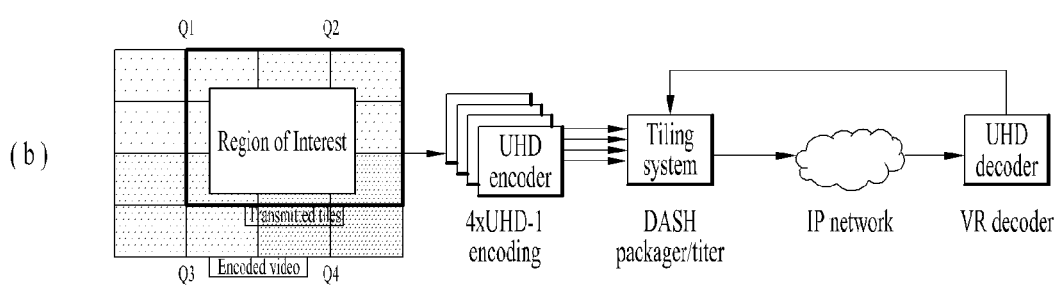
(b)

[Fig. 8]

```
.....
        <basic metadata>
unsigned    int(8)          vr_geometry;
unsigned    int(8)          projection_schme;
        <stereoscopic-related metadata>
unsigned    int(1)          is_stereoscopic;
unsigned    int(3)          stereo_mode;
        <initial-view-related metadata>
signed      int(8)          initial_view_yaw_degree;
signed      int(8)          initial_view_pitch_degree;
signed      int(8)          initial_view_roll_degree;
        <roi-related metadata>
unsigned int(1)             2d_roi_range_flag;
unsigned int(1)             3d_roi_range_flag;
if (2d_roi_region_flag ==1) {
   unsigned int(16) min_top_left_x;
   unsigned int(16) max_top_left_x;
   unsigned int(16) min_top_left_y;
   unsigned int(16) max_top_left_y;
   unsigned int(16) min_width;
   unsigned int(16) max_width;
   unsigned int(16) min_height;
   unsigned int(16) max_height;
   unsigned int(16) min_x;
   unsigned int(16) max_x;
   unsigned int(16) min_y;
   unsigned int(16) max_y;
}
if (3d_roi_region_flag ==1) {
   unsigned int(16) min_yaw;
   unsigned int(16) max_yaw;
   unsigned int(16) min_pitch;
   unsigned int(16) max_pitch;
   unsigned int(16) min_roll;
   unsigned int(16) max_roll;
   unsigned int(16) min_field_of_view;
   unsigned int(16) max_field_of_view;
}
        <field-of-view-related metadata>
unsigned int(1)             content_fov_flag;
if (content_fov_flag == 1)  {
   unsigned int(16)         content_fov;
}
        <cropped-region-related metadata>
unsigned int(1)             is_cropped_region;
if(is_cropped_region == 1)  {
   unsigned int(16)         cr_region_left_top_x;
   unsigned int(16)         cr_region_left_top_y;
   unsigned int(16)         cr_region_width;
   unsigned int(16)         cr_region_height;
}
.....
```

[Fig. 9]
| viewpoint | viewing position | viewing orientation |
|---|---|---|
| 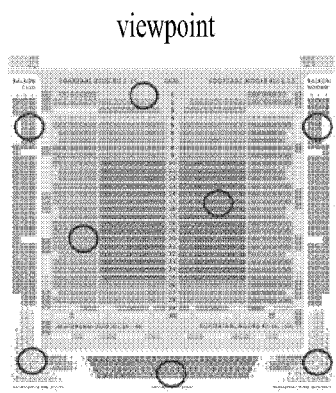 | 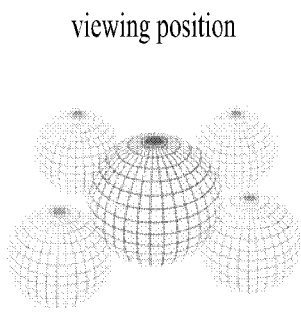 | 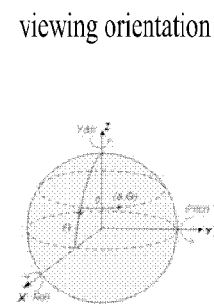 |
| (a) | (b) | (c) |

[Fig. 11]
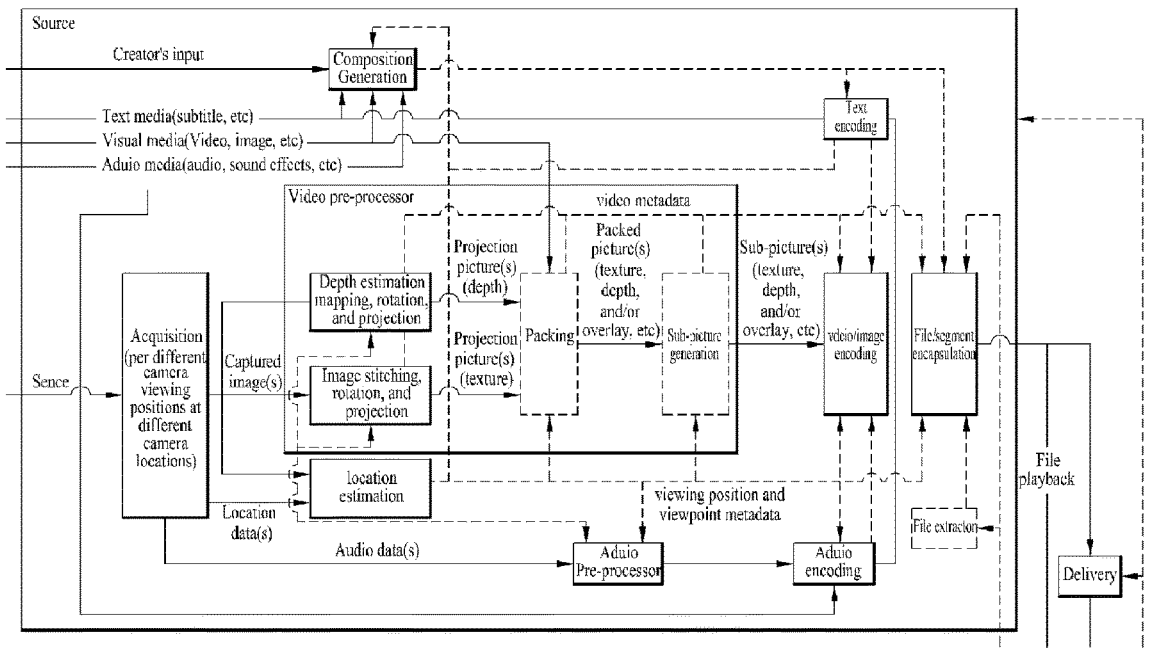
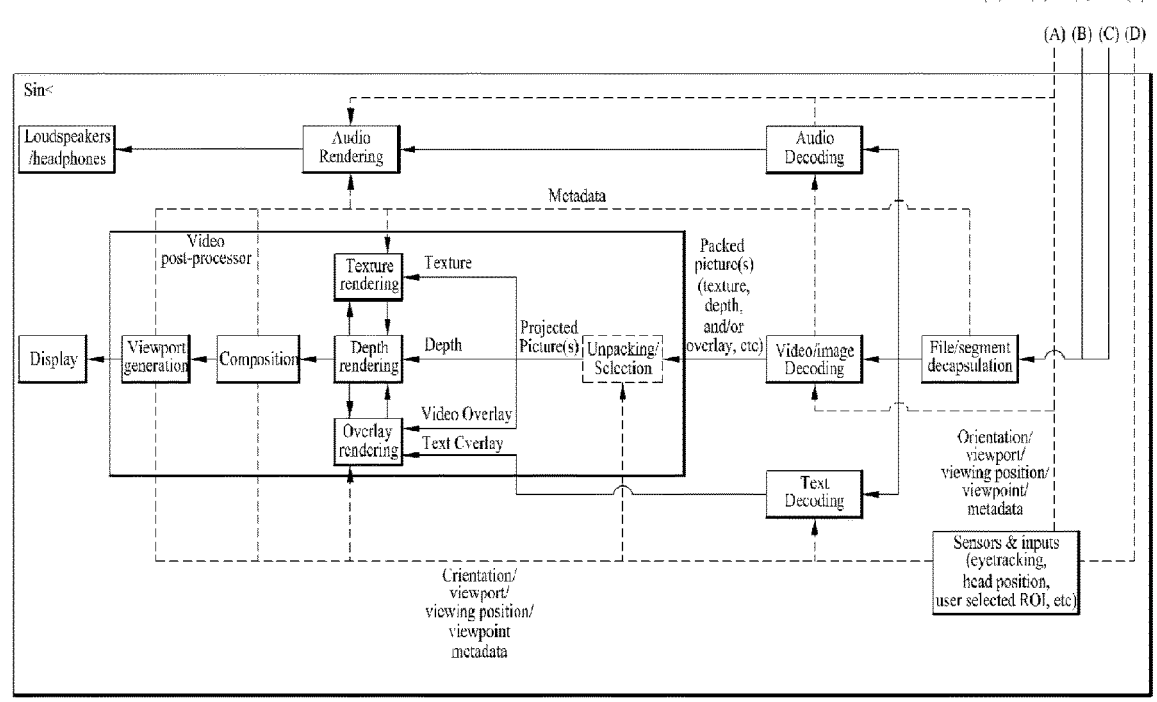

[Fig. 12]
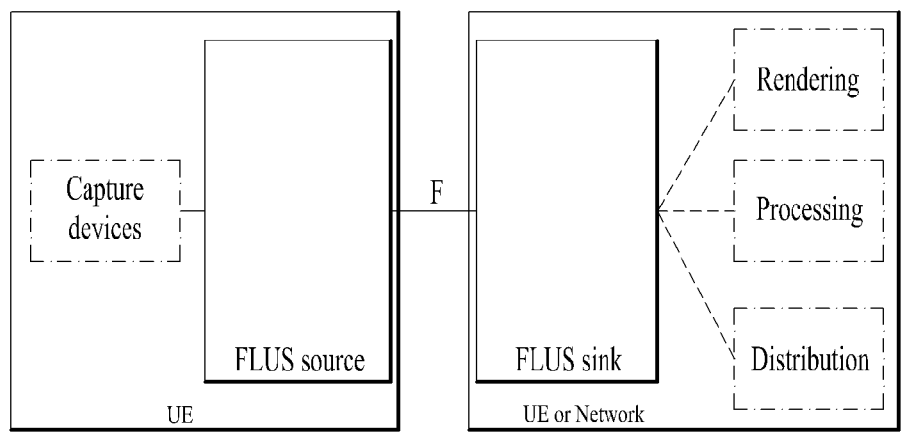

[Fig. 13]
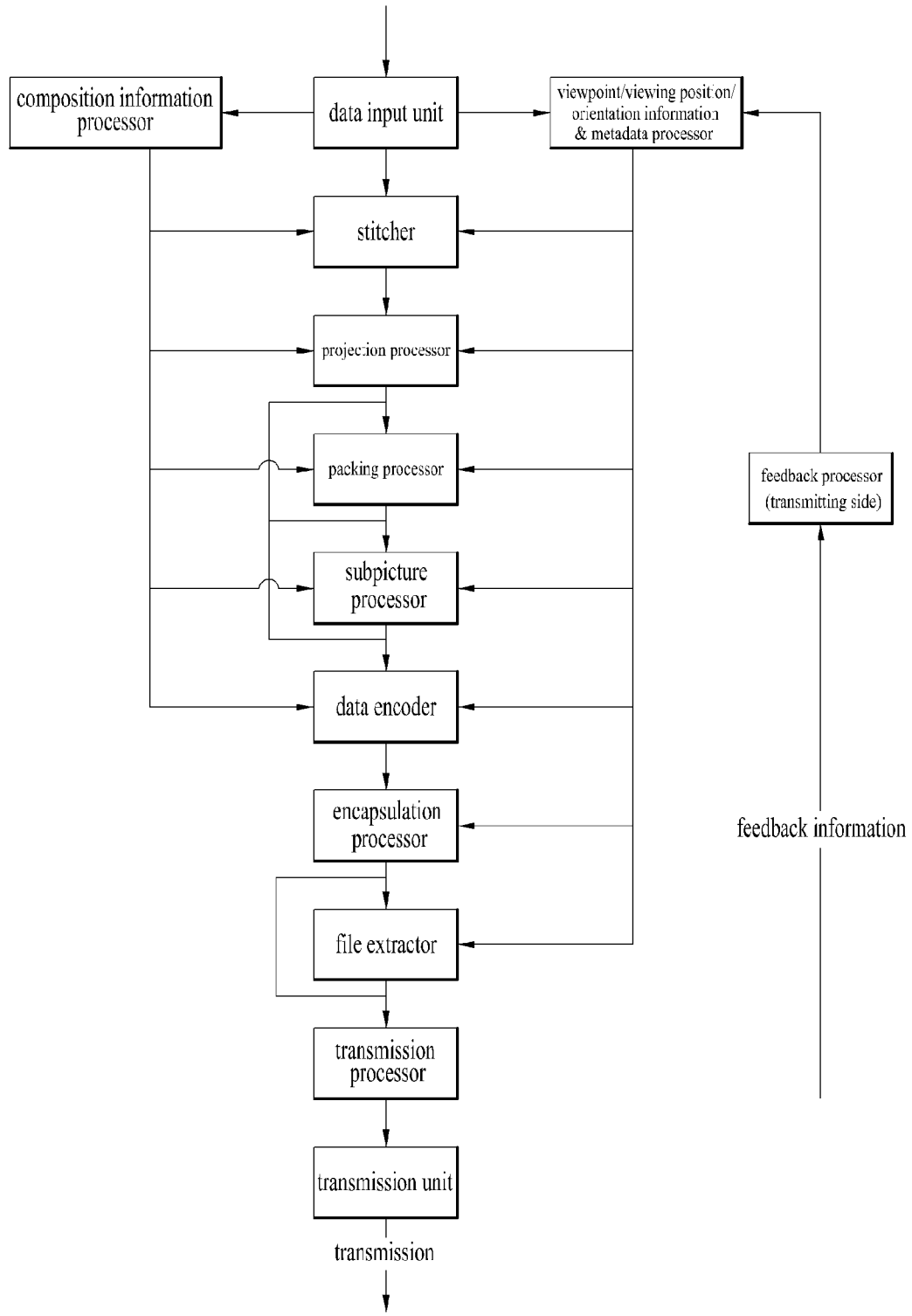

[Fig. 14]
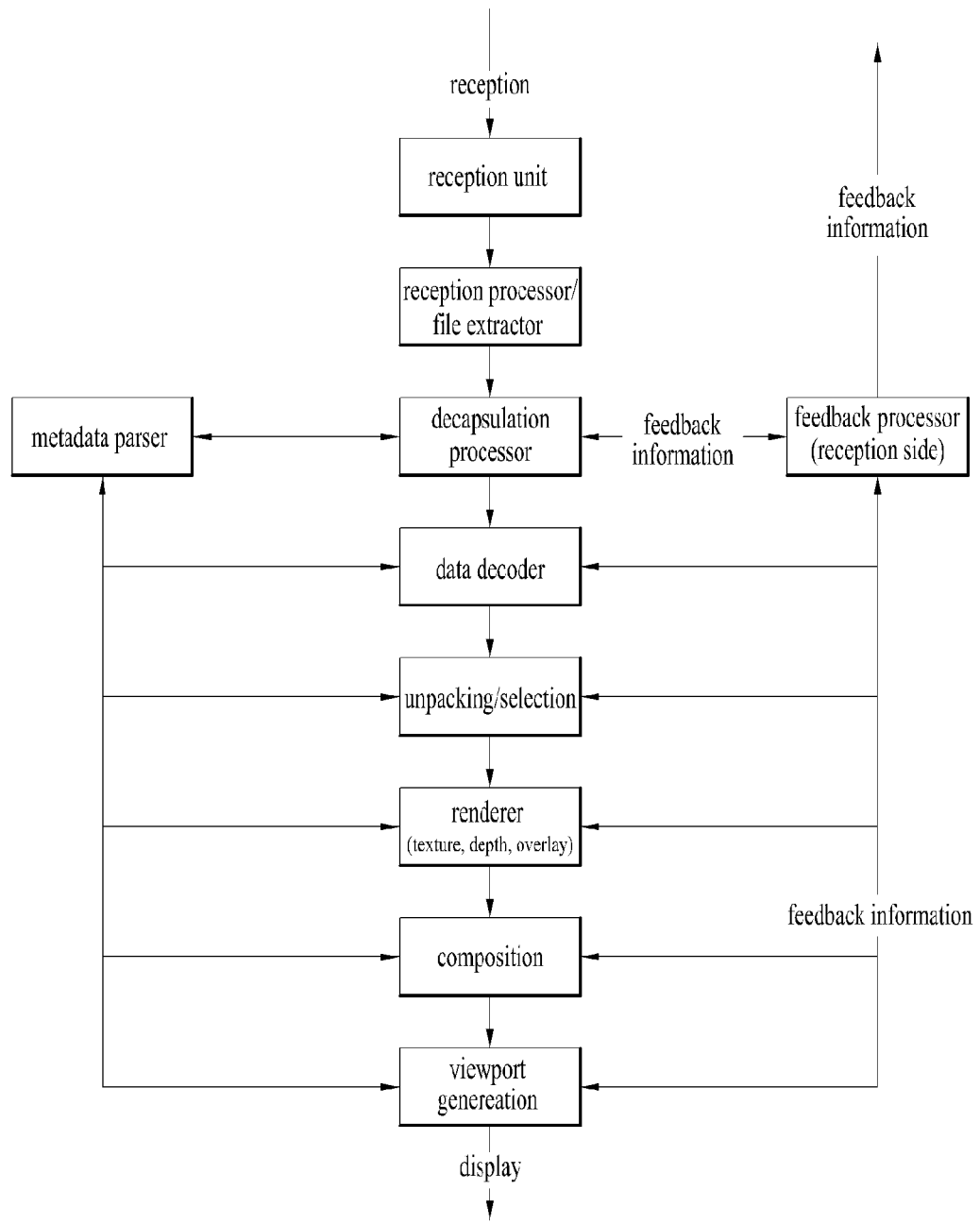

| | Descriptor |
|---|---|
| texture_depth_regeneration_info ( payloadSize ) { | |
|   texture_depth_regeneration_info_id | u(11) |
|   texture_depth_regeneration_info_cancel_flag | u(1) |
|   if( !texture_depth_restoration_info_cancel_flag ) { | |
|     texture_depth_regeneration_info_persistence_flag | u(1) |
|     num_texture_depth_regeneration_minus1 | u(8) |
|     for( i = 0; i <= num_view_restoration_minus1; i++ ) { | |
|       regenerated_view_id[ i ]   // target_view_id | u(8) |
|       view_location_x[ i ] | i(32) |
|       view_location_y[ i ] | i(32) |
|       view_location_z[ i ] | i(32) |
|       view_rotation_yaw[ i ] | i(32) |
|       view_rotation_pitch[ i ] | i(32) |
|       view_rotation_rol[ i ] | i(32) |
|       num_components[ i ] | |
|       for( j=0; j< num_components[ i ]; j++) { | |
|         regenerated_component_id[ i ][ j ]   // target_component_id | u(8) |
|         picture_width[ i ][ j ] | u(8) |
|         picture_height[ i ][ j ] | u(8) |
|         projection_type[ i ][ j ] | u(8) |
|         component_type[ i ][ j ]   // texture, depth, patch, alpha, indicator (used/not used) | u(8) |
|         if(component_type[ i ][ j ] == 2 ) { | |
|           depth_near[ i ][ j ] | u(32) |
|           depth_far[ i ][ j ] | u(32) |
|         } | |
|       } | |
|       texture_depth_regeneration_info_flag[i] | u(1) |
|       reserved_zero_7bits[i] | u(6) |
|       if( texture_depth_regeneration_info_flag[i]) { | |
|         merging_flag[ i ] | u(1) |
|         hole_filing_flag[ i ] | u(1) |
|         crack_removal_flag[ i ] | u(1) |
|         occlusion_enh_flag[ i ] | u(1) |
|         reserved_4bits | u(3) |
|         num_ref_views_minus1[ i ] | u(8) |
|         for( j = 0; j <= num_ref_views_minus1[ i ]; j++ ) { | |
|           ref_view_id[ i ][ j ] | u(8) |
|           ref_component_id[ i ][ j ] | u(8) |
|           hor_min_fov[ i ][ j ] | i(32) |
|           hor_max_fov[ i ][ j ] | i(32) |
|           ver_min_fov[ i ][ j ] | i(32) |
|           ver_max_fov[ i ][ j ] | i(32) |
|           global_offset_x_axis[ i ][ j ] | u(8) |
|           global_offset_y_axis[ i ][ j ] | u(8) |
|           global_offset_z_axis[ i ][ j ] | u(8) |
|         if( merging_flag ) { | |
|           num_depth_levels_minus1[ i ][ j ] | u(8) |
|           for( k = 0; k <= num_depth_levels_minus1[ i ][ j ]; k++ ) { | |
|             num_angular_levels_minus1[ i ][ j ][ k ] | u(8) |
|             for( l = 0; l <= num_angular_levels_minus1[ i ][ j ][ k ]; l++) { | |
|               weight_depth_level[ i ][ j ][ k ][ l ] | u(8) |
|             } | |
|           } | |
|         } | |
|         if( hole_filing_flag[ i ] ) { | |
|           hole_filling_process_type[ i ] | u(8) |
|           num_coeffs_minus1[ i ] | u(8) |
|           for( j = 0; j <= num_coeff_minus1[ i ]; j++ ) | |
|             hole_filling_coeff[ i ][ j ] | u(8) |
|         } | |
|         if( crack_removal_flag[ i ] ) { | |
|           crack_removal_process_type[ i ] | u(8) |
|           num_coeffs_minus1[ i ] | u(8) |
|           for( j = 0; j <= num_coeff_minus1[ i ]; j++ ) | |
|             crack_removal_coeff[ i ][ j ] | u(8) |
|         } | |
|         if( occlusion_enh_flag[ i ] ) { | |
|           num_patch_blocks[ i ] | u(8) |
|           for( j=0; j< num_patch_blocks[ i ]; j++ ) { | |
|             regenerated_picture_top_left_index_x[ i ][ j ] | u(16) |
|             regenerated_picture_top_left_index_y[ i ][ j ] | u(16) |
|             regenerated_picture_bottom_right_index_x[ i ][ j ] | u(16) |
|             regenerated_picture_bottom_right_index_y[ i ][ j ] | u(16) |
|             patch_view_id[ i ][ j ] | u(8) |
|             patch_component_id[ i ][ j ] | u(8) |
|             patch_top_left_index_x[ i ][ j ] | u(16) |
|             patch_top_left_index_y[ i ][ j ] | u(16) |
|             patch_bottom_right_index_x[ i ][ j ] | u(16) |
|             patch_bottom_right_index_y[ i ][ j ] | u(16) |
|           } | |
|         } | |
|       } | |
|     } | |
|   } | |
| } | |

FIG. 30

| | Descriptor |
|---|---|
| multiview_regionwise_packing( payloadSize ) { | |
|   multiview_regionwise_packing_id | u(32) |
|   multiview_regionwise_packing_cancel_flag | u(1) |
|   if( !multiview_regionwise_packing_cancel_flag ) { | |
|     multiview_regionwise_packing_persistence_flag | u(1) |
|     constituent_picture_matching_flag | u(1) |
|     packing_format_matching_between_views_flag | u(1) |
|     num_view_minus1    // target_view_id | u(8) |
|     for( i = 0; i <= num_view_minus1; i++ ) { | |
|       mrwp_view_id[ i ] | u(8) |
|       mrwp_anchor_view_flag[ i ] // or constraint on the case j equal to 0 | u(1) |
|       mrwp_view_independent_rotation_flag[ i ] | u(1) |
|       mrwp_component_independent_rotation_flag | u(1) |
|       mrwp_all_components_packed_in_one_region_flag[ i ] | u(1) |
|       texture_depth_regeneration_flag[ i ] | u(1) |
|       mrwp_reserved_zero_3bits[ i ] | u(3) |
|       if( mrwp_anchor_view_flag[ i ] ) { | |
|         mrwp_location_anchor_view_x[ i ] | i(32) |
|         mrwp_location_anchor_view_y[ i ] | i(32) |
|         mrwp_location_anchor_view_z[ i ] | i(32) |
|         mrwp_rotation_anchor_view_yaw[ i ] | i(32) |
|         mrwp_rotation_anchor_view_pitch[ i ] | i(32) |
|         mrwp_rotation_anchor_view_roll[ i ] | i(32) |
|       } else { | |
|         mrwp_location_diff_x[ i ] | i(32) |
|         mrwp_location_diff_y[ i ] | i(32) |
|         mrwp_location_diff_z[ i ] | i(32) |
|         if( mrwp_view_independent_rotation_flag[ i ] ) { | |
|           mrwp_rotation_diff_yaw[ i ] | i(32) |
|           mrwp_rotation_diff_pitch[ i ] | i(32) |
|           mrwp_rotation_diff_roll[ i ] | i(32) |
|         } | |
|       } | |
|       num_component_minus1 | u(8) |
|       for( j = 0; j <= num_component_minus1[ i ][ j ]; j++ ) { | |
|         mrwp_component_id[ i ][ j ] | u(8) |
|         mrwp_component_type[ i ] // texture/L/R, depth, residual, alpha | u(4) |
|         mrwp_projection_type[ i ] // erp, cmp, ... | u(4) |
|         mrwp_proj_picture_width[ i ] | u(32) |
|         mrwp_proj_picture_height[ i ] | u(32) |
|         mrwp_coverage_horizontal[ i ][ j ] | u(32) |
|         mrwp_coverage_vertical[ i ][ j ] | u(32) |
|         if( mrwp_component_type[ i ][ j ] == 2 ) { | |
|           depth_near[ i ][ j ] | u(32) |
|           depth_far[ i ][ j ] | u(32) |
|         } | |
|         if( mrwp_component_dependent_rotation_flag[ i ] ) { | |
|           mrwp_rotation_component_diff_yaw[ i ][ j ] | i(32) |
|           mrwp_rotation_component_diff_pitch[ i ][ j ] | i(32) |
|           mrwp_rotation_component_diff_roll[ i ][ j ] | i(32) |
|         } | |
|         if( mrwp_all_components_packed_in_one_region_flag[ i ] ) { | |
|           mrwp_packed_region_width[ i ][ j ] | u(16) |
|           mrwp_packed_region_height[ i ][ j ] | u(16) |
|           mrwp_packed_region_top[ i ][ j ] | u(16) |
|           mrwp_packed_region_left[ i ][ j ] | u(16) |
|         } | |
|       } | |
|     } | |
|     num_packed_regions | u(8) |
|     packed_picture_width | u(16) |
|     packed_picture_height | u(16) |
|     for( i = 0; i < num_packed_regions; i++ ) { | |
|       num_view_id_minus1[ i ] // regions sharing among diff. views | u(8) |
|       for( j = 0; j < num_view_id_minus1[ i ]; j++ ) { | |
|         view_idx[ i ][ j ] // mrwp_view_id[ i ] | u(8) |
|         num_component_id_minus1[ i ][ j ] // region sharing between L/R | u(8) |
|         for( k = 0; k <= num_component_id_minus1[ i ][ j ]; k++ ) { | |
|           component_id[ i ][ j ][ k ] // mrwp_component_id[ i ][ j ] | u(8) |
|           proj_region_width[ i ][ j ][ k ] | u(32) |
|           proj_region_height[ i ][ j ][ k ] | u(32) |
|           proj_region_top[ i ][ j ][ k ] | u(32) |
|           proj_region_left[ i ][ j ][ k ] | u(32) |
|           quality_index[ i ][ j ][ k ] | u(8) |
|         } | |
|       } | |
|       rwp_reserved_zero_4bits[ i ] | u(4) |
|       rwp_transform_type[ i ] | u(3) |
|       rwp_guard_band_flag[ i ] | u(1) |
|       packed_region_width[ i ] | u(16) |
|       packed_region_height[ i ] | u(16) |
|       packed_region_top[ i ] | u(16) |
|       packed_region_left[ i ] | u(16) |
|       if( rwp_guard_band_flag[ i ] ) { | |
|         rwp_left_guard_band_width[ i ] | u(8) |
|         rwp_right_guard_band_width[ i ] | u(8) |
|         rwp_top_guard_band_height[ i ] | u(8) |
|         rwp_bottom_guard_band_height[ i ] | u(8) |
|         rwp_guard_band_not_used_for_pred_flag[ i ] | u(1) |
|         for( j = 0; j < 4; j++ ) | |
|           rwp_guard_band_type[ i ][ j ] | u(3) |
|         rwp_guard_band_reserved_zero_3bits[ i ] | u(3) |
|       } | |
|     } | |
|   } | |
| } | |

[Fig. 31]

| | |
|---|---|
| num_view_regeneration_minus1 | u(8) |
| for( i = 0; i <= num_view_regeneration_minus1; i++ ) { | |
|   regenerated_view_id[ i ]  // target_view_id | u(8) |
|   regenerated_component_id[ i ]  // target_component_id | u(8) |
|   texture_depth_regeration_info_flag[ i ] | u(1) |
|   reserved_zero_7bits[ i ] | u(6) |
|   if( texture_depth_regeneration_info_flag[ i ] ) { | |
|     merging_flag[ i ] | u(1) |
|     hole_filing_flag[ i ] | u(1) |
|     crack_removal_flag[ i ] | u(1) |
|     occlusion_enh_flag[ i ] | u(1) |
|     reserved_4bits | u(3) |
|     num_ref_views_minus1[ i ] | u(8) |
|     for( j = 0; j <= num_ref_views_minus1[ i ]; j++ ) { | |
|       ref_view_id[ i ][ j ] | u(8) |
|       ref_component_id[ i ][ j ] | u(8) |
|       hor_min_fov[ i ][ j ] | i(32) |
|       hor_max_fov[ i ][ j ] | i(32) |
|       ver_min_fov[ i ][ j ] | i(32) |
|       ver_max_fov[ i ][ j ] | i(32) |
|       global_offset_x_axis[ i ][ j ] | u(8) |
|       global_offset_y_axis[ i ][ j ] | u(8) |
|       global_offset_z_axis[ i ][ j ] | u(8) |
|       if( merging_flag ) { | |
|         num_depth_levels_minus1[ i ][ j ] | u(8) |
|         for( k = 0; k <= num_depth_levels_minus1[ i ][ j ]; k++ ) { | |
|           num_angular_levels_minus1[ i ][ j ][ k ] | u(8) |
|           for( l = 0; l <= num_angular_levels_minus1[ i ][ j ][ k ]; l++ ) | |
|             weight_depth_level[ i ][ j ][ k ][ l ] | u(8) |
|         } | |
|       } | |
|     } | |
|     if( hole_filing_flag[ i ] ) { | |
|       hole_filling_process_type[ i ] | u(8) |
|       num_coeffs_minus1[ i ] | u(8) |
|       for( j = 0; j <= num_coeff_minus1[ i ]; j++ ) | |
|         hole_filing_coeff[ i ][ j ] | u(8) |
|     } | |
|     if( crack_removal_flag[ i ] ) { | |
|       crack_removal_process_type[ i ] | u(8) |
|       num_coeffs_minus1[ i ] | u(8) |
|       for( j = 0; j <= num_coeff_minus1[ i ]; j++ ) | |
|         crack_removal_coeff[ i ][ j ] | u(8) |
|     } | |
|     if( occlusion_enh_flag[ i ] ) { | |
|       num_patch_blocks[ i ] | u(8) |
|       for( j=0; j < num_patch_blocks[ i ]; j++ ) { | |
|         regenerated_texture_top_left_index_x[ i ][ j ] | u(16) |
|         regenerated_texture_top_left_index_y[ i ][ j ] | u(16) |
|         regenerated_texture_bottom_right_index_x[ i ][ j ] | u(16) |
|         regenerated_texture_bottom_right_index_y[ i ][ j ] | u(16) |
|         patch_view_id[ i ][ j ] | u(16) |
|         patch_component_id[ i ][ j ] | u(16) |
|         patch_top_left_index_x[ i ][ j ] | u(16) |
|         patch_top_left_index_y[ i ][ j ] | u(16) |
|         patch_bottom_right_index_x[ i ][ j ] | u(16) |
|         patch_bottom_right_index_y[ i ][ j ] | u(16) |
|       } | |
|     } | |
|   } | |
| } | |

[Fig. 32]
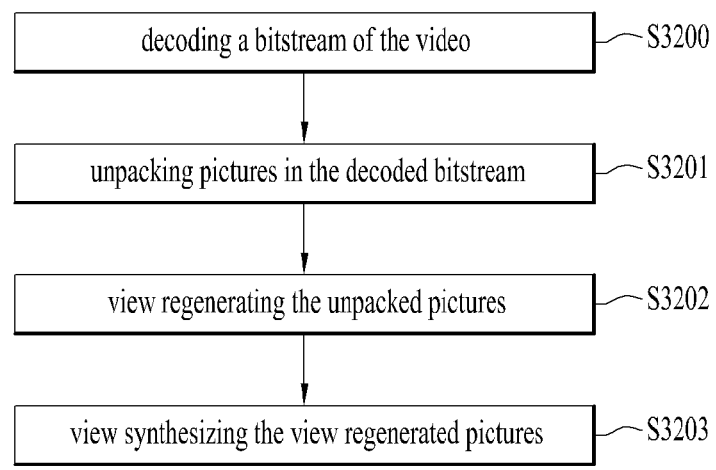
[Fig. 33]
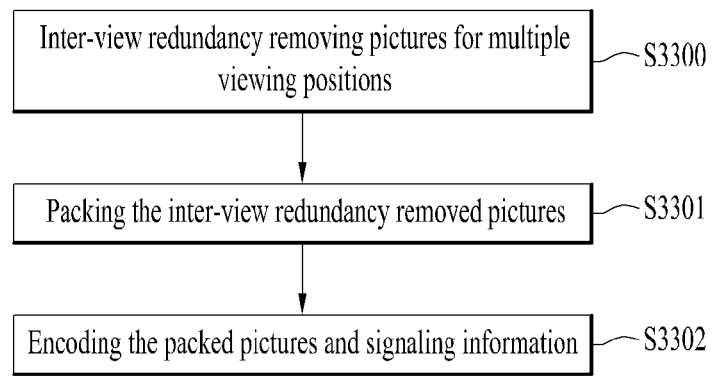

METHOD FOR TRANSMITTING VIDEO, APPARATUS FOR TRANSMITTING VIDEO, METHOD FOR RECEIVING VIDEO, AND APPARATUS FOR RECEIVING VIDEO

CROSS-REFERENCE TO RELATED APPLICATIONS

This application is a National Stage application under 35 U.S.C. § 371 of International Application No. PCT/KR2019/010222, filed on Aug. 12, 2019, which claims the benefit of U.S. Provisional Application No. 62/718,323, filed on Aug. 13, 2018. The disclosures of the prior applications are incorporated by reference in their entirety.

TECHNICAL FIELD

The present invention relates to a method for transmitting a video, an apparatus for transmitting a video, a method for receiving a video, and an apparatus for receiving a video.

BACKGROUND ART

A virtual reality (VR) system provides a user with sensory experiences through which the user may feel as if he/she were in an electronically projected environment. A system for providing VR may be further improved in order to provide higher-quality images and spatial sound. Such a VR system may enable the user to interactively enjoy VR content.

DISCLOSURE OF INVENTION

Technical Problem

VR systems need to be improved in order to more efficiently provide a user with a VR environment. To this end, it is necessary to propose plans for data transmission efficiency for transmitting a large amount of data such as VR content, robustness between transmission and reception networks, network flexibility considering a mobile reception apparatus, and efficient reproduction and signaling.

Also, since general Timed Text Markup Language (TTML) based subtitles or bitmap based subtitles are not created in consideration of 360-degree video, it is necessary to extend subtitle related features and subtitle related signaling information to be adapted to use cases of a VR service in order to provide subtitles suitable for 360-degree video.

Solution to Problem

In order to solve the technical problem, the present invention provides a method of receiving a video, an apparatus of receiving a video, a method of transmitting a video, and an apparatus of transmitting a video.

Specifically, an apparatus for receiving bitstream, the apparatus according to embodiments of the present invention comprises a decoder configured to decode bitstream based on viewing position and viewport information; an unpacker configured to unpack pictures in the decoded bitstream; a view regenerator configured to view regenerate the unpacked pictures; and a view synthesizer configured to view synthesize the view regenerated pictures.

In addition, the apparatus further comprises wherein the decoded bitstream includes first information for unpacker, second information for the view regenerator and third information for the view synthesizer, wherein the unpacked pictures include at least one of a texture picture, a depth picture, a texture patch or a texture residual, wherein the synthesized pictures include a picture of target viewing position.

In addition, the apparatus further comprises wherein the view regenerator performs, translating and rotating foreground of the unpacked pictures based on disparity information, viewing direction and viewing position.

In addition, the apparatus further comprises wherein the view regenerator performs, occlusion detecting background of the unpacked pictures based on the viewing position and viewing direction.

Furthermore, the apparatus further comprises wherein the view regenerator perform, merging foreground and background of the unpacked picture; crack removing the merged picture; and occlusion enhancing the merged picture based on patch residual in the unpacked picture.

In addition, wherein reference views in the unpacked pictures include a first picture and a second picture, wherein the first picture and the second picture are decomposed based on information for decomposition level in reconstruction parameters, so that a third picture for target viewing position is regenerated based on the decomposed first picture, the decomposed second picture and offset information in the reconstruction parameters.

More specifically, an apparatus of transmitting a video according to embodiments of the present invention comprises an an inter-view redundancy remover configured to remove redundancy of pictures for multiple viewing positions; a packer configured to pack the inter-view redundancy removed pictures; and an encoder configured to encode the packed pictures and signaling information.

In addition, the apparatus according to embodiments of the present invention comprises wherein the signaling information includes reconstruction parameters and packing metadata, wherein the reconstruction parameters are generated by the interview redundancy remover, and the packing metadata is generated by the packer, wherein the pictures include at least one of a texture picture, a depth picture, a texture patch, or a texture residual.

Moreover, the apparatus according to embodiments of the present invention comprises wherein the signaling information includes, offset information representing an offset between location of a component of a reference view and location of a component of a view to be regenerated, and information for decomposition level.

Furthermore, the apparatus according to embodiments of the present invention comprises wherein the signaling information includes, information for hole filling, information for crack removal and information for occlusion enhancement.

Advantageous Effects of Invention

To provide different viewing experience with viewer's action in the VR environment, changing viewing position with a limitation of viewing boundary should be considered.

The head motion parallax could provide viewers certain degree of freedom of head motion with realistic viewing experience.

Receivers could generate a video with head motion parallax and/or binocular disparity, or different viewpoints, which receivers could generate interactive video with changing locations.

This could increase bit efficiency by eliminating redundant information between views.

Following is focused on a format of SEI message syntax elements and semantics for MPEG video codec. However, other formats of video level, e.g., parameters sets, and/or future or current video codecs, system level, e.g., file format, DASH, MMT, and 3GPP, or digital interfaces, e.g., HDMI, DisplayPort, and VESA, could be possible with the same features described below.

BRIEF DESCRIPTION OF DRAWINGS

FIG. 5 is a view showing the concept of principal aircraft axes for describing 3D space in connection with the present invention;

FIG. 6 is a view showing projection schemes according to an embodiment of the present invention;

FIG. 7 is a view showing a tile according to an embodiment of the present invention;

FIG. 8 is a view showing 360-degree-video-related metadata according to an embodiment of the present invention;

FIG. 9 is a view showing a viewpoint and viewing position additionally defined in a 3DoF+ VR system;

FIG. 11 is a view showing an architecture of a 3DoF+ end-to-end system;

FIG. 12 is a view showing an architecture of a Frame for Live Uplink Streaming (FLUS);

FIG. 13 is a view showing a configuration of 3DoF+ transmission side;

FIG. 14 is a view showing a configuration of 3DoF+ reception side;

FIG. 29 is a view showing Texture depth regeneration information SEI message syntax according to the embodiments of the present invention;

FIGS. 30 and 31 are views showing Multiview Packing and Texture Depth Regeneration information SEI message syntax according to the embodiments of the present invention;

FIG. 32 is a flow chart showing a method for receiving bitstreams according to the embodiments of the present invention; and FIG. 33 is a flow chart showing a method for transmitting pictures according to the embodiments of the present invention.

BEST MODE FOR CARRYING OUT THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood according to the intended meanings of the terms rather than their simple names or meanings.

Figure 1:
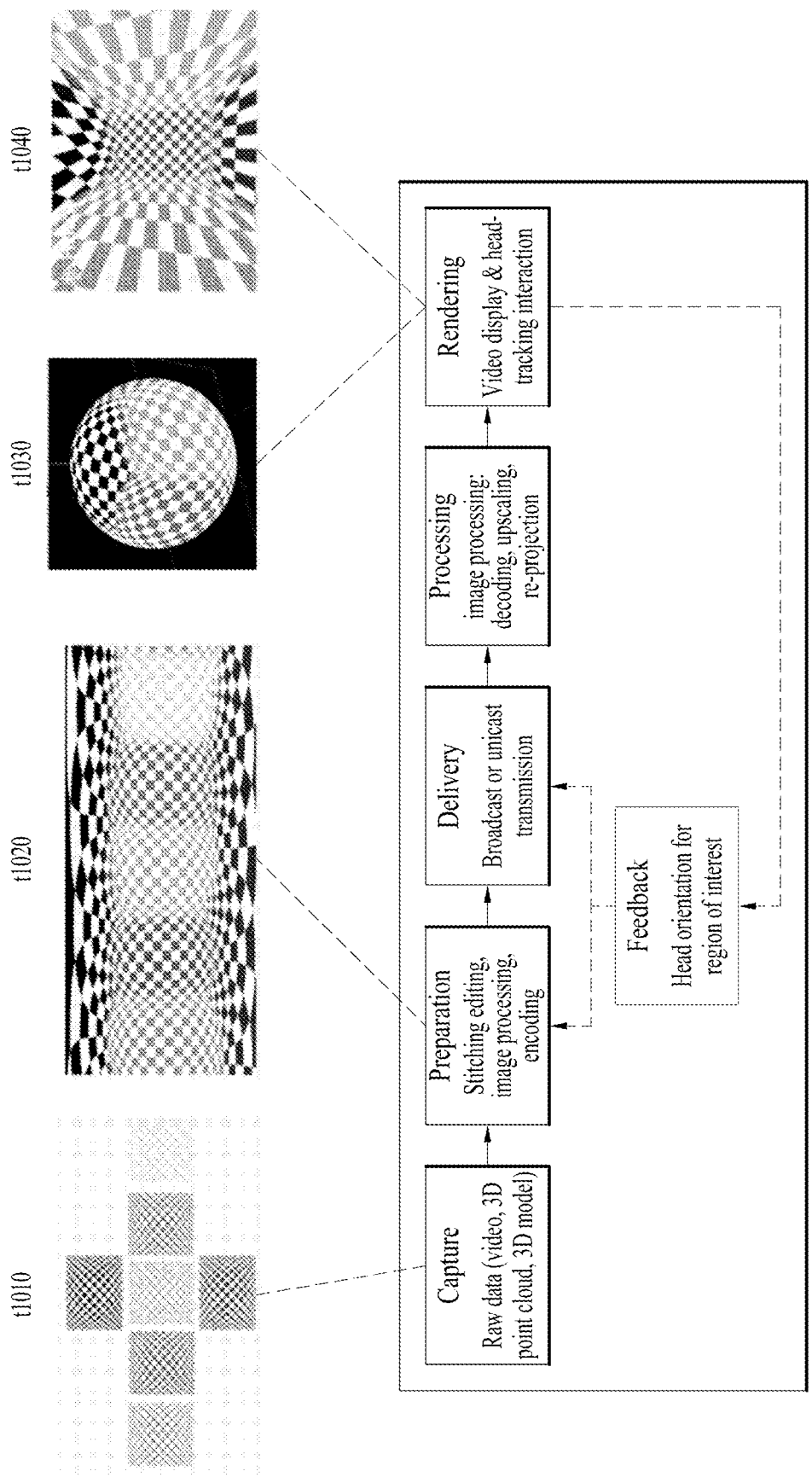
FIG. 1 is a view showing the entire architecture for providing a 360-degree video according to the present invention.

FIG. 1 is a view showing the entire architecture for providing 360-degree video according to the present invention.

The present invention proposes a scheme for 360-degree content provision in order to provide a user with virtual reality (VR). VR may mean technology or an environment for replicating an actual or virtual environment. VR artificially provides a user with sensual experiences through which the user may feel as if he/she were in an electronically projected environment.

360-degree content means all content for realizing and providing VR, and may include 360-degree video and/or 360-degree audio. The term "360-degree video" may mean video or image content that is captured or reproduced in all directions (360 degrees) at the same time, which is necessary to provide VR. Such 360-degree video may be a video or an image that appears in various kinds of 3D spaces depending on 3D models. For example, the 360-degree video may appear on a spherical surface. The term "360-degree audio", which is audio content for providing VR, may mean spatial audio content in which the origin of a sound is recognized as being located in a specific 3D space. The 360-degree content may be generated, processed, and transmitted to users, who may enjoy a VR experience using the 360-degree content.

The present invention proposes a method of effectively providing 360-degree video in particular. In order to provide 360-degree video, the 360-degree video may be captured using at least one camera. The captured 360-degree video may be transmitted through a series of processes, and a reception side may process and render the received data into the original 360-degree video. As a result, the 360-degree video may be provided to a user.

Specifically, the overall processes of providing the 360-degree video may include a capturing process, a preparation process, a delivery process, a processing process, a rendering process, and/or a feedback process.

The capturing process may be a process of capturing an image or a video at each of a plurality of viewpoints using at least one camera. At the capturing process, image/video data may be generated, as shown (t1010). Each plane that is shown (t1010) may mean an image/video at each viewpoint. A plurality of captured images/videos may be raw data. At the capturing process, capturing-related metadata may be generated.

A special camera for VR may be used for capturing. In some embodiments, in the case in which 360-degree video for a virtual space generated by a computer is provided, capturing may not be performed using an actual camera. In this case, a process of simply generating related data may replace the capturing process.

The preparation process may be a process of processing the captured images/videos and the metadata generated at the capturing process. At the preparation process, the captured images/videos may undergo a stitching process, a projection process, a region-wise packing process, and/or an encoding process.

First, each image/video may undergo the stitching process. The stitching process may be a process of connecting the captured images/videos to generate a panoramic image/video or a spherical image/video.

Subsequently, the stitched image/video may undergo the projection process. At the projection process, the stitched image/video may be projected on a 2D image. Depending on the context, the 2D image may be called a 2D image frame. 2D image projection may be expressed as 2D image mapping. The projected image/video data may have the form of a 2D image, as shown (t1020).

The video data projected on the 2D image may undergo the region-wise packing process in order to improve video coding efficiency. The region-wise packing process may be a process of individually processing the video data projected on the 2D image for each region. Here, the term "regions" may indicate divided parts of the 2D image on which the video data are projected. In some embodiments, regions may be partitioned by uniformly or arbitrarily dividing the 2D image. Also, in some embodiments, regions may be partitioned depending on a projection scheme. The region-wise packing process is optional, and thus may be omitted from the preparation process.

In some embodiments, this process may include a process of rotating each region or rearranging the regions on the 2D image in order to improve video coding efficiency. For example, the regions may be rotated such that specific sides of the regions are located so as to be adjacent to each other, whereby coding efficiency may be improved.

In some embodiments, this process may include a process of increasing or decreasing the resolution of a specific region in order to change the resolution for areas on the 360-degree video. For example, regions corresponding to relatively important areas in the 360-degree video may have higher resolution than other regions. The video data projected on the 2D image or the region-wise packed video data may undergo the encoding process via a video codec.

In some embodiments, the preparation process may further include an editing process. At the editing process, image/video data before and after projection may be edited. At the preparation process, metadata related to stitching/projection/encoding/editing may be generated in the same manner. In addition, metadata related to the initial viewpoint of the video data projected on the 2D image or a region of interest (ROI) may be generated.

The delivery process may be a process of processing and delivering the image/video data that have undergone the preparation process and the metadata. Processing may be performed based on an arbitrary transport protocol for delivery. The data that have been processed for delivery may be delivered through a broadcast network and/or a broadband connection. The data may be delivered to the reception side in an on-demand manner. The reception side may receive the data through various paths.

The processing process may be a process of decoding the received data and reprojecting the projected image/video data on a 3D model. In this process, the image/video data projected on the 2D image may be reprojected in a 3D space. Depending on the context, this process may be called mapping or projection. At this time, the mapped 3D space may have different forms depending on the 3D model. For example, the 3D model may be a sphere, a cube, a cylinder, or a pyramid.

In some embodiments, the processing process may further include an editing process and an up-scaling process. At the editing process, the image/video data before and after reprojection may be edited. In the case in which the image/video data are down-scaled, the size of the image/video data may be increased through up-scaling at the up-scaling process. As needed, the size of the image/video data may be decreased through down-scaling.

The rendering process may be a process of rendering and displaying the image/video data reprojected in the 3D space. Depending on the context, a combination of reprojection and rendering may be expressed as rendering on the 3D model. The image/video reprojected on the 3D model (or rendered on the 3D model) may have the form that is shown (t1030). The image/video is reprojected on a spherical 3D model, as shown (t1030). The user may view a portion of the rendered image/video through a VR display. At this time, the portion of the image/video that is viewed by the user may have the form that is shown (t1040).

The feedback process may be a process of transmitting various kinds of feedback information that may be acquired at a display process to a transmission side. Interactivity may be provided in enjoying the 360-degree video through the feedback process. In some embodiments, head orientation information, information about a viewport, which indicates the area that is being viewed by the user, etc. may be transmitted to the transmission side at the feedback process. In some embodiments, the user may interact with what is realized in the VR environment. In this case, information related to the interactivity may be provided to the transmission side or to a service provider side at the feedback process. In some embodiments, the feedback process may not be performed.

The head orientation information may be information about the position, angle, and movement of the head of the user. Information about the area that is being viewed by the user in the 360-degree video, i.e. the viewport information, may be calculated based on this information.

The viewport information may be information about the area that is being viewed by the user in the 360-degree video. Gaze analysis may be performed therethrough, and therefore it is possible to check the manner in which the user enjoys the 360-degree video, the area of the 360-degree video at which the user gazes, and the amount of time during which the user gazes at the 360-degree video. The gaze analysis may be performed at the reception side and may be delivered to the transmission side through a feedback channel. An apparatus, such as a VR display, may extract a viewport area based on the position/orientation of the head of the user, a vertical or horizontal FOV that is supported by the apparatus, etc.

In some embodiments, the feedback information may not only be delivered to the transmission side, but may also be used at the reception side. That is, the decoding, reprojection, and rendering processes may be performed at the reception side using the feedback information. For example, only the portion of the 360-degree video that is being viewed by the user may be decoded and rendered first using the head orientation information and/or the viewport information.

Here, the viewport or the viewport area may be the portion of the 360-degree video that is being viewed by the user. The viewpoint, which is the point in the 360-degree video that is being viewed by the user, may be the very center of the viewport area. That is, the viewport is an area based on the viewpoint. The size or shape of the area may be set by a field of view (FOV), a description of which will follow.

In the entire architecture for 360-degree video provision, the image/video data that undergo a series of capturing/projection/encoding/delivery/decoding/reprojection/rendering processes may be called 360-degree video data. The term "360-degree video data" may be used to conceptually include metadata or signaling information related to the image/video data.

Figure 2:
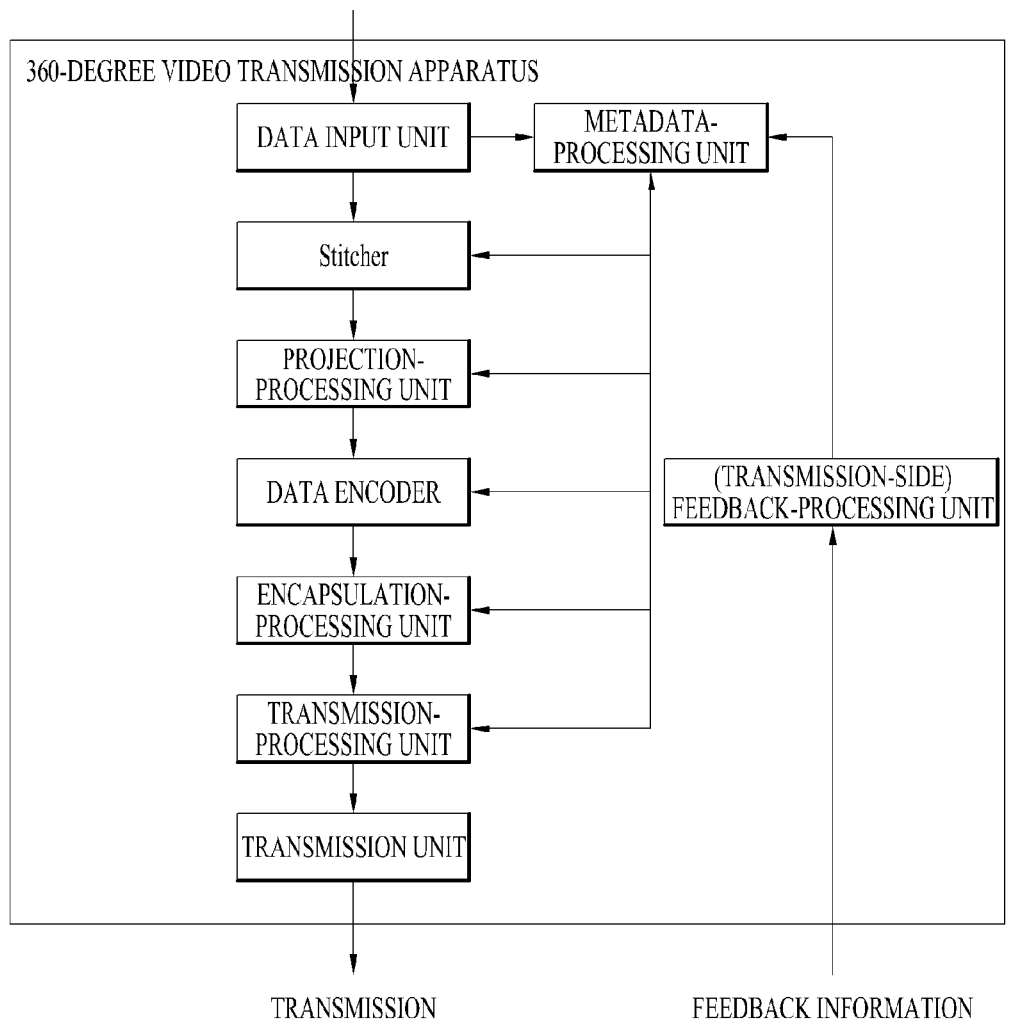
FIG. 2 is a view showing a 360-degree video transmission apparatus according to an aspect of the present invention.

FIG. 2 is a view showing a 360-degree video transmission apparatus according to an aspect of the present invention.

According to an aspect of the present invention, the present invention may be related to a 360-degree video transmission apparatus. The 360-degree video transmission apparatus according to the present invention may perform operations related to the preparation process and the delivery process. The 360-degree video transmission apparatus according to the present invention may include a data input unit, a stitcher, a projection-processor, a region-wise packing processor (not shown), a metadata-processor, a (transmission-side) feedback-processor, a data encoder, an encapsulation-processor, a transmission-processor, and/or a transmission unit as internal/external elements.

The data input unit may allow captured viewpoint-wise images/videos to be input. The viewpoint-wise image/videos may be images/videos captured using at least one camera. In addition, the data input unit may allow metadata generated at the capturing process to be input. The data input unit may deliver the input viewpoint-wise images/videos to the stitcher, and may deliver the metadata generated at the capturing process to a signaling processor.

The stitcher may stitch the captured viewpoint-wise images/videos. The stitcher may deliver the stitched 360-degree video data to the projection-processor. As needed, the stitcher may receive necessary metadata from the metadata-processor in order to use the received metadata at the stitching process. The stitcher may deliver metadata generated at the stitching process to the metadata-processor. The metadata generated at the stitching process may include information about whether stitching has been performed and the stitching type.

The projection-processor may project the stitched 360-degree video data on a 2D image. The projection-processor may perform projection according to various schemes, which will be described below. The projection-processor may perform mapping in consideration of the depth of the viewpoint-wise 360-degree video data. As needed, the projection-processor may receive metadata necessary for projection from the metadata-processor in order to use the received metadata for projection. The projection-processor may deliver metadata generated at the projection process to the metadata-processor. The metadata of the projection-processor may include information about the kind of projection scheme.

The region-wise packing processor (not shown) may perform the region-wise packing process. That is, the region-wise packing processor may divide the projected 360-degree video data into regions, and may rotate or re-arrange each region, or may change the resolution of each region. As previously described, the region-wise packing process is optional. In the case in which the region-wise packing process is not performed, the region-wise packing processor may be omitted. As needed, the region-wise packing processor may receive metadata necessary for region-wise packing from the metadata-processor in order to use the received metadata for region-wise packing. The region-wise packing processor may deliver metadata generated at the region-wise packing process to the metadata-processor. The metadata of the region-wise packing processor may include the extent of rotation and the size of each region.

In some embodiments, the stitcher, the projection-processor, and/or the region-wise packing processor may be incorporated into a single hardware component.

The metadata-processor may process metadata that may be generated at the capturing process, the stitching process, the projection process, the region-wise packing process, the encoding process, the encapsulation process, and/or the processing process for delivery. The metadata-processor may generate 360-degree-video-related metadata using the above-mentioned metadata. In some embodiments, the metadata-processor may generate the 360-degree-video-related metadata in the form of a signaling table. Depending on the context of signaling, the 360-degree-video-related metadata may be called metadata or signaling information related to the 360-degree video. In addition, the metadata-processor may deliver the acquired or generated metadata to the internal elements of the 360-degree video transmission apparatus, as needed. The metadata-processor may deliver the 360-degree-video-related metadata to the data encoder, the encapsulation-processor, and/or the transmission-processor such that the 360-degree-video-related metadata can be transmitted to the reception side.

The data encoder may encode the 360-degree video data projected on the 2D image and/or the region-wise packed 360-degree video data. The 360-degree video data may be encoded in various formats.

The encapsulation-processor may encapsulate the encoded 360-degree video data and/or the 360-degree-video-related metadata in the form of a file. Here, the 360-degree-video-related metadata may be metadata received from the metadata-processor. The encapsulation-processor may encapsulate the data in a file format of ISOBMFF or CFF, or may process the data in the form of a DASH segment. In some embodiments, the encapsulation-processor may include the 360-degree-video-related metadata on the file format. For example, the 360-degree-video-related metadata may be included in various levels of boxes in the ISOBMFF file format, or may be included as data in a separate track within the file. In some embodiments, the encapsulation-processor may encapsulate the 360-degree-video-related metadata itself as a file. The transmission-processor may perform processing for transmission on the encapsulated 360-degree video data according to the file format. The transmission-processor may process the 360-degree video data according to an arbitrary transport protocol. Processing for transmission may include processing for delivery through a broadcast network and processing for delivery through a broadband connection. In some embodiments, the transmission-processor may receive 360-degree-video-related metadata from the metadata-processor, in addition to the 360-degree video data, and may perform processing for transmission thereon.

The transmission unit may transmit the transmission-processed 360-degree video data and/or the 360-degree-video-related metadata through the broadcast network and/or the broadband connection. The transmission unit may include an element for transmission through the broadcast network and/or an element for transmission through the broadband connection.

In an embodiment of the 360-degree video transmission apparatus according to the present invention, the 360-degree video transmission apparatus may further include a data storage unit (not shown) as an internal/external element. The data storage unit may store the encoded 360-degree video data and/or the 360-degree-video-related metadata before delivery to the transmission-processor. The data may be stored in a file format of ISOBMFF. In the case in which the 360-degree video is transmitted in real time, no data storage unit is needed. In the case in which the 360-degree video is transmitted on demand, in non-real time (NRT), or through a broadband connection, however, the encapsulated 360-degree data may be transmitted after being stored in the data storage unit for a predetermined period of time.

In another embodiment of the 360-degree video transmission apparatus according to the present invention, the 360-degree video transmission apparatus may further include a (transmission-side) feedback-processor and/or a network interface (not shown) as an internal/external element. The network interface may receive feedback information from a 360-degree video reception apparatus according to the present invention, and may deliver the received feedback information to the transmission-side feedback-processor. The transmission-side feedback-processor may deliver the feedback information to the stitcher, the projection-processor, the region-wise packing processor, the data encoder, the encapsulation-processor, the metadata-processor, and/or the transmission-processor. In some embodiments, the feedback information may be delivered to the metadata-processor, and may then be delivered to the respective internal elements. After receiving the feedback information, the internal elements may reflect the feedback information when subsequently processing the 360-degree video data.

In another embodiment of the 360-degree video transmission apparatus according to the present invention, the region-wise packing processor may rotate each region, and may map the rotated region on the 2D image. At this time, the regions may be rotated in different directions and at different angles, and may be mapped on the 2D image. The rotation of the regions may be performed in consideration of the portions of the 360-degree video data that were adjacent to each other on the spherical surface before projection and the stitched portions thereof. Information about the rotation of the regions, i.e. the rotational direction and the rotational angle, may be signaled by the 360-degree-video-related metadata. In another embodiment of the 360-degree video transmission apparatus according to the present invention, the data encoder may differently encode the regions. The data encoder may encode some regions at high quality, and may encode some regions at low quality. The transmission-side feedback-processor may deliver the feedback information, received from the 360-degree video reception apparatus, to the data encoder, which may differently encode the regions. For example, the transmission-side feedback-processor may deliver the viewport information, received from the reception side, to the data encoder. The data encoder may encode regions including the areas indicated by the viewport information at higher quality (UHD, etc.) than other regions.

In a further embodiment of the 360-degree video transmission apparatus according to the present invention, the transmission-processor may differently perform processing for transmission on the regions. The transmission-processor may apply different transport parameters (modulation order, code rate, etc.) to the regions such that robustness of data delivered for each region is changed.

At this time, the transmission-side feedback-processor may deliver the feedback information, received from the 360-degree video reception apparatus, to the transmission-processor, which may differently perform transmission processing for the regions. For example, the transmission-side feedback-processor may deliver the viewport information, received from the reception side, to the transmission-processor. The transmission-processor may perform transmission processing on regions including the areas indicated by the viewport information so as to have higher robustness than other regions.

The internal/external elements of the 360-degree video transmission apparatus according to the present invention may be hardware elements that are realized as hardware. In some embodiments, however, the internal/external elements may be changed, omitted, replaced, or incorporated. In some embodiments, additional elements may be added to the 360-degree video transmission apparatus.

Figure 3:
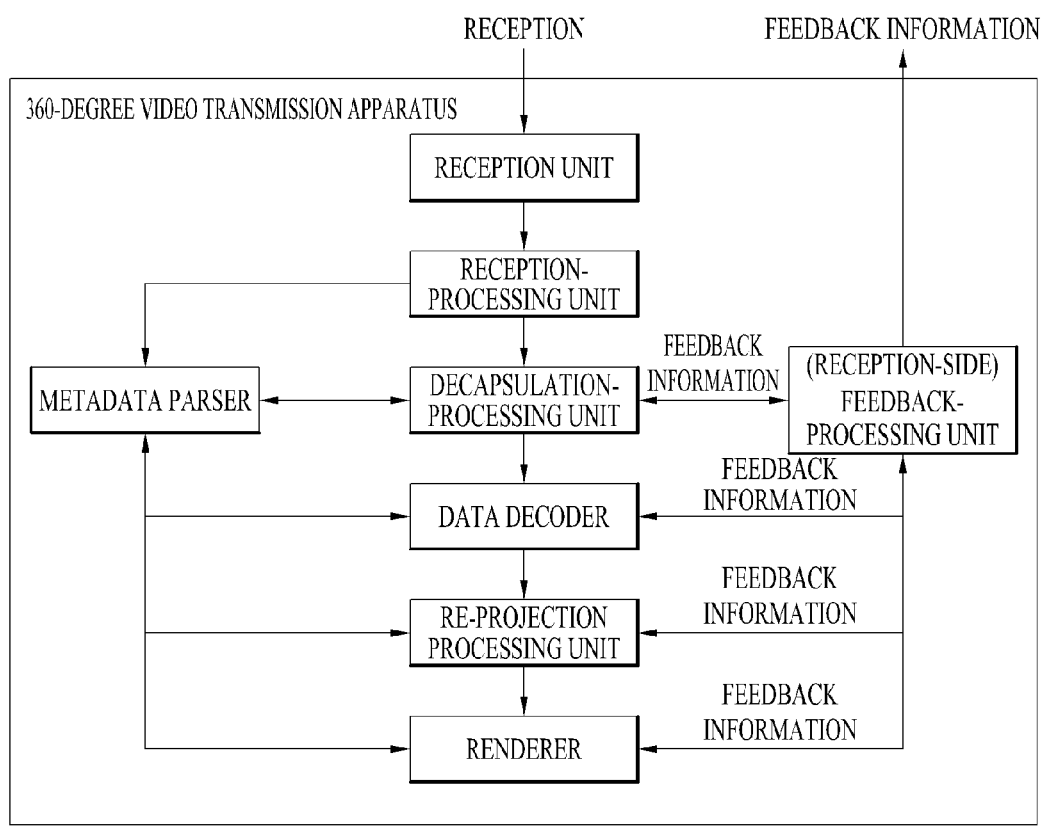
FIG. 3 is a view showing a 360-degree video reception apparatus according to another aspect of the present invention.

FIG. 3 is a view showing a 360-degree video reception apparatus according to another aspect of the present invention.

According to another aspect of the present invention, the present invention may be related to a 360-degree video reception apparatus. The 360-degree video reception apparatus according to the present invention may perform operations related to the processing process and/or the rendering process. The 360-degree video reception apparatus according to the present invention may include a reception unit, a reception-processor, a decapsulation-processor, a data decoder, a metadata parser, a (reception-side) feedback-processor, a reprojection processor, and/or a renderer as internal/external elements.

The reception unit may receive 360-degree video data transmitted by the 360-degree video transmission apparatus. Depending on the channel through which the 360-degree video data are transmitted, the reception unit may receive the 360-degree video data through a broadcast network, or may receive the 360-degree video data through a broadband connection.

The reception-processor may process the received 360-degree video data according to a transport protocol. In order to correspond to processing for transmission at the transmission side, the reception-processor may perform the reverse process of the transmission-processor. The reception-processor may deliver the acquired 360-degree video data to the decapsulation-processor, and may deliver the acquired 360-degree-video-related metadata to the metadata parser. The 360-degree-video-related metadata, acquired by the reception-processor, may have the form of a signaling table.

The decapsulation-processor may decapsulate the 360-degree video data, received in file form from the reception-processor. The decapsulation-processor may decapsulate the files based on ISOBMFF, etc. to acquire 360-degree video data and 360-degree-video-related metadata. The acquired 360-degree video data may be delivered to the data decoder, and the acquired 360-degree-video-related metadata may be delivered to the metadata parser. The 360-degree-video-related metadata, acquired by the decapsulation-processor, may have the form of a box or a track in a file format. As needed, the decapsulation-processor may receive metadata necessary for decapsulation from the metadata parser.

The data decoder may decode the 360-degree video data. The data decoder may receive metadata necessary for decoding from the metadata parser. The 360-degree-video-related metadata, acquired at the data decoding process, may be delivered to the metadata parser.

The metadata parser may parse/decode the 360-degree-video-related metadata. The metadata parser may deliver the acquired metadata to the decapsulation-processor, the data decoder, the reprojection processor, and/or the renderer.

The reprojection processor may reproject the decoded 360-degree video data. The reprojection processor may reproject the 360-degree video data in a 3D space. The 3D space may have different forms depending on the 3D models that are used. The reprojection processor may receive metadata for reprojection from the metadata parser. For example, the reprojection processor may receive information about the type of 3D model that is used and the details thereof from the metadata parser. In some embodiments, the reprojection processor may reproject, in the 3D space, only the portion of 360-degree video data that corresponds to a specific area in the 3D space using the metadata for reprojection.

The renderer may render the reprojected 360-degree video data. As previously described, the 360-degree video data may be expressed as being rendered in the 3D space. In the case in which two processes are performed simultaneously, the reprojection processor and the renderer may be incorporated such that the renderer can perform these processes. In some embodiments, the renderer may render only the portion that is being viewed by a user according to user's viewpoint information.

The user may view a portion of the rendered 360-degree video through a VR display. The VR display, which is a device that reproduces the 360-degree video, may be included in the 360-degree video reception apparatus (tethered), or may be connected to the 360-degree video reception apparatus (untethered).

In an embodiment of the 360-degree video reception apparatus according to the present invention, the 360-degree video reception apparatus may further include a (reception-side) feedback-processor and/or a network interface (not shown) as an internal/external element. The reception-side feedback-processor may acquire and process feedback information from the renderer, the reprojection processor, the data decoder, the decapsulation-processor, and/or the VR display. The feedback information may include viewport information, head orientation information, and gaze information. The network interface may receive the feedback information from the reception-side feedback-processor, and may transmit the same to the 360-degree video transmission apparatus.

As previously described, the feedback information may not only be delivered to the transmission side but may also be used at the reception side. The reception-side feedback-processor may deliver the acquired feedback information to the internal elements of the 360-degree video reception apparatus so as to be reflected at the rendering process. The reception-side feedback-processor may deliver the feedback information to the renderer, the reprojection processor, the data decoder, and/or the decapsulation-processor. For example, the renderer may first render the area that is being viewed by the user using the feedback information. In addition, the decapsulation-processor and the data decoder may first decapsulate and decode the area that is being viewed by the user or the area that will be viewed by the user.

The internal/external elements of the 360-degree video reception apparatus according to the present invention described above may be hardware elements that are realized as hardware. In some embodiments, the internal/external elements may be changed, omitted, replaced, or incorporated. In some embodiments, additional elements may be added to the 360-degree video reception apparatus.

According to another aspect of the present invention, the present invention may be related to a 360-degree video transmission method and a 360-degree video reception method. The 360-degree video transmission/reception method according to the present invention may be performed by the 360-degree video transmission/reception apparatus according to the present invention described above or embodiments of the apparatus.

Embodiments of the 360-degree video transmission/reception apparatus and transmission/reception method according to the present invention and embodiments of the internal/external elements thereof may be combined. For example, embodiments of the projection-processor and embodiments of the data encoder may be combined in order to provide a number of possible embodiments of the 360-degree video transmission apparatus. Such combined embodiments also fall within the scope of the present invention.

Figure 4:
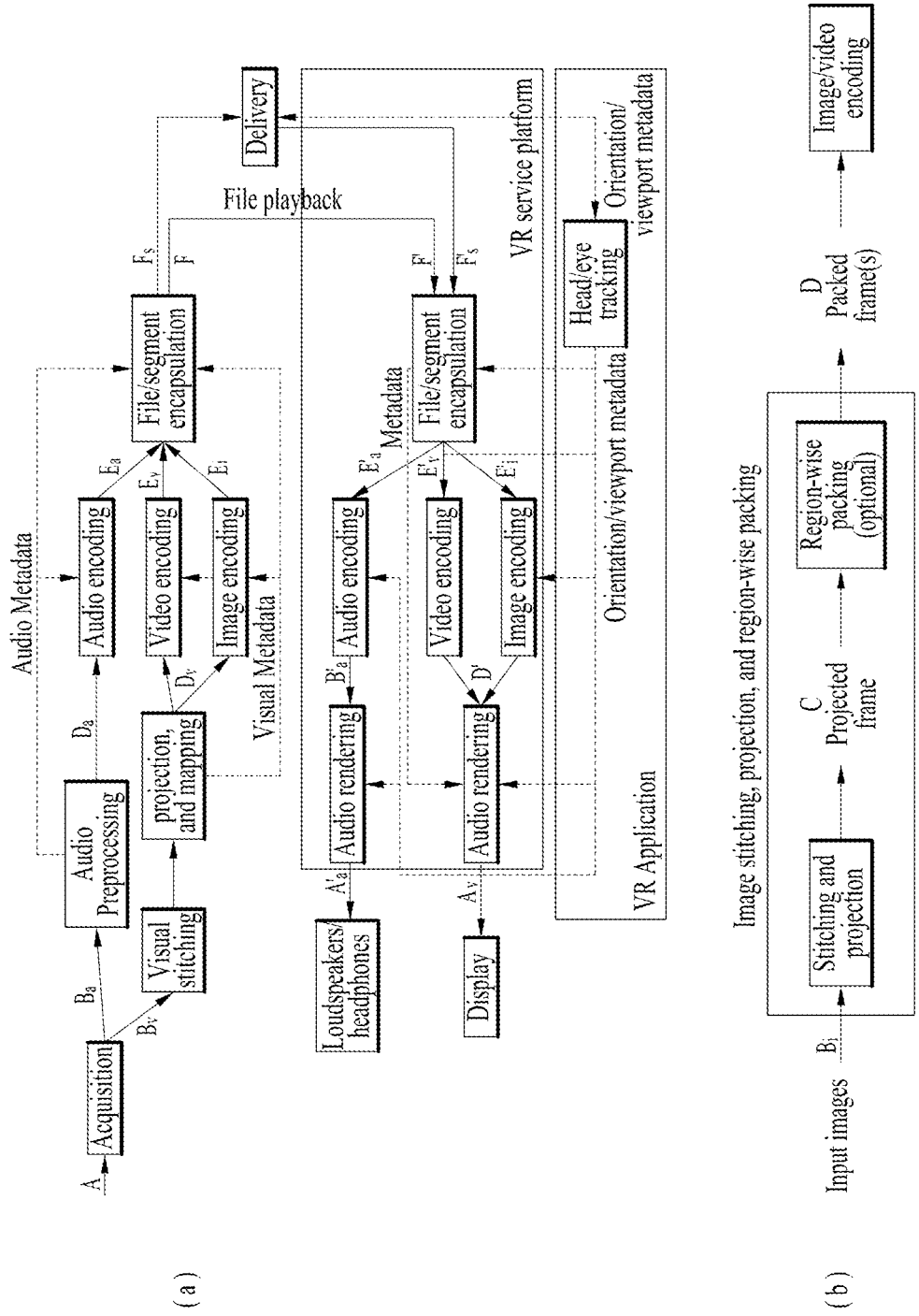
FIG. 4 is a view showing a 360-degree video transmission apparatus/360-degree video reception apparatus according to another embodiment of the present invention.

FIG. 4 is a view showing a 360-degree video transmission apparatus/360-degree video reception apparatus according to another embodiment of the present invention.

As previously described, 360-degree content may be provided through the architecture shown in FIG. 4(a). The 360-degree content may be provided in the form of a file, or may be provided in the form of segment-based download or streaming service, such as DASH. Here, the 360-degree content may be called VR content.

As previously described, 360-degree video data and/or 360-degree audio data may be acquired (Acquisition).

The 360-degree audio data may undergo an audio preprocessing process and an audio encoding process. In these processes, audio-related metadata may be generated. The encoded audio and the audio-related metadata may undergo processing for transmission (file/segment encapsulation).

The 360-degree video data may undergo the same processes as previously described.

The stitcher of the 360-degree video transmission apparatus may perform stitching on the 360-degree video data (Visual stitching). In some embodiments, this process may be omitted, and may be performed at the reception side. The projection-processor of the 360-degree video transmission apparatus may project the 360-degree video data on a 2D image (Projection and mapping (packing)).

The stitching and projection processes are shown in detail in FIG. 4(b). As shown in FIG. 4(b), when the 360-degree video data (input image) is received, stitching and projection may be performed. Specifically, at the projection process, the stitched 360-degree video data may be projected in a 3D space, and the projected 360-degree video data may be arranged on the 2D image. In this specification, this process may be expressed as projecting the 360-degree video data on the 2D image. Here, the 3D space may be a sphere or a cube. The 3D space may be the same as the 3D space used for reprojection at the reception side.

The 2D image may be called a projected frame C. Region-wise packing may be selectively performed on the 2D image. When region-wise packing is performed, the position, shape, and size of each region may be indicated such that the regions on the 2D image can be mapped on a packed frame D. When region-wise packing is not performed, the projected frame may be the same as the packed frame. The regions will be described below. The projection process and the region-wise packing process may be expressed as projecting the regions of the 360-degree video data on the 2D image. Depending on the design, the 360-degree video data may be directly converted into the packed frame without undergoing intermediate processes.

As shown in FIG. 4(a), the projected 360-degree video data may be image-encoded or video-encoded. Since even the same content may have different viewpoints, the same content may be encoded in different bit streams. The encoded 360-degree video data may be processed in a file format of ISOBMFF by the encapsulation-processor. Alternatively, the encapsulation-processor may process the encoded 360-degree video data into segments. The segments may be included in individual tracks for transmission based on DASH.

When the 360-degree video data are processed, 360-degree-video-related metadata may be generated, as previously described. The metadata may be delivered while being included in a video stream or a file format. The metadata may also be used at the encoding process, file format encapsulation, or processing for transmission.

The 360-degree audio/video data may undergo processing for transmission according to the transport protocol, and may then be transmitted. The 360-degree video reception apparatus may receive the same through a broadcast network or a broadband connection.

In FIG. 4(a), a VR service platform may correspond to one embodiment of the 360-degree video reception apparatus. In FIG. 4(a), Loudspeaker/headphone, display, and head/eye tracking components are shown as being performed by an external device of the 360-degree video reception apparatus or VR application. In some embodiments, the 360-degree video reception apparatus may include these components. In some embodiments, the head/eye tracking component may correspond to the reception-side feedback-processor.

The 360-degree video reception apparatus may perform file/segment decapsulation for reception on the 360-degree audio/video data. The 360-degree audio data may undergo audio decoding and audio rendering, and may then be provided to a user through the loudspeaker/headphone component.

The 360-degree video data may undergo image decoding or video decoding and visual rendering, and may then be provided to the user through the display component. Here, the display component may be a display that supports VR or a general display.

As previously described, specifically, the rendering process may be expressed as reprojecting the 360-degree video data in the 3D space and rendering the reprojected 360-degree video data. This may also be expressed as rendering the 360-degree video data in the 3D space.

The head/eye tracking component may acquire and process head orientation information, gaze information, and viewport information of the user, which have been described previously.

A VR application that communicates with the reception-side processes may be provided at the reception side.

FIG. 5 is a view showing the concept of principal aircraft axes for describing 3D space in connection with the present invention.

In the present invention, the concept of principal aircraft axes may be used in order to express a specific point, position, direction, distance, area, etc. in the 3D space.

That is, in the present invention, the 3D space before projection or after reprojection may be described, and the concept of principal aircraft axes may be used in order to perform signaling thereon. In some embodiments, a method of using X, Y, and Z-axis concepts or a spherical coordinate system may be used.

An aircraft may freely rotate in three dimensions. Axes constituting the three dimensions are referred to as a pitch axis, a yaw axis, and a roll axis. In this specification, these terms may also be expressed either as pitch, yaw, and roll or as a pitch direction, a yaw direction, and a roll direction.

The pitch axis may be an axis about which the forward portion of the aircraft is rotated upwards/downwards. In the shown concept of principal aircraft axes, the pitch axis may be an axis extending from one wing to another wing of the aircraft.

The yaw axis may be an axis about which the forward portion of the aircraft is rotated leftwards/rightwards. In the shown concept of principal aircraft axes, the yaw axis may be an axis extending from the top to the bottom of the aircraft.

In the shown concept of principal aircraft axes, the roll axis may be an axis extending from the forward portion to the tail of the aircraft. Rotation in the roll direction may be rotation performed about the roll axis.

As previously described, the 3D space in the present invention may be described using the pitch, yaw, and roll concept.

FIG. 6 is a view showing projection schemes according to an embodiment of the present invention.

As previously described, the projection-processor of the 360-degree video transmission apparatus according to the present invention may project the stitched 360-degree video data on the 2D image. In this process, various projection schemes may be used.

In another embodiment of the 360-degree video transmission apparatus according to the present invention, the projection-processor may perform projection using a cubic projection scheme. For example, the stitched 360-degree video data may appear on a spherical surface. The projection-processor may project the 360-degree video data on the 2D image in the form of a cube. The 360-degree video data on the spherical surface may correspond to respective surfaces of the cube. As a result, the 360-degree video data may be projected on the 2D image, as shown at the left side or the right side of FIG. 6(a).

In another embodiment of the 360-degree video transmission apparatus according to the present invention, the projection-processor may perform projection using a cylindrical projection scheme. In the same manner, on the assumption that the stitched 360-degree video data appear on a spherical surface, the projection-processor may project the 360-degree video data on the 2D image in the form of a cylinder. The 360-degree video data on the spherical surface may correspond to the side, the top, and the bottom of the cylinder. As a result, the 360-degree video data may be projected on the 2D image, as shown at the left side or the right side of FIG. 6(b).

In a further embodiment of the 360-degree video transmission apparatus according to the present invention, the projection-processor may perform projection using a pyramidal projection scheme. In the same manner, on the assumption that the stitched 360-degree video data appears on a spherical surface, the projection-processor may project the 360-degree video data on the 2D image in the form of a pyramid. The 360-degree video data on the spherical surface may correspond to the front, the left top, the left bottom, the right top, and the right bottom of the pyramid. As a result, the 360-degree video data may be projected on the 2D image, as shown at the left side or the right side of FIG. 6(c).

In some embodiments, the projection-processor may perform projection using an equirectangular projection scheme or a panoramic projection scheme, in addition to the above-mentioned schemes.

As previously described, the regions may be divided parts of the 2D image on which the 360-degree video data are projected. The regions do not necessarily coincide with respective surfaces on the 2D image projected according to the projection scheme. In some embodiments, however, the regions may be partitioned so as to correspond to the projected surfaces on the 2D image such that region-wise packing can be performed. In some embodiments, a plurality of surfaces may correspond to a single region, and a single surface corresponds to a plurality of regions. In this case, the regions may be changed depending on the projection scheme. For example, in FIG. 6(a), the respective surfaces (top, bottom, front, left, right, and back) of the cube may be respective regions. In FIG. 6(b), the side, the top, and the bottom of the cylinder may be respective regions. In FIG. 6(c), the front and the four-directional lateral surfaces (left top, left bottom, right top, and right bottom) of the pyramid may be respective regions.

FIG. 7 is a view showing a tile according to an embodiment of the present invention.

The 360-degree video data projected on the 2D image or the 360-degree video data that have undergone region-wise packing may be partitioned into one or more tiles. FIG. 7(a) shows a 2D image divided into 16 tiles. Here, the 2D image may be the projected frame or the packed frame. In another embodiment of the 360-degree video transmission apparatus according to the present invention, the data encoder may independently encode the tiles.

Region-wise packing and tiling may be different from each other. Region-wise packing may be processing each region of the 360-degree video data projected on the 2D image in order to improve coding efficiency or to adjust resolution. Tiling may be the data encoder dividing the projected frame or the packed frame into tiles and independently encoding the tiles. When the 360-degree video data are provided, the user does not simultaneously enjoy all parts of the 360-degree video data. Tiling may enable the user to enjoy or transmit only tiles corresponding to an important part or a predetermined part, such as the viewport that is being viewed by the user, to the reception side within a limited bandwidth. The limited bandwidth may be more efficiently utilized through tiling, and calculation load may be reduced because the reception side does not process the entire 360-degree video data at once.

Since the regions and the tiles are different from each other, the two areas are not necessarily the same. In some embodiments, however, the regions and the tiles may indicate the same areas. In some embodiments, region-wise packing may be performed based on the tiles, whereby the regions and the tiles may become the same. Also, in some embodiments, in the case in which the surfaces according to the projection scheme and the regions are the same, the surface according to the projection scheme, the regions, and the tiles may indicate the same areas. Depending on the context, the regions may be called VR regions, and the tiles may be called tile regions.

A region of interest (ROI) may be an area in which users are interested, proposed by a 360-degree content provider. The 360-degree content provider may produce a 360-degree video in consideration of the area of the 360-degree video in which users are interested. In some embodiments, the ROI may correspond to an area of the 360-degree video in which an important portion of the 360-degree video is shown.

In another embodiment of the 360-degree video transmission/reception apparatus according to the present invention, the reception-side feedback-processor may extract and collect viewport information, and may deliver the same to the transmission-side feedback-processor. At this process, the viewport information may be delivered using the network interfaces of both sides. FIG. 7(a) shows a viewport t6010 displayed on the 2D image. Here, the viewport may be located over 9 tiles on the 2D image.

In this case, the 360-degree video transmission apparatus may further include a tiling system. In some embodiments, the tiling system may be disposed after the data encoder (see FIG. 7(b)), may be included in the data encoder or the transmission-processor, or may be included in the 360-degree video transmission apparatus as a separate internal/external element.

The tiling system may receive the viewport information from the transmission-side feedback-processor. The tiling system may select and transmit only tiles including the viewport area. In the FIG. 7(a), 9 tiles including the viewport area t6010, among a total of 16 tiles of the 2D image, may be transmitted. Here, the tiling system may transmit the tiles in a unicast manner over a broadband connection. The reason for this is that the viewport area may be changed for respective people.

Also, in this case, the transmission-side feedback-processor may deliver the viewport information to the data encoder. The data encoder may encode the tiles including the viewport area at higher quality than other tiles.

Also, in this case, the transmission-side feedback-processor may deliver the viewport information to the metadata-processor. The metadata-processor may deliver metadata related to the viewport area to the internal elements of the 360-degree video transmission apparatus, or may include the same in the 360-degree-video-related metadata.

By using this tiling system, it is possible to save transmission bandwidth and to differently perform processing for each tile, whereby efficient data processing/transmission is possible.

Embodiments related to the viewport area may be similarly applied to specific areas other than the viewport area. For example, processing performed on the viewport area may be equally performed on an area in which users are determined to be interested through the gaze analysis, ROI, and an area that is reproduced first when a user views the 360-degree video through the VR display (initial viewpoint).

In another embodiment of the 360-degree video transmission apparatus according to the present invention, the transmission-processor may perform transmission processing differently for respective tiles. The transmission-processor may apply different transport parameters (modulation order, code rate, etc.) to the tiles such that robustness of data delivered for each region is changed.

At this time, the transmission-side feedback-processor may deliver the feedback information, received from the 360-degree video reception apparatus, to the transmission-processor, which may perform transmission processing differently for respective tiles. For example, the transmission-side feedback-processor may deliver the viewport information, received from the reception side, to the transmission-processor. The transmission-processor may perform transmission processing on tiles including the viewport area so as to have higher robustness than for the other tiles.

FIG. 8 is a view showing 360-degree-video-related metadata according to an embodiment of the present invention.

The 360-degree-video-related metadata may include various metadata for the 360-degree video. Depending on the context, the 360-degree-video-related metadata may be called 360-degree-video-related signaling information. The 360-degree-video-related metadata may be transmitted while being included in a separate signaling table, or may be transmitted while being included in DASH MPD, or may be transmitted while being included in the form of a box in a file format of ISOBMFF. In the case in which the 360-degree-video-related metadata are included in the form of a box, the metadata may be included in a variety of levels, such as a file, a fragment, a track, a sample entry, and a sample, and may include metadata related to data of a corresponding level.

In some embodiments, a portion of the metadata, a description of which will follow, may be transmitted while being configured in the form of a signaling table, and the remaining portion of the metadata may be included in the form of a box or a track in a file format.

In an embodiment of the 360-degree-video-related metadata according to the present invention, the 360-degree-video-related metadata may include basic metadata about projection schemes, stereoscopy-related metadata, initial-view/initial-viewpoint-related metadata, ROI-related metadata, field-of-view (FOV)-related metadata, and/or cropped-region-related metadata. In some embodiments, the 360-degree-video-related metadata may further include metadata other than the above metadata.

Embodiments of the 360-degree-video-related metadata according to the present invention may include at least one of the basic metadata, the stereoscopy-related metadata, the initial-view-related metadata, the ROI-related metadata, the FOV-related metadata, the cropped-region-related metadata, and/or additional possible metadata. Embodiments of the 360-degree-video-related metadata according to the present invention may be variously configured depending on possible number of metadata included therein. In some embodiments, the 360-degree-video-related metadata may further include additional information.

The basic metadata may include 3D-model-related information and projection-scheme-related information. The basic metadata may include a vr_geometry field and a projection_scheme field. In some embodiments, the basic metadata may include additional information.

The vr_geometry field may indicate the type of 3D model supported by the 360-degree video data. In the case in which the 360-degree video data is reprojected in a 3D space, as previously described, the 3D space may have a form based on the 3D model indicated by the vr_geometry field. In some embodiments, a 3D model used for rendering may be different from a 3D model used for reprojection indicated by the vr_geometry field. In this case, the basic metadata may further include a field indicating the 3D model used for rendering. In the case in which the field has a value of 0, 1, 2, or 3, the 3D space may follow a 3D model of a sphere, a cube, a cylinder, or a pyramid. In the case in which the field has additional values, the values may be reserved for future use. In some embodiments, the 360-degree-video-related metadata may further include detailed information about the 3D model indicated by the field. Here, the detailed information about the 3D model may be radius information of the sphere or the height information of the cylinder. This field may be omitted.

The projection_scheme field may indicate the projection scheme used when the 360-degree video data is projected on a 2D image. In the case in which the field has a value of 0, 1, 2, 3, 4, or 5, this may indicate that an equirectangular projection scheme, a cubic projection scheme, a cylindrical projection scheme, a tile-based projection scheme, a pyramidal projection scheme, or a panoramic projection scheme has been used. In the case in which the field has a value of 6, this may indicate that the 360-degree video data has been projected on a 2D image without stitching. In the case in which the field has additional values, the values may be reserved for future use. In some embodiments, the 360-degree-video-related metadata may further include detailed information about regions generated by the projection scheme specified by the field. Here, the detailed information about the regions may be rotation of the regions or radius information of the top region of the cylinder.

The stereoscopy-related metadata may include information about 3D-related attributes of the 360-degree video data. The stereoscopy-related metadata may include an is_stereoscopic field and/or a stereo_mode field. In some embodiments, the stereoscopy-related metadata may further include additional information.

The is_stereoscopic field may indicate whether the 360-degree video data support 3D. When the field is 1, this may mean 3D support. When the field is 0, this may mean 3D non-support. This field may be omitted.

The stereo_mode field may indicate a 3D layout supported by the 360-degree video. It is possible to indicate whether the 360-degree video supports 3D using only this field. In this case, the is_stereoscopic field may be omitted. When the field has a value of 0, the 360-degree video may have a mono mode. That is, the 2D image, on which the 360-degree video is projected, may include only one mono view. In this case, the 360-degree video may not support 3D.

When the field has a value of 1 or 2, the 360-degree video may follow a left-right layout or a top-bottom layout. The left-right layout and the top-bottom layout may be called a side-by-side format and a top-bottom format, respectively. In the left-right layout, 2D images on which a left image/a right image are projected may be located at the left/right side on an image frame. In the top-bottom layout, 2D images on which a left image/a right image are projected may be located at the top/bottom side on the image frame. In the case in which the field has additional values, the values may be reserved for future use.

The initial-view-related metadata may include information about the time at which a user views the 360-degree video when the 360-degree video is reproduced first (an initial viewpoint). The initial-view-related metadata may include an initial_view_yaw_degree field, an initial_view_pitch_degree field, and/or an initial_view_roll_degree field. In some embodiments, the initial-view-related metadata may further include additional information.

The initial_view_yaw_degree field, the initial_view_pitch_degree field, and the initial_view_roll_degree field may indicate an initial viewpoint when the 360-degree video is reproduced. That is, the very center point of the viewport that is viewed first at the time of reproduction may be indicated by these three fields. The fields may indicate the position of the right center point as the rotational direction (symbol) and the extent of rotation (angle) about the yaw, pitch, and roll axes. At this time, the viewport that is viewed when the video is reproduced first according to the FOV may be determined. The horizontal length and the vertical length (width and height) of an initial viewport based on the indicated initial viewpoint through the FOV may be determined. That is, the 360-degree video reception apparatus may provide a user with a predetermined area of the 360-degree video as an initial viewport using these three fields and the FOV information.

In some embodiments, the initial viewpoint indicated by the initial-view-related metadata may be changed for each scene. That is, the scenes of the 360-degree video may be changed over time. An initial viewpoint or an initial viewport at which the user views the video first may be changed for every scene of the 360-degree video. In this case, the initial-view-related metadata may indicate the initial viewport for each scene. To this end, the initial-view-related metadata may further include a scene identifier identifying the scene to which the initial viewport is applied. In addition, the FOV may be changed for each scene. The initial-view-related metadata may further include scene-wise FOV information indicating the FOV corresponding to the scene.

The ROI-related metadata may include information related to the ROI. The ROI-related metadata may a 2d_roi_range_flag field and/or a 3d_roi_range_flag field. Each of the two fields may indicate whether the ROI-related metadata includes fields expressing the ROI based on the 2D image or whether the ROI-related metadata includes fields expressing the ROI based on the 3D space. In some embodiments, the ROI-related metadata may further include additional information, such as differential encoding information based on the ROI and differential transmission processing information based on the ROI.

In the case in which the ROI-related metadata includes fields expressing the ROI based on the 2D image, the ROI-related metadata may include a min_top_left_x field, a max_top_left_x field, a min_top_left_y field, a max_top_left_y field, a min_width field, a max_width field, a min_height field, a max_height field, a min_x field, a max_x field, a min_y field, and/or a max_y field.

The min_top_left_x field, the max_top_left_x field, the min_top_left_y field, and the max_top_left_y field may indicate the minimum/maximum values of the coordinates of the left top end of the ROI. These fields may indicate the minimum x coordinate, the maximum x coordinate, the minimum y coordinate, and the maximum y coordinate of the left top end, respectively.

The min_width field, the max_width field, the min_height field, and the max_height field may indicate the minimum/maximum values of the horizontal size (width) and the vertical size (height) of the ROI. These fields may indicate the minimum value of the horizontal size, the maximum value of the horizontal size, the minimum value of the vertical size, and the maximum value of the vertical size, respectively.

The min_x field, the max_x field, the min_y field, and the max_y field may indicate the minimum/maximum values of the coordinates in the ROI. These fields may indicate the minimum x coordinate, the maximum x coordinate, the minimum y coordinate, and the maximum y coordinate of the coordinates in the ROI, respectively. These fields may be omitted.

In the case in which the ROI-related metadata includes fields expressing the ROI based on the coordinates in the 3D rendering space, the ROI-related metadata may include a min_yaw field, a max_yaw field, a min_pitch field, a max_pitch field, a min_roll field, a max_roll field, a min_field_of_view field, and/or a max_field_of_view field.

The min_yaw field, the max_yaw field, the min_pitch field, the max_pitch field, the min_roll field, and the max_roll field may indicate the area that the ROI occupies in 3D space as the minimum/maximum values of yaw, pitch, and roll. These fields may indicate the minimum value of the amount of rotation about the yaw axis, the maximum value of the amount of rotation about the yaw axis, the minimum value of the amount of rotation about the pitch axis, the maximum value of the amount of rotation about the pitch axis, the minimum value of the amount of rotation about the roll axis, and the maximum value of the amount of rotation about the roll axis, respectively.

The min_field_of_view field and the max_field_of_view field may indicate the minimum/maximum values of the FOV of the 360-degree video data. The FOV may be a range of vision within which the 360-degree video is displayed at once when the video is reproduced. The min_field_of_view field and the max_field_of_view field may indicate the minimum value and the maximum value of the FOV, respectively. These fields may be omitted. These fields may be included in FOV-related metadata, a description of which will follow.

The FOV-related metadata may include the above information related to the FOV. The FOV-related metadata may include a content_fov_flag field and/or a content_fov field. In some embodiments, the FOV-related metadata may further include additional information, such as information related to the minimum/maximum values of the FOV.

The content_fov_flag field may indicate whether information about the FOV of the 360-degree video intended at the time of production exists. When the value of this field is 1, the content_fov field may exist.

The content_fov field may indicate information about the FOV of the 360-degree video intended at the time of production. In some embodiments, the portion of the 360-degree video that is displayed to a user at once may be determined based on the vertical or horizontal FOV of the 360-degree video reception apparatus. Alternatively, in some embodiments, the portion of the 360-degree video that is displayed to the user at once may be determined in consideration of the FOV information of this field.

The cropped-region-related metadata may include information about the area of an image frame that includes actual 360-degree video data. The image frame may include an active video area, in which actual 360-degree video data is projected, and an inactive video area. Here, the active video area may be called a cropped area or a default display area. The active video area is an area that is seen as the 360-degree video in an actual VR display. The 360-degree video reception apparatus or the VR display may process/display only the active video area. For example, in the case in which the aspect ratio of the image frame is 4:3, only the remaining area of the image frame, excluding a portion of the upper part and a portion of the lower part of the image frame, may include the 360-degree video data. The remaining area of the image frame may be the active video area.

The cropped-region-related metadata may include an is_cropped_region field, a cr_region_left_top_x field, a cr_region_left_top_y field, a cr_region_width field, and/or a cr_region_height field. In some embodiments, the cropped-region-related metadata may further include additional information.

The is_cropped_region field may be a flag indicating whether the entire area of the image frame is used by the 360-degree video reception apparatus or the VR display. That is, this field may indicate whether the entire image frame is the active video area. In the case in which only a portion of the image frame is the active video area, the following four fields may be further included.

The cr_region_left_top_x field, the cr_region_left_top_y field, the cr_region_width field, and the cr_region_height field may indicate the active video area in the image frame. These fields may indicate the x coordinate of the left top of the active video area, the y coordinate of the left top of the active video area, the horizontal length (width) of the active video area, and the vertical length (height) of the active video area, respectively. The horizontal length and the vertical length may be expressed using pixels.

As described above, the 360-degree-video-related signaling information or metadata may be transmitted while being included in a randomly defined signaling table, or may be transmitted while being included in a file format of ISOBMFF or Common File Format in the form of a box, or may be transmitted while being included in DASH MPD. Also, the 360-degree media data may be transmitted while being included in the file format or DASH segment.

FIG. 9 is a view showing a viewpoint and viewing position additionally defined in a 3DoF+ VR system.

The 360-degree video based VR system of the present invention may provide visual/auditory experiences for different viewing orientations based on a position of a user for 360-degree video. This method may be referred to as 3DoF (three degree of freedom) plus. In detail, the VR system that provides visual/auditory experiences for different orientations in a fixed position of a user may be referred to as a 3DoF based VR system.

Meanwhile, the VR system that may provide extended visual/auditory experiences for different orientations in different viewpoints and different viewing positions at the same time zone may be referred to as a 3DoF+ or 3DoF plus based VR system.

Supposing a space such as (a) (example of art center), different positions (example of art center marked with a red circle) may be considered as the respective viewpoints. At this time, video/audio provided by the respective viewpoints existing in the same space as example may have the same time flow.

In this case, different visual/auditory experiences may be provided in accordance with a viewpoint change (head motion) of a user in a specific position. That is, spheres of various viewing positions may be assumed as shown in (b) for a specific viewpoint, and video/audio/text information in which a relative position of each viewpoint is reflected may be provided.

Meanwhile, visual/auditory information of various orientations such as the existing 3DoF may be delivered at a specific viewpoint of a specific position as shown in (c). In this case, additional various sources as well as main sources (video/audio/text) may be provided in combination, and this may be associated with a viewing orientation of a user or information may be delivered independently.

Figure 10:
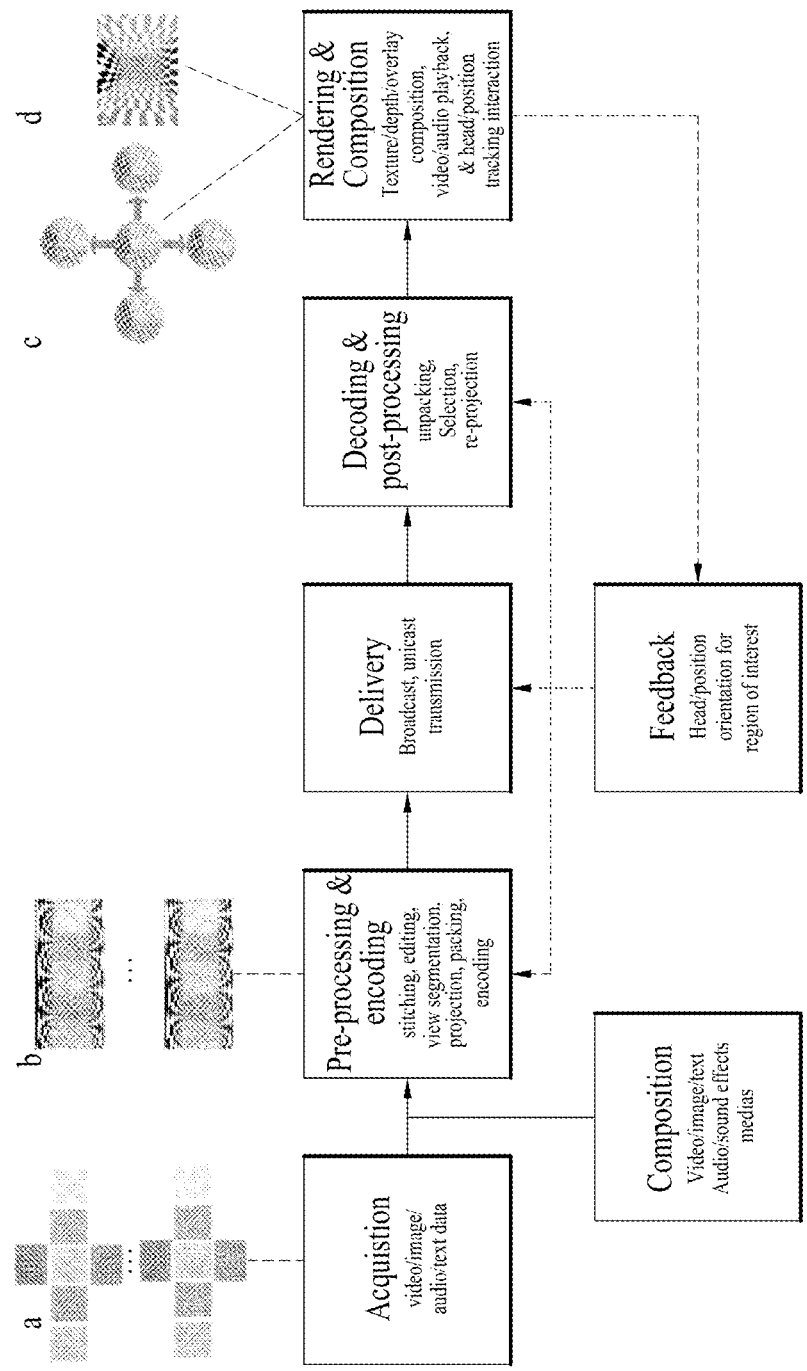
FIG. 10 is a view showing a method for implementing 360-degree video signal processing and related transmission apparatus/reception apparatus based on 3DoF+ system.

FIG. 10 is a view showing a method for implementing 360-degree video signal processing and related transmission apparatus/reception apparatus based on 3DoF+ system.

FIG. 10 is an example of 3DoF+ end-to-end system flow chart including video acquisition, pre-processing, transmission, (post)processing, rendering and feedback processes of 3DoF+.

Acquisition: may mean a process of acquiring 360-degree video through capture, composition or generation of 360-degree video. Various kinds of video/audio information according to head motion may be acquired for a plurality of positions through this process. In this case, video information may include depth information as well as visual information (texture). At this time, a plurality of kinds of information of different viewing positions according to different viewpoints may be acquired like example of video information of a.

Composition: may define a method for composition to include video (video/image, etc.) through external media, voice (audio/effect sound, etc.) and text (caption, etc.) as well as information acquired through the video/audio input module in user experiences.

Pre-processing: is a preparation (pre-processing) process for transmission/delivery of the acquired 360-degree video, and may include stitching, projection, region wise packing and/or encoding process. That is, this process may include pre-processing and encoding processes for modifying/complementing data such as video/audio/text information in accordance with a producer's intention. For example, the pre-processing process of the video may include mapping (stitching) of the acquired visual information onto 360 sphere, editing such as removing a region boundary, reducing difference in color/brightness or providing visual effect of video, view segmentation according to viewpoint, a projection for mapping video on 360 sphere into 2D image, region-wise packing for rearranging video in accordance with a region, and encoding for compressing video information. A plurality of projection videos of different viewing positions according to different viewpoints may be generated like example in view of video of B.

Delivery: may mean a process of processing and transmitting video/audio data and metadata subjected to the preparation process (pre-processing). As a method for delivering a plurality of video/audio data and related metadata of different viewing positions according to different viewpoints, a broadcast network or a communication network may be used, or unidirectional delivery method may be used.

Post-processing & composition: may mean a post-processing process for decoding and finally reproducing received/stored video/audio/text data. For example, the post-processing process may include unpacking for unpacking a packed video and reprojection for restoring 2D projected image to 3D sphere image as described above.

Rendering: may mean a process of rendering and displaying reprojected image/video data on a 3D space. In this process, the process may be reconfigured to finally output video/audio signals. A viewing orientation, viewing position/head position and viewpoint, in which a user's region of interest exists, may be subjected to tracking, and necessary video/audio/text information may selectively be used in accordance with this information. At this time, in case of video signal, different viewing positions may be selected in accordance with the user's region of interest as shown in c, and video in a specific orientation of a specific viewpoint at a specific position may finally be output as shown in d.

Feedback: may mean a process of delivering various kinds of feedback information, which can be acquired during a display process, to a transmission side. In this embodiment, a viewing orientation, a viewing position, and a viewpoint, which corresponds to a user's region of interest, may be estimated, and feedback may be delivered to reproduce video/audio based on the estimated result.

FIG. 11 is a view showing an architecture of a 3DoF+ end-to-end system.

FIG. 11 is an example of a 3DoF+ end-to-end system architecture. As described in the architecture of FIG. 11, 3DoF+ 360 contents may be provided.

The 360-degree video transmission apparatus may include an acquisition unit for acquiring 360-degree video (image)/audio data, a video/audio pre-processor for processing the acquired data, a composition generation unit for composing additional information an encoding unit for encoding text, audio and projected 360-degree video, and an encapsulation unit for encapsulating the encoded data. As described above, the encapsulated data may be output in the form of bitstreams. The encoded data may be encapsulated in a file format such as ISOBMFF and CFF, or may be processed in the form of other DASH segment. The encoded data may be delivered to the 360-degree video reception apparatus through a digital storage medium. Although not shown explicitly, the encoded data may be subjected to processing for transmission through the transmission-processor and then transmitted through a broadcast network or a broadband, as described above.

The data acquisition unit may simultaneously or continuously acquire different kinds of information in accordance with sensor orientation (viewing orientation in view of video), information acquisition timing of a sensor (sensor position, or viewing position in view of video), and information acquisition position of a sensor (viewpoint in case of video). At this time, video, image, audio and position information may be acquired.

In case of video data, texture and depth information may respectively be acquired, and video pre-processing may be performed in accordance with characteristic of each component. For example, in case of the text information, 360-degree omnidirectional video may be configured using videos of different orientations of the same viewing position, which are acquired at the same viewpoint using image sensor position information. To this end, video stitching may be performed. Also, projection and/or region wise packing for modifying the video to a format for encoding may be performed. In case of depth image, the image may generally be acquired through a depth camera. In this case, the depth image may be made in the same format such as texture. Alternatively, depth data may be generated based on data measured separately. After image per component is generated, additional conversion (packing) to a video format for efficient compression may be performed, or a sub-picture generation for reconfiguring the images by segmentation into sub-pictures which are actually necessary may be performed. Information on image configuration used in a video pre-processing end is delivered as video metadata.

If video/audio/text information additionally given in addition to the acquired data (or data for main service) are together served, it is required to provide information for composing these kinds of information during final reproduction. The composition generation unit generates information for composing externally generated media data (video/image in case of video, audio/effect sound in case of audio, and caption in case of text) at a final reproduction end based on a producer's intention, and this information is delivered as composition data.

The video/audio/text information subjected to each processing is compressed using each encoder, and encapsulated on a file or segment basis in accordance with application. At this time, only necessary information may be extracted (file extractor) in accordance with a method for configuring video, file or segment.

Also, information for reconfiguring each data in the receiver is delivered at a codec or file format/system level, and in this case, the information includes information (video/audio metadata) for video/audio reconfiguration, composition information (composition metadata) for overlay, viewpoint capable of reproducing video/audio and viewing position information according to each viewpoint (viewing position and viewpoint metadata), etc. This information may be processed through a separate metadata processor.

The 360-degree video reception apparatus may include a file/segment decapsulation unit for decapsulating a received file and segment, a decoding unit for generating video/audio/text information from bitstreams, a post-processor for reconfiguring the video/audio/text in the form of reproduction, a tracking unit for tracking a user's region of interest, and a display which is a reproduction unit.

The bitstreams generated through decapsulation may be segmented into video/audio/text in accordance with types of data and separately decoded to be reproduced.

The tracking unit generates viewpoint of a user's region of interest, viewing position at the corresponding viewpoint, and viewing orientation information at the corresponding viewing position based on a sensor and the user's input information. This information may be used for selection or extraction of a region of interest in each module of the 360-degree video reception apparatus, or may be used for a post-processing process for emphasizing information of the region of interest. Also, if this information is delivered to the 360-degree video transmission apparatus, this information may be used for file selection (file extractor) or subpicture selection for efficient bandwidth use, and may be used for various video reconfiguration methods based on a region of interest (viewport/viewing position/viewpoint dependent processing).

The decoded video signal may be processed in accordance with various processing methods of the video configuration method. If image packing is performed in the 360-degree video transmission apparatus, a process of reconfiguring video is required based on the information delivered through metadata. In this case, video metadata generated by the 360-degree video transmission apparatus may be used. Also, if videos of a plurality of viewpoints or a plurality of viewing positions or various orientations are included in the decoded video, information matched with viewpoint, viewing position, and orientation information of the user's region of interest, which are generated through tracking, may be selected and processed. At this time, viewing position and viewpoint metadata generated at the transmission side may be used. Also, if a plurality of components are delivered for a specific position, viewpoint and orientation or video information for overlay is separately delivered, a rendering process for each of the data and information may be included. The video data (texture, depth and overlay) subjected to a separate rendering process may be subjected to a composition process. At this time, composition metadata generated by the transmission side may be used. Finally, information for reproduction in viewport may be generated in accordance with the user's region of interest.

The decoded audio signal may be generated as an audio signal capable of being reproduced, through an audio renderer and/or the post-processing process. At this time, information suitable for the user's request may be generated based on the information on the user's region of interest and the metadata delivered to the 360-degree video reception apparatus.

The decoded text signal may be delivered to an overlay renderer and processed as overlay information based on text such as subtitle. A separate text post-processing process may be included if necessary.

FIG. 12 is a view showing an architecture of a Frame for Live Uplink Streaming (FLUS).

The detailed blocks of the transmission side and the reception side may be categorized into functions of a source and a sink in FLUS (Framework for Live Uplink Streaming). In this case, the information acquisition unit may implement the function of the source, implement the function of the sink on a network, or implement source/sink within a network node, as follows. The network node may include a user equipment (UE). The UE may include the aforementioned 360-degree video transmission apparatus or the aforementioned 360-degree reception apparatus.

A transmission and reception processing process based on the aforementioned architecture may be described as follows. The following transmission and reception processing process is described based on the video signal processing process. If the other signals such as audio or text are processed, a portion marked with italic may be omitted or may be processed by being modified to be suitable for audio or text processing process.

FIG. 13 is a view showing a configuration of 3DoF+ transmission side.

The transmission side (360-degree video transmission apparatus) may perform stitching for sphere image configuration per viewpoint/viewing position/component if input data are images output through a camera. If sphere images per viewpoint/viewing position/component are configured, the transmission side may perform projection for coding in 2D image. The transmission side may generate a plurality of images as sub-pictures of a packing or segmented region for making an integrated image in accordance with application. As described above, the region wise packing process is an optional process, and may not be performed. In this case, the packing process may be omitted. If the input data are video/audio/text additional information, a method for displaying additional information by adding the additional information to a center image may be notified, and the additional data may be transmitted together. The encoding process for compressing the generated images and the added data to generate bitstreams may be performed and then the encapsulation process for converting the bitstreams to a file format for transmission or storage may be performed. At this time, a process of extracting a file requested by the reception side may be processed in accordance with application or request of the system. The generated bitstreams may be converted to the transport format through the transmission-processor and then transmitted. At this time, the feedback processor of the transmission side may process viewpoint/viewing position/orientation information and necessary metadata based on the information delivered from the reception side and deliver the information to the related transmission side so that the transmission side may process the corresponding data.

FIG. 14 is a view showing a configuration of 3DoF+ reception side.

The reception side (360-degree video reception apparatus) may extract a necessary file after receiving the bitstreams delivered from the transmission side. The reception side may select bitstreams in the generated file format by using the viewpoint/viewing position/orientation information delivered from the feedback processor and reconfigure the selected bitstreams as image information through the decoder. The reception side may perform unpacking for the packed image based on packing information delivered through the metadata. If the packing process is omitted in the transmission side, unpacking of the reception side may also be omitted. Also, the reception side may perform a process of selecting images suitable for the viewpoint/viewing position/orientation information delivered from the feedback processor and necessary components if necessary. The reception side may perform a rendering process of reconfiguring texture, depth and overlay information of images as a format suitable for reproduction. The reception side may perform a composition process for composing information of different layers before generating a final image, and may generate and reproduce an image suitable for a display viewport.

Figure 15:
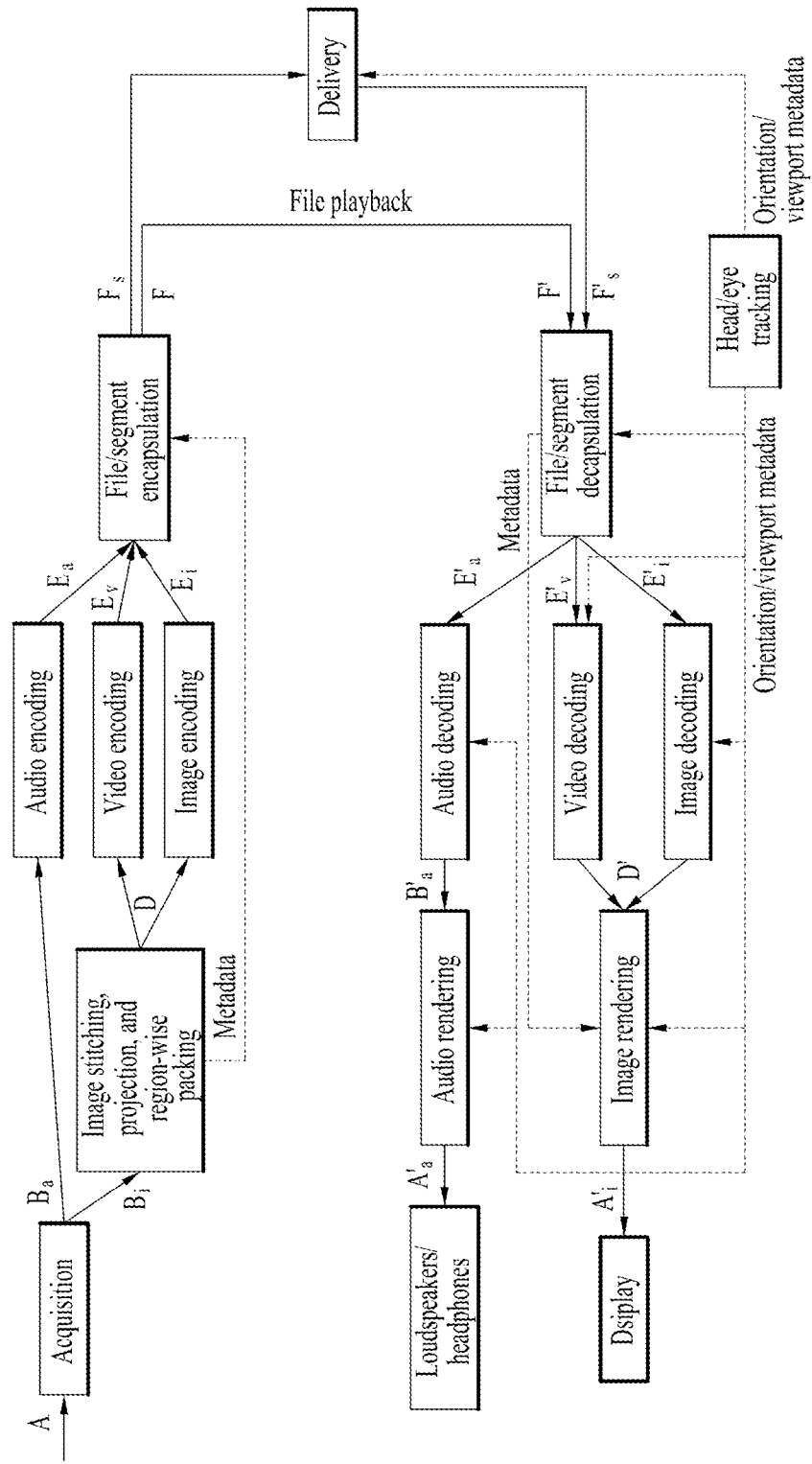
FIG. 15 is a view showing an OMAF structure.

FIG. 15 is a view showing an OMAF structure.

The 360-degree video based VR system may provide visual/auditory experiences for different viewing orientations based on a position of a user for 360-degree video based on the 360-degree video processing process. A service for providing visual/auditory experiences for different orientations in a fixed position of a user with respect to 360-degree video may be referred to as a 3DoF based service. Meanwhile, a service for providing extended visual/auditory experiences for different orientations in a random viewpoint and viewing position at the same time zone may be referred to as a 6DoF (six degree of freedom) based service.

A file format for 3DoF service has a structure in which a position of rendering, information of a file to be transmitted, and decoding information may be varied depending on a head/eye tracking module as shown in FIG. 15. However, this structure is not suitable for transmission of a media file of 6DoF in which rendering information/transmission details and decoding information are varied depending on a viewpoint or position of a user, correction is required.

Figure 16:
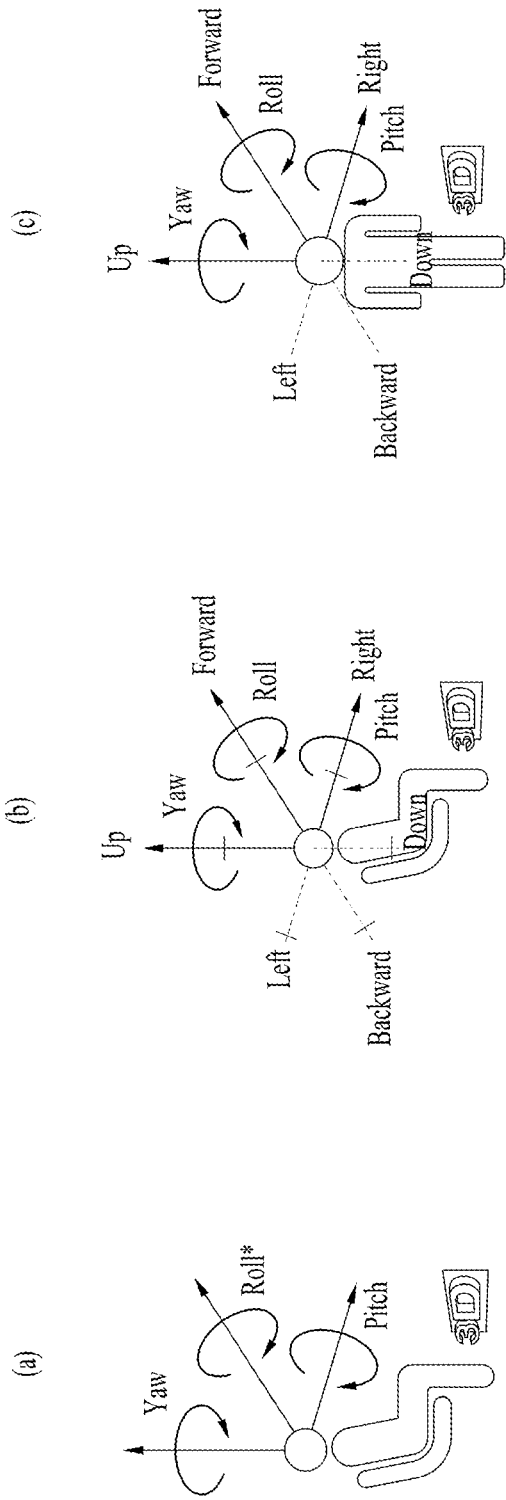
FIG. 16 is a view showing a type of media according to movement of a user.

FIG. 16 is a view showing a type of media according to movement of a user.

The present invention proposes a method for providing 6DoF content to provide a user with experiences of immersive media/realistic media. The immersive media/realistic media is a concept extended from a virtual environment provided by the existing 360 contents, and the position of the user is fixed in the form of (a) of the existing 360-degree video contents. If the immersive media/realistic media has only a concept of rotation, the immersive media/realistic media may mean an environment or contents, which can provide a user with more sensory experiences such as movement/rotation of the user in a virtual space by giving a concept of movement when the user experiences contents as described in (b) or (c).

(a) indicates media experiences if a view of a user is rotated in a state that a position of the user is fixed.

(b) indicates media experiences if a user's head may additionally move in addition to a state that a position of the user is fixed.

(c) indicates media experiences when a position of a user may move.

The realistic media contents may include 6DoF video and 6DoF audio for providing corresponding contents, wherein 6DoF video may mean video or image required to provide realistic media contents and captured or reproduced as 3DoF or 360-degree video newly formed during every movement. 6DoF content may mean videos or images displayed on a 3D space. If movement within contents is fixed, the corresponding contents may be displayed on various types of 3D spaces like the existing 360-degree video. For example, the corresponding contents may be displayed on a spherical surface. If movement within the contents is a free state, a 3D space may newly be formed on a moving path based on the user every time and the user may experience contents of the corresponding position. For example, if the user experiences an image displayed on a spherical surface at a position where the user first views, and actually moves on the 3D space, a new image on the spherical surface may be formed based on the moved position and the corresponding contents may be consumed. Likewise, 6DoF audio is an audio content for providing a content to allow a user to experience realistic media, and may mean contents for newly forming and consuming a spatial audio according to movement of a position where sound is consumed.

The present invention proposes a method for effectively providing 6DoF video. The 6DoF video may be captured at different positions by two or more cameras. The captured video may be transmitted through a series of processes, and the reception side may process and render some of the received data as 360-degree video having an initial position of the user as a starting point. If the position of the user moves, the reception side may process and render new 360-degree video based on the position where the user has moved, whereby the 6DoF video may be provided to the user.

Hereinafter, a transmission method and a reception method for providing 6DoF video services will be described.

Figure 17:
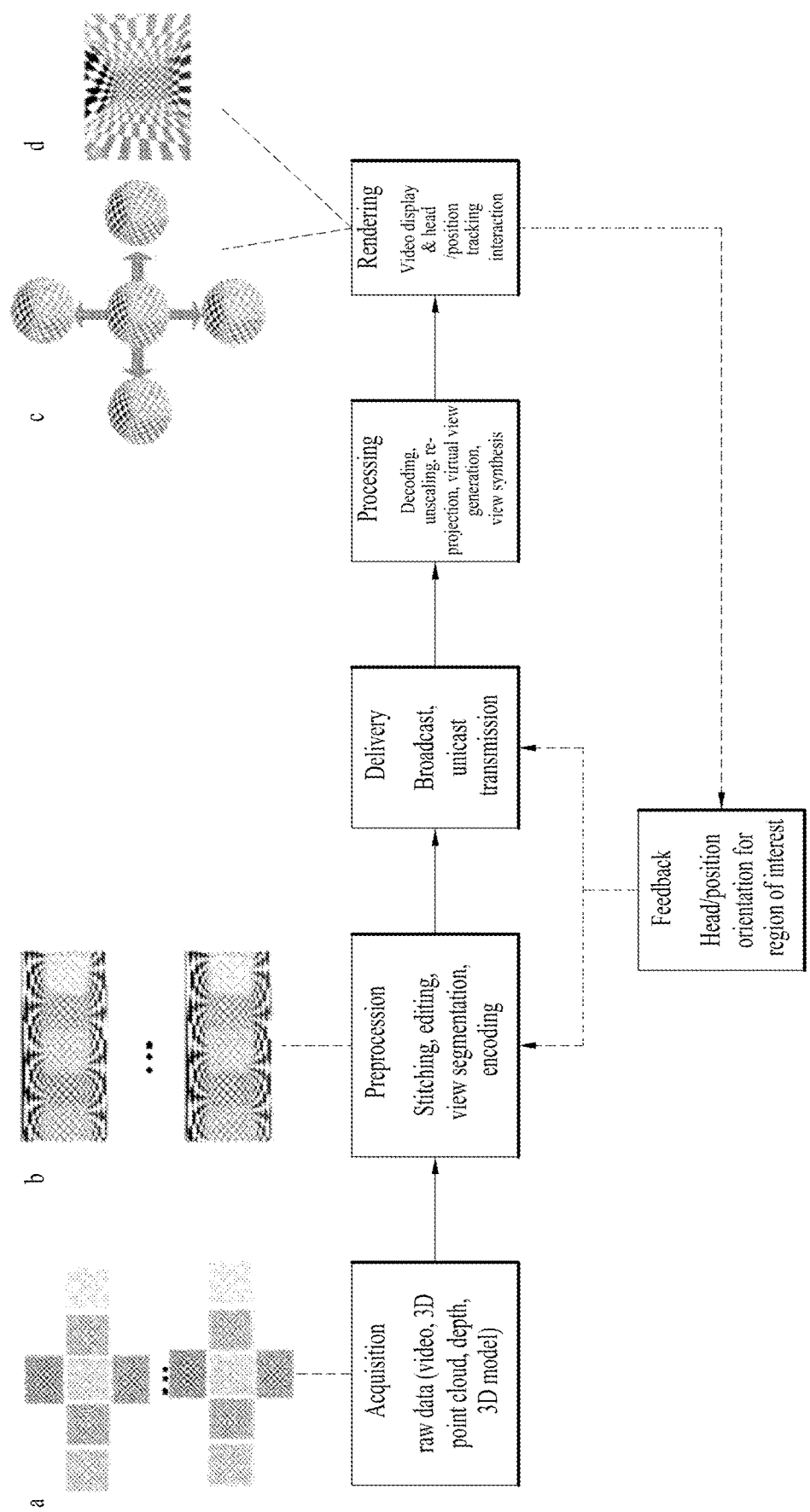
FIG. 17 is a view showing the entire architecture for providing 6DoF video.

FIG. 17 is a view showing the entire architecture for providing 6DoF video.

A series of the processes described above will be described in detail based on FIG. 17. First of all, as an acquisition step, HDCA(High Density Camera Array), Lenslet (microlens) camera, etc. may be used to capture 6DoF contents, and 6DoF video may be acquired by a new device designed for capture of the 6DoF video. The acquired video may be generated as several image/video data sets generated in accordance with a position of a camera, which is captured as shown in FIG. 3a. At this time, metadata such as internal/external setup values of the camera may be generated during the capturing process. In case of image generated by a computer not the camera, the capturing process may be replaced. The pre-processing process of the acquired video may be a process of processing the captured image/video and the metadata delivered through the capturing process. This process may correspond to all of types of pre-processing steps such as a stitching process, a color correction process, a projection process, a view segmentation process for segmenting views into a primary view and a secondary view to enhance coding efficiency, and an encoding process.

The stitching process may be a process of making image/video by connecting image captured in the direction of 360-degree in a position of each camera with image in the form of panorama or sphere based on the position of each camera. Projection means a process of projecting the image resultant from the stitching process to a 2D image as shown in FIG. 3b, and may be expressed as mapping into 2D image. The image mapped in the position of each camera may be segmented into a primary view and a secondary view such that resolution different per view may be applied to enhance video coding efficiency, and arrangement or resolution of mapping image may be varied even within the primary view, whereby efficiency may be enhanced during coding. The secondary view may not exist depending on the capture environment. The secondary view means image/video to be reproduced during a movement process when a user moves from the primary view to another primary view, and may have resolution lower than that of the primary view but may have the same resolution as that of the primary view if necessary. The secondary view may newly be generated by the receiver as virtual information as the case may be.

In some embodiments, the pre-processing process may further include an editing process. In this process, editing for image/video data may further be performed before and after projection, and metadata may be generated even during the pre-processing process. Also, when the image/video are provided, metadata for an initial view to be first reproduced and an initial position and a region of interest (ROI) of a user may be generated.

The media transmission step may be a process of processing and transmitting the image/video data and metadata acquired during the pre-processing process. Processing according to a random transmission protocol may be performed for transmission, and the pre-processed data may be delivered through a broadcast network and/or a broadband. The pre-processed data may be delivered to the reception side in an on demand manner.

The processing process may include all steps before image is generated, wherein all steps may include decoding the received image/video data and metadata, reprojection which may be called mapping or projection into a 3D model, and a virtual view generation and composition process. The 3D model which is mapped or a projection map may include a sphere, a cube, a cylinder or a pyramid like the existing 360-degree video, and may be a modified type of a projection map of the existing 360-degree video, or may be a projection map of a free type as the case may be.

The virtual view generation and composition process may mean a process of generating and composing the image/video data to be reproduced when the user moves between the primary view and the secondary view or between the primary view and the primary view. The process of processing the metadata delivered during the capture and pre-processing processes may be required to generate the virtual view. As the case may be, some of the 360-degree images/videos not all of the 360-degree images/videos may be generated/composed.

In some embodiments, the processing process may further include an editing process, an up scaling process, and a down scaling process. Additional editing required before reproduction may be applied to the editing process after the processing process. The process of up scaling or down scaling the received images/videos may be performed if necessary.

The rendering process may mean a process of rendering image/video, which is reprojected by being transmitted or generated, to be displayed. As the case may be, rendering and reprojection process may be referred to as rendering. Therefore, the rendering process may include the reprojection process. A plurality of reprojection results may exist in the form of 360-degree video/image based on the user and 360-degree video/image formed based on the position where the user moves in accordance with a moving direction as shown in FIG. 3c. The user may view some region of the 360-degree video/image in accordance with a device to be displayed. At this time, the region viewed by the user may be a form as shown in FIG. 3d. When the user moves, the entire 360-degree videos/images may not be rendered but the image corresponding to the position where the user views may only be rendered. Also, metadata for the position and the moving direction of the user may be delivered to previously predict movement, and video/image of a position to which the user will move may additionally be rendered.

The feedback process may mean a process of delivering various kinds of feedback information, which can be acquired during the display process, to the transmission side. Interactivity between 6DoF content and the user may occur through the feedback process. In some embodiments, the user's head/position orientation and information on a viewport where the user currently views may be delivered during the feedback process. The corresponding information may be delivered to the transmission side or a service provider during the feedback process. In some embodiments, the feedback process may not be performed.

The user's position information may mean information on the user's head position, angle, movement and moving distance. Information on a viewport where the user views may be calculated based on the corresponding information.

Figure 18:
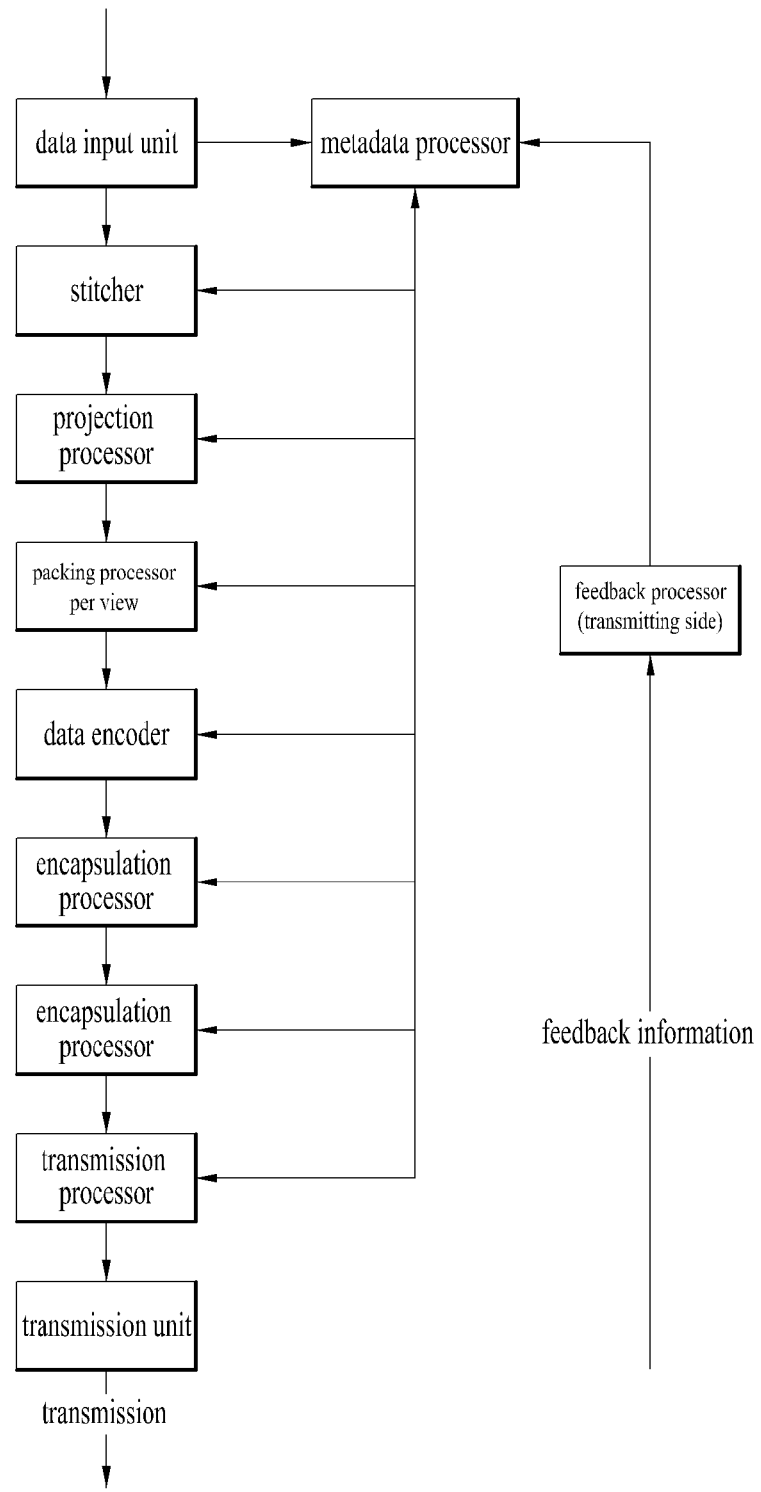
FIG. 18 is a view showing a configuration of a transmission apparatus for providing 6DoF video services.

FIG. 18 is a view showing a configuration of a transmission apparatus for providing 6DoF video services.

The present invention at the transmission side may be related to the 6DoF video transmission apparatus. The 6DoF video transmission apparatus may perform the aforementioned preparation processes and operations. The 6DoF video/image transmission apparatus according to the present invention may include a data input unit, a depth information processor (not shown), a stitcher, a projection processor, a view segmentation processor, a packing processor per view, a metadata processor, a feedback processor, a data encoder, an encapsulation processor, a transmission-processor, and/or a transmission unit as internal/external components.

The data input unit may receive image/video/depth information/audio data per view captured by one or more cameras at one or more positions. The data input unit may receive metadata generated during the capturing process together with the video/image/depth information/audio data. The data input unit may deliver the input video/image data per view to the stitcher and deliver the metadata generated during the capturing process to the metadata processor.

The stitcher may perform stitching for image/video per captured view/position. The stitcher may deliver the stitched 360-degree video data to the processor. The stitcher may perform stitching for the metadata delivered from the metadata processor if necessary. The stitcher may deliver the metadata generated during the stitching process to the metadata processor. The stitcher may vary a video/image stitching position by using a position value delivered from the depth information processor (not shown). The stitcher may deliver the metadata generated during the stitching process to the metadata processor. The delivered metadata may include information as to whether stitching has been performed, a stitching type, IDs of a primary view and a secondary view, and position information on a corresponding view.

The projection processor may perform projection for the stitched 6DoF video data to 2D image frame. The projection processor may obtain different types of results in accordance with a scheme, and the corresponding scheme may similar to the projection scheme of the existing 360-degree video, or a scheme newly proposed for 6DoF may be applied to the corresponding scheme. Also, different schemes may be applied to the respective views. The depth information processor may deliver depth information to the projection processor to vary a mapping resultant value. The projection processor may receive metadata required for projection from the metadata processor and use the metadata for a projection task if necessary, and may deliver the metadata generated during the projection process to the metadata processor. The corresponding metadata may include a type of a scheme, information as to whether projection has been performed, ID of 2D frame after projection for a primary view and a secondary view, and position information per view.

The packing processor per view may segment view into a primary view and a secondary view as described above and perform region wise packing within each view. That is, the packing processor per view may categorize 6DoF video data projected per view/position into a primary view and a secondary view and allow the primary view and the secondary view to have their respective resolutions different from each other so as to enhance coding efficiency, or may vary rotation and rearrangement of the video data of each view and vary resolution per region categorized within each view. The process of categorizing the primary view and the second view may be optional and thus omitted. The process of varying resolution per region and arrangement may selectively be performed. When the packing processor per view is performed, packing may be performed using the information delivered from the metadata processor, and the metadata generated during the packing process may be delivered to the metadata processor. The metadata defined in the packing process per view may be ID of each view for categorizing each view into a primary view and a secondary view, a size applied per region within a view, and a rotation position value per region.

The stitcher, the projection processor and/or the packing processor per view described as above may occur in an ingest server within one or more hardware components or streaming/download services in some embodiments.

The metadata processor may process metadata, which may occur in the capturing process, the stitching process, the projection process, the packing process per view, the encoding process, the encapsulation process and/or the transmission process. The metadata processor may generate new metadata for 6DoF video service by using the metadata delivered from each process. In some embodiments, the metadata processor may generate new metadata in the form of signaling table. The metadata processor may deliver the delivered metadata and the metadata newly generated/processed therein to another components. The metadata processor may deliver the metadata generated or delivered to the data encoder, the encapsulation processor and/or the transmission-processor to finally transmit the metadata to the reception side.

The data encoder may encode the 6DoF video data projected on the 2D image frame and/or the view/region-wise packed video data. The video data may be encoded in various formats, and encoded result values per view may be delivered separately if category per view is made.

The encapsulation processor may encapsulate the encoded 6DoF video data and/or the related metadata in the form of a file. The related metadata may be received from the aforementioned metadata processor. The encapsulation processor may encapsulate the corresponding data in a file format of ISOBMFF or OMAF, or may process the corresponding data in the form of a DASH segment, or may process the corresponding data in a new type file format. The metadata may be included in various levels of boxes in the file format, or may be included as data in a separate track, or may separately be encapsulated per view. The metadata required per view and the corresponding video information may be encapsulated together.

The transmission-processor may perform additional processing for transmission on the encapsulated video data in accordance with the format. The corresponding processing may be performed using the metadata received from the metadata processor. The transmission unit may transmit the data and/or the metadata received from the transmission-processor through a broadcast network and/or a broadband. The transmission-processor may include components required during transmission through the broadcast network and/or the broadband.

The feedback processor (transmission side) may further include a network interface (not shown). The network interface may receive feedback information from the reception apparatus, which will be described later, and may deliver the feedback information to the feedback processor (transmission side). The feedback processor may deliver the information received from the reception side to the stitcher, the projection processor, the packing processor per view, the encoder, the encapsulation processor and/or the transmission-processor. The feedback processor may deliver the information to the metadata processor so that the metadata processor may deliver the information to the other components or generate/process new metadata and then deliver the generated/processed metadata to the other components. According to another embodiment of the present invention, the feedback processor may deliver position/view information received from the network interface to the metadata processor, and the metadata processor may deliver the corresponding position/view information to the projection processor, the packing processor per view, the encapsulation processor and/or the data encoder to transmit only information suitable for current view/position of the user and peripheral information, thereby enhancing coding efficiency.

The components of the aforementioned 6DoF video transmission apparatus may be hardware components implemented by hardware. In some embodiments, the respective components may be modified or omitted or new components may be added thereto, or may be replaced with or incorporated into the other components.

Figure 19:
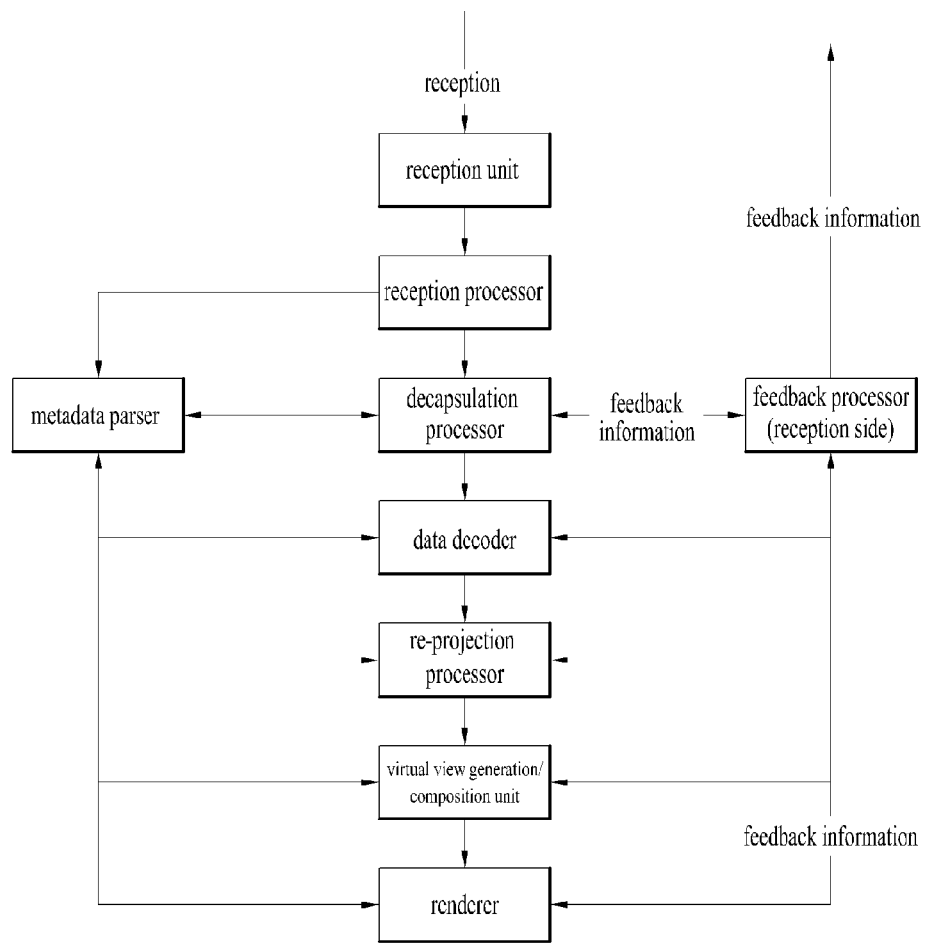
FIG. 19 is a view showing a configuration of 6DoF video reception apparatus.

FIG. 19 is a view showing a configuration of 6DoF video reception apparatus.

The present invention may be related to the reception apparatus. According to the present invention, the 6DoF video reception apparatus may include a reception unit, a reception processor, a decapsulation-processor, a metadata parser, a feedback processor, a data decoder, a reprojection processor, a virtual view generation/composition unit and/or a renderer as components.

The reception unit may receive video data from the aforementioned 6DoF transmission apparatus. The reception unit may receive the video data through a broadcast network or a broadband in accordance with a channel through which the video data are transmitted.

The reception processor may perform processing according to a transmission protocol for the received 6DoF video data. The reception processor may perform an inverse processing of the process performed in the transmission processor or perform processing according to a protocol processing method to acquire data obtained at a previous step of the transmission processor. The reception processor may deliver the acquired data to the decapsulation-processor, and may deliver metadata information received from the reception unit to the metadata parser.

The decapsulation-processor may decapsulate the 6DoF video data received in the form of file from the reception-processor. The decapsulation-processor may decapsulate the files to be matched with the corresponding file format to acquire 6DoF video and/or metadata. The acquired 6DoF video data may be delivered to the data decoder, and the acquired 6DoF metadata may be delivered to the metadata parser. As needed, the decapsulation-processor may receive metadata necessary for decapsulation from the metadata parser.

The data decoder may decode the 6DoF video data. The data decoder may receive metadata necessary for decoding from the metadata parser. The metadata acquired during the data decoding process may be delivered to the metadata parser and then processed.

The metadata parser may parse/decode the 6DoF video-related metadata. The metadata parser may deliver the acquired metadata to the decapsulation-processor, the data decoder, the reprojection processor, the virtual view generation/composition unit and/or the renderer.

The reprojection processor may reproject the decoded 6DoF video data. The reprojection processor may reproject the 6DoF video data per view/position in a 3D space. The 3D space may have different forms depending on the 3D models that are used, or may be reprojected on the same type of 3D model through a conversion process. The reprojection processor may receive metadata necessary for reprojection from the metadata parser. The reprojection processor may deliver the metadata defined during the reprojection process to the metadata parser. For example, the reprojection processor may receive 3D model of the 6DoF video data per view/position from the metadata parser. If 3D model of video data is different per view/position and video data of all views are reprojected in the same 3D model, the reprojection processor may deliver the type of the 3D model that is applied, to the metadata parser. In some embodiments, the reprojection processor may reproject only a specific area in the 3D space using the metadata for reprojection, or may reproject one or more specific areas.

The virtual view generation/composition unit may generate video data, which are not included in the 6DoF video data reprojected by being transmitted and received on the 3D space but need to be reproduced, in a virtual view area by using given data, and may compose video data in a new view/position based on the virtual view. The virtual view generation/composition unit may use data of the depth information processor (not shown) when generating video data of a new view. The virtual view generation/composition unit may generate/compose the specific area received from the metadata parser and a portion of a peripheral virtual view area, which is not received. The virtual view generation/composition unit may selectively be performed, and is performed when there is no video information corresponding to a necessary view and position.

The renderer may render the 6DoF video data delivered from the reprojection unit and the virtual view generation/composition unit. As described above, all the processes occurring in the reprojection unit or the virtual view generation/composition unit on the 3D space may be incorporated within the renderer such that the renderer can perform these processes. In some embodiments, the renderer may render only a portion that is being viewed by a user and a portion on a predicted path in accordance with the user's view/position information.

In the present invention, the feedback processor (reception side) and/or the network interface (not shown) may be included as additional components. The feedback processor of the reception side may acquire and process feedback information from the renderer, the virtual view generation/composition unit, the reprojection processor, the data decoder, the decapsulation unit and/or the VR display. The feedback information may include viewport information, head and position orientation information, gaze information, and gesture information. The network interface may receive the feedback information from the feedback processor, and may transmit the feedback information to the transmission unit. The feedback information may be consumed in each component of the reception side. For example, the decapsulation processor may receive position/viewpoint information of the user from the feedback processor, and may perform decapsulation, decoding, reprojection and rendering for corresponding position information if there is the corresponding position information in the received 6DoF video. If there is no corresponding position information, the 6DoF video located near the corresponding position may be subjected to decapsulation, decoding, reprojection, virtual view generation/composition, and rendering.

The components of the aforementioned 6DoF video reception apparatus may be hardware components implemented by hardware. In some embodiments, the respective components may be modified or omitted or new components may be added thereto, or may be replaced with or incorporated into the other components.

Figure 20:
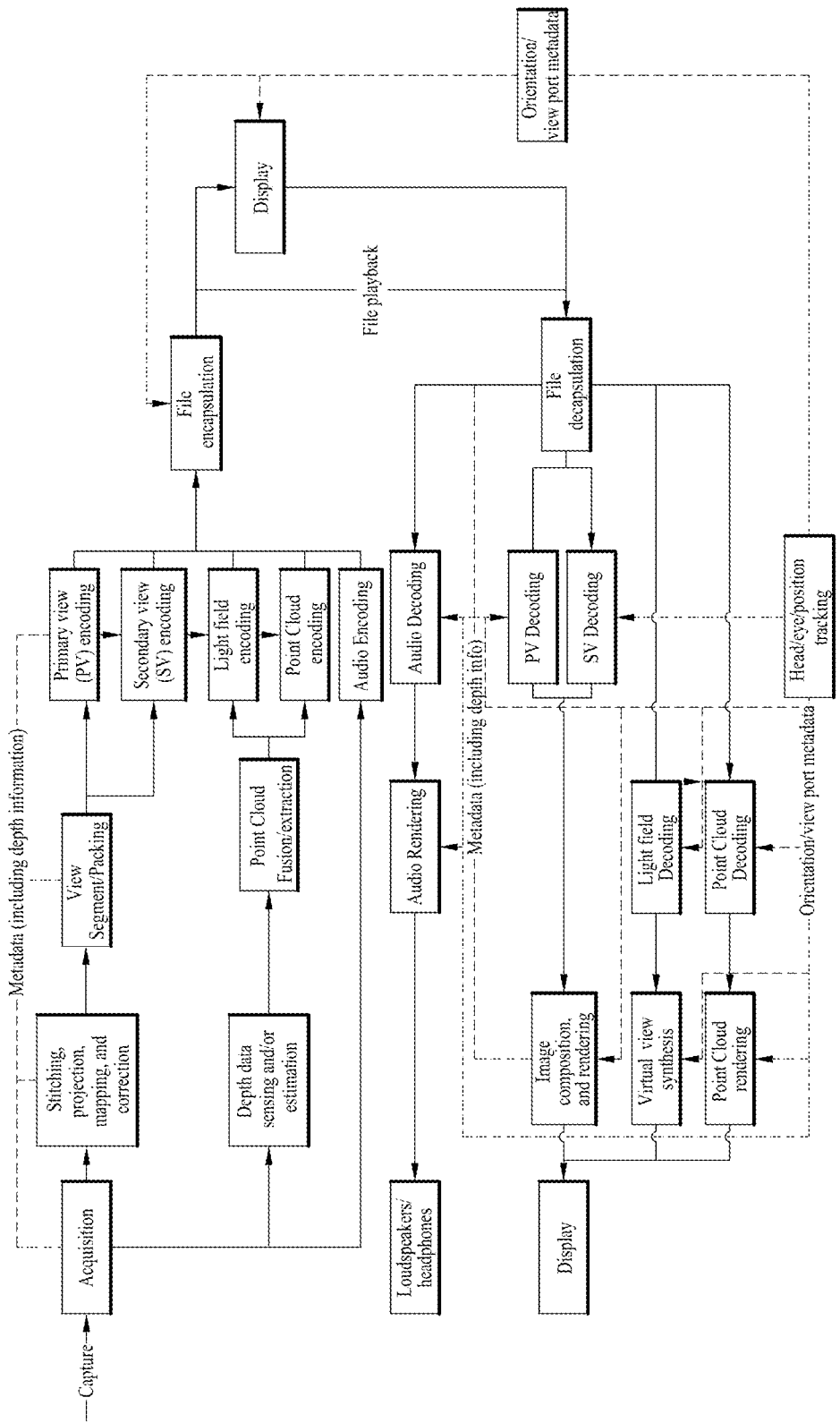
FIG. 20 is a view showing a configuration of 6DoF video transmission/reception apparatus.

FIG. 20 is a view showing a configuration of 6DoF video transmission/reception apparatus.

6DoF contents may be provided in the form of file or segment based download or streaming service such as DASH, or a new file format or streaming/download service method may be used. In this case, 6DoF contents may be called immersive media contents, light field contents, or point cloud contents.

As described above, each process for providing a corresponding file and streaming/download services may be described in detail as follows.

Acquisition: is an output obtained after being captured from a camera for acquiring multi view/stereo/depth image, and two or more videos/images and audio data are obtained, and a depth map in each scene may be acquired if there is a depth camera.

Audio Encoding: 6DoF audio data may be subjected to audio pre-processing and encoding. In this process, metadata may be generated, and related metadata may be subjected to encapsulation/encoding for transmission.

Stitching, Projection, mapping, and correction: 6DoF video data may be subjected to editing, stitching and projection of the image acquired at various positions as described above. Some of these processes may be performed in accordance with the embodiment, or all of the processes may be omitted and then may be performed by the reception side.

View segmentation/packing: As described above, the view segmentation/packing processor may segment images of a primary view (PV), which are required by the reception side, based on the stitched image and pack the segmented images and then perform pre-processing for packing the other images as secondary views. Size, resolution, etc. of the primary view and the secondary views may be controlled during the packing process to enhance coding efficiency. Resolution may be varied even within the same view depending on a condition per region, or rotation and rearrangement may be performed depending on the region.

Depth sensing and/or estimation: is intended to perform a process of extracting a depth map from two or more acquired videos if there is no depth camera. If there is a depth camera, a process of storing position information as to a depth of each object included in each image in image acquisition position may be performed.

Point Cloud Fusion/extraction: a process of modifying a previously acquired depth map to data capable of being encoded may be performed. For example, a pre-processing of allocating a position value of each object of image on 3D by modifying the depth map to a point cloud data type may be performed, and a data type capable of expressing 3D space information not the pointer cloud data type may be applied.

PV encoding/SV encoding/light field/point cloud encoding: each view may previously be packed or depth information and/or position information may be subjected to image encoding or video encoding. The same contents of the same view may be encoded by bitstreams different per region. There may be a media format such as new codec which will be defined in MPEG-I, HEVC-3D and OMAF++.

File encapsulation: The encoded 6DoF video data may be processed in a file format such as ISOBMFF by file-encapsulation which is the encapsulation processor. Alternatively, the encoded 6DoF video data may be processed to segments.

Metadata(including depth information): Like the 6DoF vide data processing, the metadata generated during stitching, projection, view segmentation/packing, encoding, and encapsulation may be delivered to the metadata processor, or the metadata generated by the metadata processor may be delivered to each process. Also, the metadata generated by the transmission side may be generated as one track or file during the encapsulation process and then delivered to the reception side. The reception side may receive the metadata stored in a separate file or in a track within the file through a broadcast network or a broadband.

Delivery: file and/or segments may be included in a separate track for transmission based on a new model having DASH or similar function. At this time, MPEG DASH, MMT and/or new standard may be applied for transmission.

File decapsulation: The reception apparatus may perform processing for 6DoF video/audio data reception.

Audio decoding/Audio rendering/Loudspeakers/headphones: The 6DoF audio data may be provided to a user through a speaker or headphone after being subjected to audio decoding and rendering.

PV/SV/light field/point cloud decoding: The 6DoF video data may be image or video decoded. As a codec applied to decoding, a codec newly proposed for 6DoF in HEVC-3D, OMAF++ and MPEG may be applied. At this time, a primary view PV and a secondary view SV are segmented from each other and thus video or image may be decoded within each view packing, or may be decoded regardless of view segmentation. Also, after light field and point cloud decoding are performed, feedback of head, position and eye tracking is delivered and then image or video of a peripheral view in which a user is located may be segmented and decoded.

Head/eye/position tracking: a user's head, position, gaze, viewport information, etc. may be acquired and processed as described above.

Point Cloud rendering: when captured video/image data are reprojected on a 3D space, a 3D spatial position is configured, and a process of generating a 3D space of a virtual view to which a user can move is performed although the virtual view is failed to be obtained from the received video/image data.

Virtual view synthesis: a process of generating and synthesizing video data of a new view is performed using 6DoF video data already acquired near a user's position/view if there is no 6DoF video data in a space in which the user is located, as described above. In some embodiments, the virtual view generation and/or composition process may be omitted.

Image composition, and rendering: as a process of rendering image based on a user's position, video data decoded in accordance with the user's position and eyes may be used or video and image near the user, which are made by the virtual view generation/composition, may be rendered.

Figure 21:
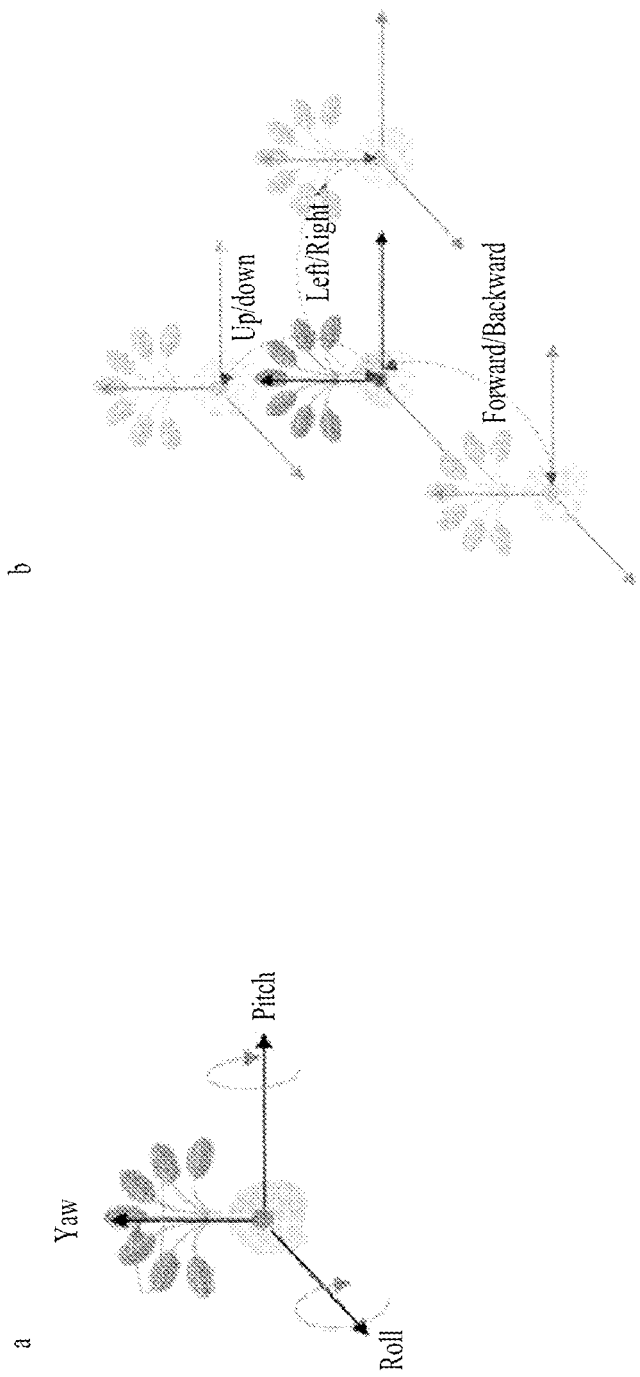
FIG. 21 is a view showing 6DoF space.

FIG. 21 is a view showing 6DoF space.

In the present invention, a 6DoF space before projection or after reprojection will be described and the concept of FIG. 21 may be used to perform corresponding signaling.

The 6DoF space may categorize an orientation of movement into two types, rational and translation, unlike the case that the 360-degree video or 3DoF space is described by yaw, pitch and roll. Rational movement may be described by yaw, pitch and roll as described in the orientation of the existing 3DoF like 'a', and may be called orientation movement. On the other hand, translation movement may be called position movement as described in 'b'. Movement of a center axis may be described by definition of one axis or more to indicate a moving orientation of the axis among Left/Right orientation, Forward/Backward orientation, and Up/down orientation.

The present invention proposes an architecture for 6DoF video service and streaming, and also proposes basic metadata for file storage and signaling for future use in the invention for 6DoF related metadata and signaling extension.

Metadata generated in each process may be extended based on the proposed 6DoF transceiver architecture.

Metadata generated among the processes of the proposed architecture may be proposed.

6DoF video related parameter of contents for providing 6DoF video services by later addition/correction/extension based on the proposed metadata may be stored in a file such as ISOBMFF and signaled.

6DoF video metadata may be stored and signaled through SEI or VUI of 6DoF video stream by later addition/correction/extension based on the proposed metadata.

Region (meaning in region-wise packing): region may mean a region where 360-degree video data projected on 2D image are located in a packed frame through region-wise packing. In this case, the region may mean a region used in region-wise packing in accordance with the context. As described above, regions may be identified by equally dividing 2D image, or may be identified by being randomly divided in accordance with a projection scheme.

Region (general meaning): unlike the region in the aforementioned region-wise packing, the terminology, region may be used as a dictionary definition. In this case, the region may mean 'area', 'zone', 'portion', etc. For example, when the region means a region of a face which will be described later, the expression 'one region of a corresponding face' may be used. In this case, the region is different from the region in the aforementioned region-wise packing, and both regions may indicate their respective areas different from each other.

Picture: picture may mean the entire 2D image in which 360-degree video data are projected. In some embodiments, a projected frame or a packed frame may be the picture.

Sub-picture: sub-picture may mean a portion of the aforementioned picture. For example, the picture may be segmented into several sub-pictures to perform tiling. At this time, each sub-picture may be a tile. In detail, an operation of reconfiguring tile or MCTS as a picture type compatible with the existing HEVC may be referred to as MCTS extraction. A result of MCTS extraction may be a sub-picture of a picture to which the original tile or MCTS belongs.

Tile: tile is a lower concept of a sub-picture, and the sub-picture may be used as a tile for tiling. That is, the sub-picture and the tile in tiling may be the same concept. In detail, the tile may be a tool enabling parallel decoding or a tool for independent decoding in VR. In VR, tile may mean MCTS (Motion Constrained Tile Set) that restricts a range of temporal inter prediction to a current tile internal range. Therefore, the tile herein may be called MCTS.

Spherical region: spherical region or sphere region may mean one region on a spherical surface when 360-degree video data are rendered on a 3D space (for example, spherical surface) at the reception side. In this case, the spherical region is regardless of the region in the region-wise packing. That is, the spherical region does not need to mean the same region defined in the region-wise packing. The spherical region is a terminology used to mean a potion on a rendered spherical surface, and in this case, 'region' may mean 'region' as a dictionary definition. In accordance with the context, the spherical region may simply be called region.

Face: face may be a terminology for each face in accordance with a projection scheme. For example, if cube map projection is used, a front face, a rear face, side face, an upper face, or a lower face may be called face.

Figure 22:
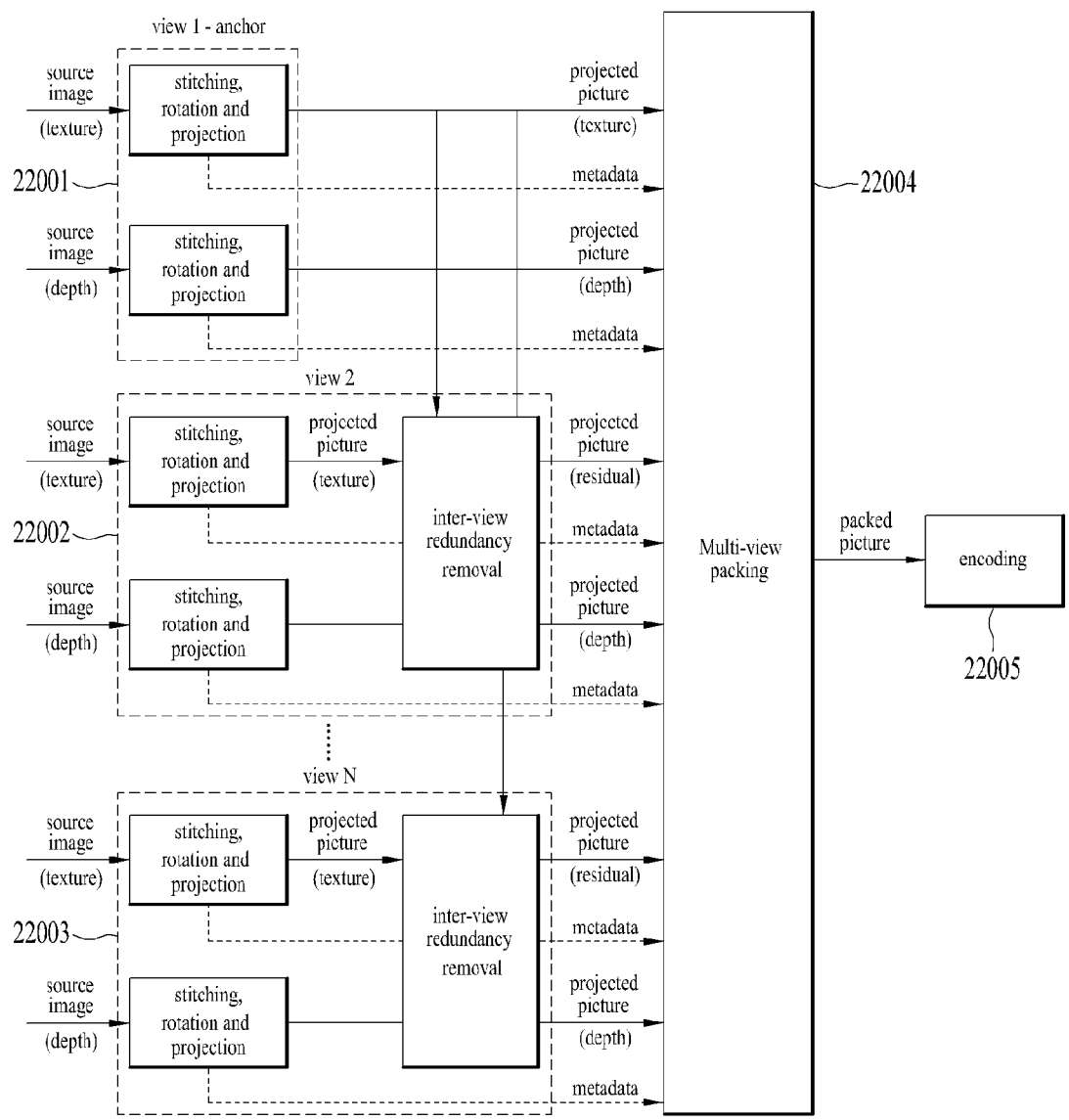
FIG. 22 is a view showing an architecture of a pre-encoding process for multi-views 3DoF+ video according to the embodiments of the present invention.

FIG. 22 is a view showing an architecture of a pre-encoding process for multi-views 3DoF+ video according to the embodiments of the present invention;

3DoF+ video processing includes a video transmission method and an architecture of the video transmission method according to the embodiments of the present invention. The video transmission method means an operation of an encoder end.

3DoF+ video processing of the encoder end includes a pre-processing step. The pre-processing step is performed by a pre-processor and/or an encoder of the video transmission apparatus. Pre-processing in the 3DoF+ video processing of the encoder end for multi-view may mean a multi-view pre-encoding process.

The multi-view pre-encoding process may pack a multi-view. The multi-view may include view 1 to view N. In detail, metadata corresponding to the respective views and projected pictures may be packed.

The view 1 of the multi-view may be an anchor view. The multi-view pre-encoding process may perform stitching, rotation and projection for the anchor view (22001). The multi-view pre-encoding process may perform stitching/rotation/projection and inter-view redundancy removal for view 2 to view N (22002, 22003).

In FIG. 22, an example pre-encoding processing for the multi-view video for 3DoF+ or head motion parallax is described. As shown in the figure, each view could be composed by different components, texture and depth map, which are produced into a projected picture of each component of each view by stitching, rotation, projection and multi-view packing process. In addition, using redundancy between views, for example between anchor view and the right head motion view, the residual of texture, also depth or other components if possible, could be generated for subsidiary views. This could increase bit efficiency by eliminating redundant information between views. Ones the projected pictures of each view including texture, residual, and depth, they are packed into a single 2D image plane and then the video is encoded using single layer video encoder, such as HEVC or future video codec.

In other words, multi-view pre-encoding according to the embodiments of the present invention may output a packed picture by receiving pictures for a plurality of viewing positions. The pictures for the plurality of viewing positions may include texture source image and depth source image, which correspond to each of the plurality of viewing positions. That is, each of the plurality of viewing positions may include other components, texture and/or depth map.

Stitching/rotation/projection may be performed in such a manner that stitching and rotation are performed for images for the plurality of viewing positions and projection is performed in accordance with the aforementioned method. The images for the plurality of viewing positions may be called source images. Also, the source images for which stitching/rotation/projection are performed may be called projected pictures.

Inter-view redundancy removal may remove redundancy of the projected pictures. The pictures for which inter-view redundancy removal is performed may be called residual projected pictures. This could increase bit efficiency by eliminating redundant information between views.

Stitching/rotation/projection and inter-view redundancy removal may be performed for each of the plurality of viewing positions. In other words, if the multi-view (or a plurality of viewing positions) includes view 1 to view N, the view 1 may be an anchor view.

Stitching/rotation/projection may be performed for each of the source images corresponding to the anchor view (22001). The source images corresponding to the anchor view may include texture source image and/or depth source image. Stitching/rotation/projection may be performed for each of the source images corresponding to view 2 to view N, and inter-view redundancy removal may be performed for each of the projected pictures for which stitching/rotation/projection are performed (22002, 22003). Inter-view redundancy removal may be performed for all or some of the view 2 to the view N based on the projected picture corresponding to the anchor view. The source images corresponding to the view 2 to the view N may include texture source image and/or depth source image.

Multi-view packing 22004 may pack the pictures for which inter-view redundancy removal is performed and/or projected pictures for depth source image. As an embodiment, the pictures for which inter-view redundancy removal is performed may be packed on a 2D image plane. At this time, multi-view packing according to the embodiments of the present invention may pack metadata generated during stitching/rotation/projection. Also, the projected pictures for the anchor view may be packed. The metadata generated during stitching/rotation/projection may be metadata related to stitching/rotation/projection. This could increase bit efficiency by eliminating redundant information between views.

Encoding 22005 may encode the packed pictures and/or the metadata. Encoding may be performed by a single layer video encoder or its corresponding device such as HEVC or future video codec.

As encoder pre-processing according to the embodiments of the present invention provides the aforementioned configuration, receivers could generate a video with head motion parallax and/or binocular disparity, or different viewpoints, which receivers could generate interactive video with changing locations. Therefore, by saving bandwidth to deliver the 3DoF+ video or the storage space, high quality of 3DoF+ video which could provide head motion parallax could be achieved. Due to this configuration, receiver can provide different viewing experience with viewer's action in the VR environment.

Figure 23:
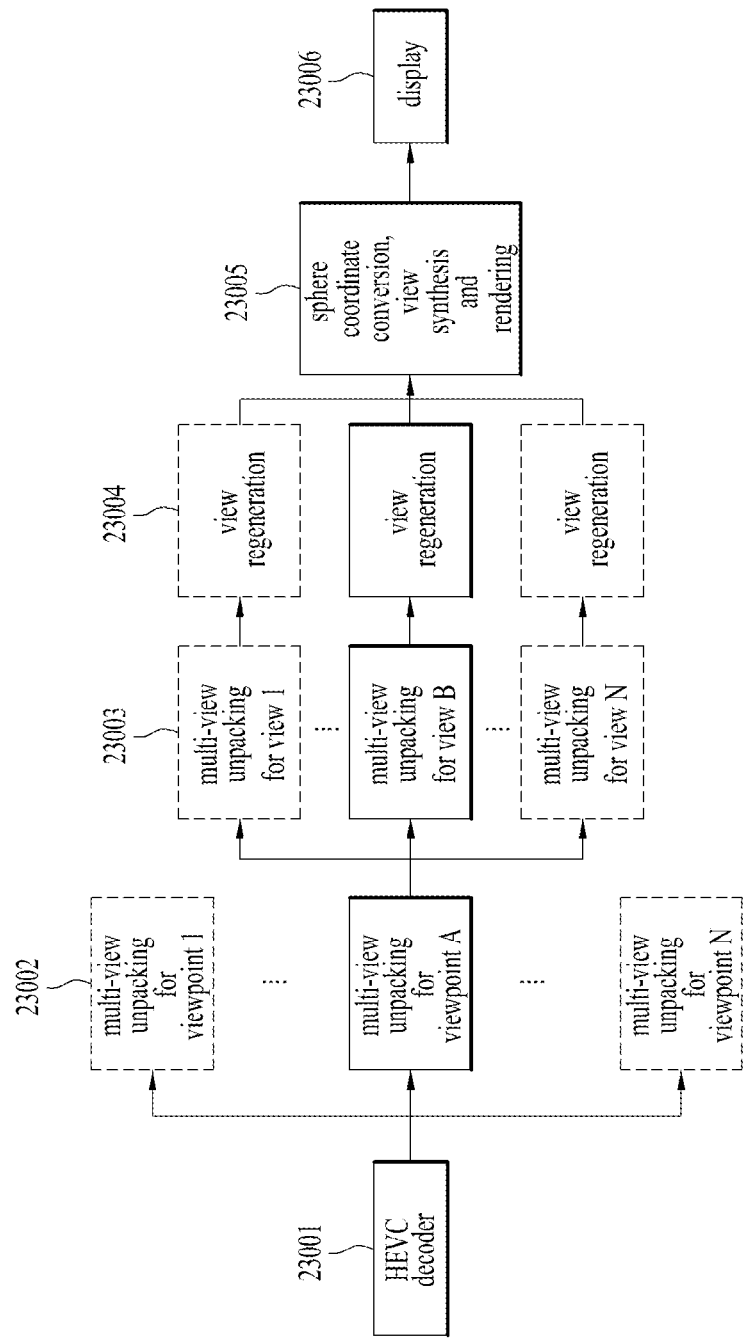
FIG. 23 is a view showing an architecture of a post-decoder process for multi-views 3DoF+ video according to the embodiments of the present invention.

FIG. 23 is a view showing an architecture of a post-decoder process for multi-views 3DoF+ video according to the embodiments of the present invention;

3DoF+ video processing according to the embodiments of the present invention includes a video reception method and an architecture of the video reception method according to the embodiments of the present invention. The video reception method may mean an operation of a decoder end. A post-processing step may be called decoder post-processing or post-decoder process.

A multi-view post-decoder process may perform HEVC decoding 23001, multi-view unpacking for viewpoint 23002 and multi-view unpacking for view 23003, view regeneration 23004, sphere coordinate conversion 23005, view synthesis 23005, rendering 23005 and/or display 23006. At this time, stitching/rotation/projection may be performed for texture source image and/or depth source image.

In FIG. 23, a concept of post-decoder process of multi-views 3DoF+ video is described. After decoding, the decoder post-processor could generate multiple projected pictures per view for each viewpoint. However, since not all the images are played on the display device, target projected pictures could be generated based on the viewer's viewpoint and viewing position. In this example, view B of viewpoint A is assumed to be selected and the related projected pictures, such as texture, residual, and depth map, could be inputs to the renderer before display. When the selected view is not a full view, texture depth regeneration process or/and view regeneration process is performed to reconstruct a view from the given pictures and additional information from patch or residual.

In other words, HEVC decoder 23001 may perform decoding a received bitstream. The bitstream includes pictures for a plurality of viewpoints viewpoint 1, viewpoint A, . . . viewpoint N. At this time, multi-view unpacking for viewpoint may select one of a plurality of points included in bitstream based on information on viewpoint and viewing position of a viewer. The viewpoint and viewing position of the viewer may be signaled as related signaling information.

Multi-view unpacking for viewpoint 23002 may select (or unpack) the pictures for each viewpoint. The pictures for each viewpoint include pictures for multi-view view 1, view B, 쩔, view N. Multi-view unpacking for view 23003 may select (or unpack) one or more of a plurality of views corresponding to one viewpoint. Multi-view unpacking for viewpoint and multi-view unpacking for view may be performed based on packing metadata which is singling information.

View regeneration 23004 may regenerate a view based on the selected one or more views. At this time, view regeneration may be performed based on a reconstruction parameter. A detailed operation will be described later.

Post-decoding according to the embodiments of the present invention may perform sphere coordinate conversion, view synthesis and/or rendering based on the pictures for which view regeneration is performed, and may be delivered to the display (23005).

Receivers could generate a video with head motion parallax and/or binocular disparity, or different viewpoints, which receivers could generate interactive video with changing locations. Therefore, by saving bandwidth to deliver the 3DoF+ video or the storage space, high quality of 3DoF+ video which could provide head motion parallax could be achieved. Due to this configuration, receiver can provide different viewing experience with viewer's action in the VR environment.

Figure 24:
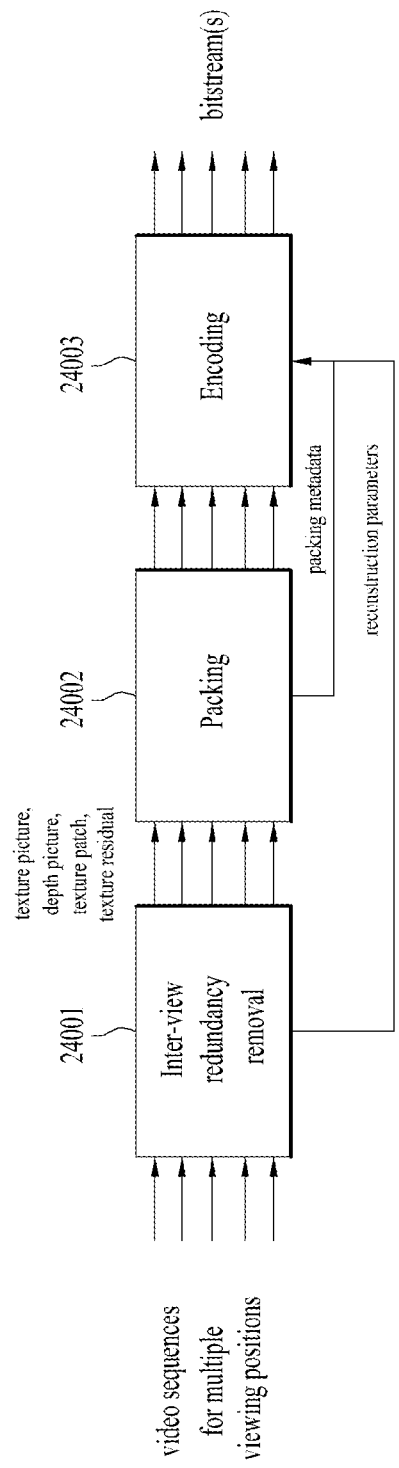
FIG. 24 is a block diagram showing encoder pre-processing modules according to the embodiments of the present invention.

FIG. 24 is a block diagram showing encoder pre-processing modules according to the embodiments of the present invention;

As described above, encoder pre-processing according to the embodiments of the present invention may mean pre-processing.

In FIG. 24, block diagram of encoder pre-processing for multi-views 3DoF+ video is described. Based on the high correlation between pictures in the adjacent viewing positions, the redundant pixel information between pictures is removed. After this process, less number of pictures which are used to estimate the removed pixel information is preserved while partial regions or residual of the regions which could not be predicted by the reserved pictured are remained with reduced size of data. The information which viewing position is reserved for full picture, which kind of information is remained in the other viewing positions, how the removed information could be derived, and how the picture of the viewing position could be regenerated is delivered with reconstruction parameter, such as view regeneration information SEI message or texture depth regeneration information SEI message. When the redundancy is removed, the remaining picture, patches, and residuals, etc. are paced into one or multiple pictures. The packing information, such as the location and size of the picture, patches, and residuals, the type of the pixels in the region, the location and size of the region in the original picture, the size of the original picture, etc. are delivered with the packing metadata, such as Multiview region-wise packing information SEI message.

In other words, inter-view redundancy removal 24001 may remove redundancy existing in video sequences for multiple viewing positions. In this case, the video sequences for multiple viewing positions may mean images or source images for the aforementioned viewing positions. Inter-view redundancy removal 24001 may perform the aforementioned redundancy removal to output at least one of a texture picture, a depth picture, a texture patch, or a texture residual, which will perform packing. Also, if inter-view redundancy removal is performed, encoder pre-processing according to the embodiments of the present invention may generate reconstruction parameters.

Packing 24002 may pack at least one of the texture picture, the depth picture, the texture patch and the texture residual, for which inter-view redundancy removal is performed. At this time, packing metadata (or signaling information) related to packing may be generated.

Encoding 24003 may be formed for the pictures subjected to packing. At this time, encoding may be performed for the packing metadata and/or the reconstruction parameters, which are generated during packing. Encoder pre-processing to the embodiments of the present invention may output bitstream by performing encoding.

As encoder pre-processing to the embodiments of the present invention provides the aforementioned configuration, receivers could generate a video with head motion parallax and/or binocular disparity, or different viewpoints, which receivers could generate interactive video with changing locations. Therefore, by saving bandwidth to deliver the 3DoF+ video or the storage space, high quality of 3DoF+ video which could provide head motion parallax could be achieved. Due to this configuration, receiver can provide different viewing experience with viewer's action in the VR environment.

Figure 25:
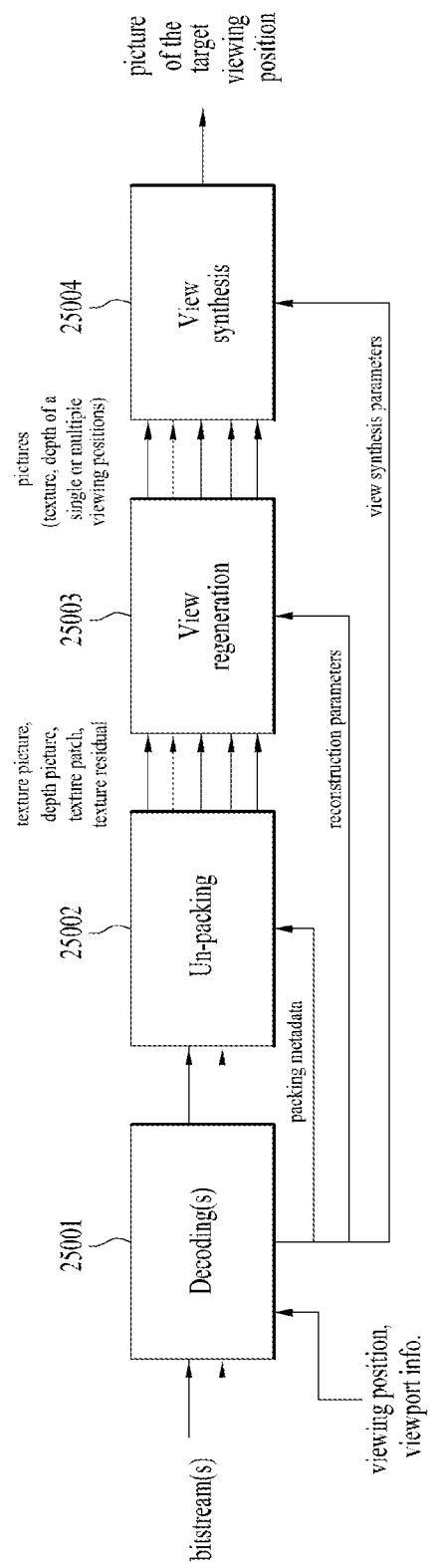
FIG. 25 is a block diagram showing decoder post-processing modules according to the embodiments of the present invention.

FIG. 25 is a block diagram showing decoder post-processing modules according to the embodiments of the present invention;

As described above, decoder post-processing according to the embodiments of the present invention may mean post-processing.

In FIG. 25, block diagram of decoder post-processing for multi-views 3DoF+ video is described. When the bitstreams are decoded, the decoded output pictures are unpacked by using the packing metadata. In the metadata, the size, type, and the viewing position of the target picture, the size, type, location of each region are described. After the un-packing process, pictures in the missing viewing position are restored by the view regeneration process (or texture depth regeneration process) in aid of the reconstruction parameters. In this metadata, the size and the location of the patches and residuals, the method of estimating the removed pixel values, how to regenerate the missing pixel values, and post-filtering parameters for block boundary removal is described. With the regenerated and delivered pictures for multiple viewing positions, a single view corresponding to the viewer's viewing position is synthesized by view synthesis module.

In other words, decoder post-processing according to the embodiments of the present invention may perform decoding 25001 for bitstream. At this time, decoding may be performed based on a viewing position and/or viewport information of the viewer. In addition, the viewing position may mean information for viewing position in the bitstream. Also, the viewing position may mean information included in feedback information described in in FIG. 10, or viewing position information in accordance with sensor described in FIG. 11. Decoder post-processing according to the embodiments of the present invention may output packed pictures by performing decoding. Also, decoder post-processing may parse or generate one or more of packing metadata, reconstruction parameters and view synthesis parameters by performing decoding.

The Decoding(25001) decodes bitstream(s). The decoding(25001) may receive the bitstreams, viewing position(s) and/or viewport information. The viewing position(s) and the viewport information according to embodiments of the present invention may be received from the encoder as signaling information(metadata). The viewing position(s) and the viewport information according to embodiments of the present invention may be acquired from a receiver side, for example, the viewing position(s) and the viewport information can refer to signaling information or feedback information related to the receiver (eyetracking, head position, user selected ROI, etc.)

Decoder post-processing according to the embodiments of the present invention may perform unpacking 25002 for the decoded pictures. Decoder post-processing may perform unpacking based on the packing metadata. An embodiment of the packing metadata may include information on viewing position and size of a target picture. Decoder post-processing according to the embodiments of the present invention may output one or more of the texture picture, the depth picture, the texture patch and the texture residual by performing unpacking.

Decoder post-processing according to the embodiments of the present invention may perform view regeneration 25003 based on the unpacked pictures. View regeneration according to the embodiments of the present invention may be performed based on the reconstruction parameters. View regeneration may restore pictures within a missing viewing position. An embodiment of the reconstruction parameters may include size and position information on patches and residuals. Also, the reconstruction parameters may include information as to how values of missing pixels are regenerated and/or predicted. Due to this configuration, receiver can provide high quality of 3DoF+ video which could provide head motion parallax could be achieved.

Decoder post-processing according to the embodiments of the present invention may perform synthesis for views based on the pictures regenerated in accordance with view regeneration. At this time, view synthesis may be performed based on view synthesis parameters. View synthesis according to the embodiments of the present invention may be performed to output pictures of a target viewing position.

Receivers could generate a video with head motion parallax and/or binocular disparity, or different viewpoints, which receivers could generate interactive video with changing locations. Therefore, by saving bandwidth to deliver the 3DoF+ video or the storage space, high quality of 3DoF+ video which could provide head motion parallax could be achieved. Due to this configuration, receiver can provide different viewing experience with viewer's action in the VR environment.

Figure 26:
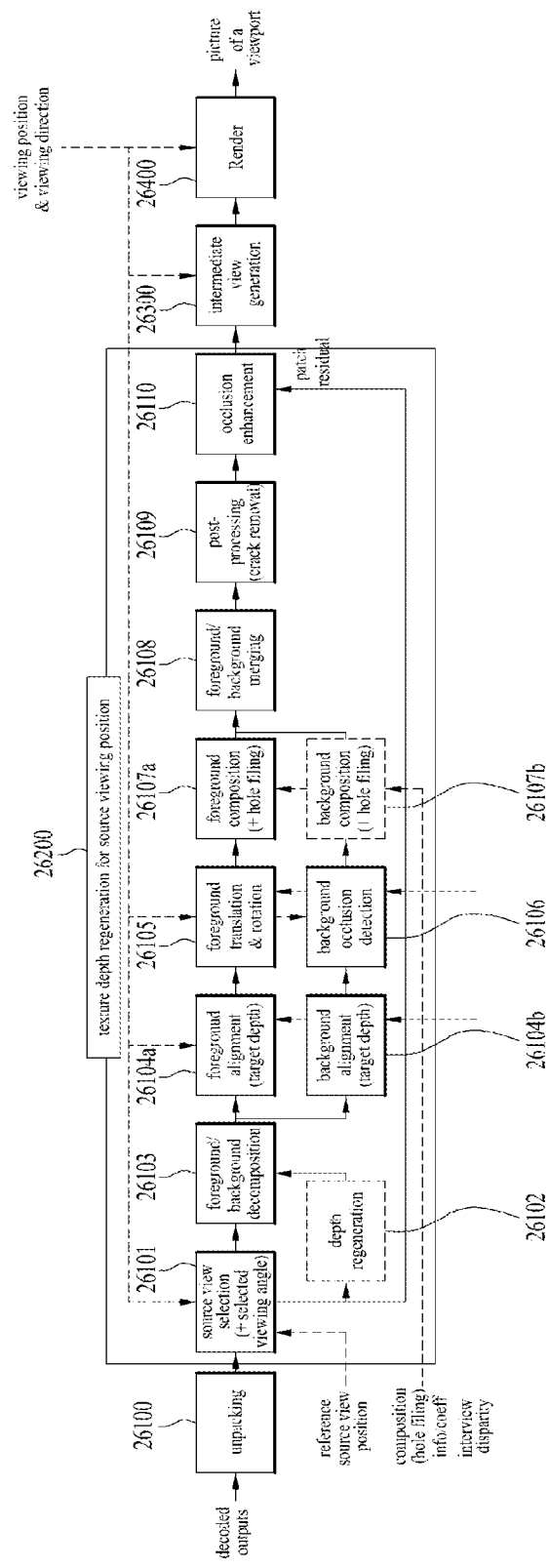
FIG. 26 is a view showing view regeneration in the decoder post-processing modules according to the embodiments of the present invention.

FIG. 26 is a view showing view regeneration in the decoder post-processing modules according to the embodiments of the present invention;

That is, view regeneration in the decoder post-processing, which will be described later, may mean view regeneration of the aforementioned decoder post-processing and/or post-processing described in FIGS. 25 and 23.

In FIG. 26, the detailed flow chart of the decoder and the decoder post-process is described. In this example, HEVC single layer decoder is assumed but other codecs, such as AVC, SVC, MV-HEVC, could be used. After decoded picture is generated by HEVC decoder, packed regions corresponding to the target view and viewpoint are selected and projected pictures of each component, such as texture, residual, and depth map, are produced. If the generated projected pictures contain residual picture, the missing pixels values for a view shall be regenerated by using the given reference pictures of reference viewing positions. After having projected picture of texture of a target view, and also that of depth, each projected pictures are mapped onto a sphere coordinate and align the rotation of each sphere if needed. If the target view is not exactly match with the pictured provided in the decoded picture, views could be synthesized by using texture and depth map of adjacent existing view or views. In each step, the following syntax elements described in the previous section is used.

Un-Packing

The syntax elements in the Multiview region-wise packing SEI message are used to fine the location, size, type of the regions corresponding to the view_id and component_id.

Texture Depth Regeneration Process: Source View/Patch Selection

For the pictures of the viewing positions whose view_regeneration_flag[i] equal to 0, the pictures could be directly delivered to view synthesizer or could be a candidate for the reference picture of the Texture Depth Regeneration Process: Foreground Background Decomposition In this step, the number of decomposition levels are given by num_depth_levels_minus1[i][j]. In this example, the number of the decomposition level is equal to 2, which are called foreground and background. It is anticipated that the more the levels are classified, the precision of accuracy could be improved.

Texture Depth Regeneration Process: Foreground/Background Alignment

In this step, the objects in the foreground or background are aligned to the depth of the target viewing position. The disparity along the z-axis is given by global_offset_x_axis [i][j].

Texture Depth Regeneration Process: Foreground Translation & Rotation

For the foreground, it is more anticipated that the translation and rotation is more severe than the background, so the common objects in each reference picture are translated and rotated considering the horizontal and vertical disparity between viewing positions, which are given by global_offset_y_axis[i][j] and global_offset_z_axis[i][j].

If the backgrounds in each reference pictures are also have large disparity to match the pixel values, the translation & rotation process could be performed.

Texture Depth Regeneration Process: Background Occlusion Detection

For the backgrounds, the translation or rotation is less severe. Instead, there could be holes where objects in the foreground of the reference picture are moved to the other places. In this case, the holes are detected and could be filled with the hole filling process or occlusion enhancement process in the followings. In other implementation, the background region with occlusion in one reference picture could be filled in with the non-occluded region in the other reference picture.

Texture Depth Regeneration Process: Foreground/Background Composition (Hole Filling)

Based on the hole filling process type given by hole_filling_process_type[i] and the filter coefficient hole_filling_coeff [i][j], the crack between pixels that are not estimated by the previous steps are filled in.

Texture Depth Regeneration Process: Foreground/Background 7ing

The foreground and background are combined into a single texture and depth.

Texture Depth Regeneration Process: Post Processing (Crack Removal)

Based on the crack removal process type given by crack_removal_process_type[i] and the filter coefficient crack_removal_coeff [i][j], the crack between pixels that are not estimated by the previous steps are filled in.

Texture Depth Regeneration Process: Occlusion Enhancement Processing

When occlusion_enh_flag[i] equal to 1, occlusion enhancement processing is performed. The target region in the regenerated picture is described regenerated_picture_top_left_index_x[i][ j], regenerated_picture_top_left_index_y[i][j], regenerated_picture_bottom_right_index_x[i][j], and regenerated_picture_bottom_right_index_y[i][j]. Also, the pixels which will fill in the target are described by patch_top_left_index_x[i][j], patch_top_left_index_y[i][j], patch_bottom_right_index_x[i][j], and patch_bottom_right_index_y[i][j] in the picture indicated by patch_component_id[i][j] of the viewing position patch_view_id[i][j].

Intermediate View Generation

Based on the viewer's viewing direction and viewing position, intermediate view is synthesized by using view synthesizer.

In other words, unpacking 26100 may unpack decoded output bitstreams.

Texture depth regeneration for source viewing position 26200 may regenerate a view for a viewing position from the unpacked output bitstreams. Texture depth regeneration for source viewing position may be called view regeneration according to the embodiments of the present invention.

Intermediate view regeneration 26300 may perform intermediate view generation from the view regenerated from the texture depth regeneration for source viewing position. Intermediate view regeneration may be called view synthesis. Intermediate view generation may be performed based on viewing position and/or viewing direction. In addition, the viewing position may mean information for viewing position in the bitstream. Also, the viewing position may mean information included in feedback information described in in FIG. 10, or viewing position information in accordance with sensor described in FIG. 11.

A renderer 26400 may output a picture of a viewport to render the generated intermediate view based on viewing position and/or viewing direction of a viewer.

Hereinafter, an operation of view regeneration 26200 will be described in detail.

Source view selection 26101 may select source views from unpacked pictures. The selected source views may be called reference source views. The source view selection may be performed based on viewing position and/or viewing direction of a viewer and/or reference source view position. At this time, a source view according to a selected viewing angle may be selected based on the viewing position and/or the viewing direction. The source view selection may mean an operation of selecting one of a plurality of unpacked viewpoints through post-decoding according to the aforementioned embodiments of the present invention, which is described in FIGS. 23 and/or FIG. 25, may mean an operation of selecting one or more of the unpacked views corresponding to one viewpoint, or may mean an operation including the above two operations.

Depth regeneration 26102 may regenerate depth pictures based on the source views selected from the source view selection. The selected views may be called reference views.

Foreground/background decomposition 26103 may output pictures according to a depth level by performing decomposition for the selected source views and/or depth pictures. The decomposition may be performed based on the number of decomposition levels. The decomposition may extract foreground or background of the selected source views in accordance with a decomposition level, and may extract objects or components corresponding to each depth level. The decomposition level may be called a depth layer or a layer. If the decomposition level is 2, foreground and background of the views may be extracted for each of the selected views. The decomposition may be performed by varying the decomposition level for each of the source views. The decomposition may be performed based on the source views subjected to depth regeneration.

Foreground alignment 26104a and background alignment 26104b will be described. The foreground alignment and the background alignment may align each object to be matched with a depth of a target viewing position. That is, the foreground alignment and the background alignment may align each object to be matched with a target depth of each object. The foreground alignment and the background alignment may be performed based on inter-view disparity information, viewing position and/or viewing direction. An embodiment of the inter-view disparity information for performing foreground alignment may include a global_offset_x_axis parameter which will be described later.

Foreground translation and rotation 26105 may perform translation and rotation for foreground. Foreground translation and rotation may be performed for one or more objects or components. Since foreground, objects or components may be viewed differently depending on their respective position and angle, translation or rotation may be performed. The foreground translation and rotation may be performed based on inter-view disparity information. Also, the foreground translation and rotation may be performed based on viewing position and viewing direction of the viewer.

Occlusion detection 26106 may detect occlusion from background. The occlusion is a region covered by foregrounds (objects or components), and may mean a region of background, which cannot be estimated from the foregrounds and backgrounds included in the reference views. The occlusion detection may be performed based on inter-view disparity information. Also, the occlusion detection may be performed based on viewing position and viewing direction of the viewer.

Due to this configuration, receiver can provide high quality of 3DoF+ video which could provide head motion parallax could be achieved.

Foreground composition 26107a may perform hole filling for the foreground. The foreground composition may be performed for the foreground for which alignment is performed. The foreground composition or hole filling may be performed based on hole filling related signaling information (hole filling information/coefficient) or composition information/coefficient.

Background composition 26107b may perform hole filling for the background. The background composition may be performed for the background for which alignment is performed. The background composition or hole filing may be performed based on hole filling related signaling information (hole filling information/coefficient) or composition information/coefficient.

The foreground composition 26107a and/or the background composition 26107b according to the embodiments of the present invention may be called hole filling. The hole filling related signaling information (or composition information) may include hole_filling_coeff parameter information, which means hole_filling_process_type and/or filter coefficient, and information capable of being used to fill cracks between pixels.

Foreground/background merging 26108 may merge the foreground for which translation and/or rotation is performed with the background for which occlusion detection is performed. The foreground/background merging may generate one texture and depth picture by merging the foreground with the background.

Crack removal 26109 may remove the cracks in the merged picture. The crack removal may fill the cracks which are not estimated by the previous steps in the merged picture. The crack removal may be performed based on crack removal related signaling information. The crack removal related signaling information may include crack_removal_process_type, crack_removal_coeff indicating filter coefficient and/or information capable of being used to fill the cracks between the pixels. Post-processing described in this drawing may mean a crack removal operation.

Occlusion enhancement 26110 may detect and remove hole or occlusion existing in the merged pictures. In the embodiments of the present invention, the occlusion enhancement may be performed based on a patch residual output from source view selection. In the embodiments of the present invention, the occlusion enhancement may be performed based on occlusion enhancement related signaling information.

Receivers could generate a video with head motion parallax and/or binocular disparity, or different viewpoints, which receivers could generate interactive video with changing locations. Therefore, by saving bandwidth to deliver the 3DoF+ video or the storage space, high quality of 3DoF+ video which could provide head motion parallax could be achieved. Due to this configuration, receiver can provide different viewing experience with viewer's action in the VR environment.

Figure 27:
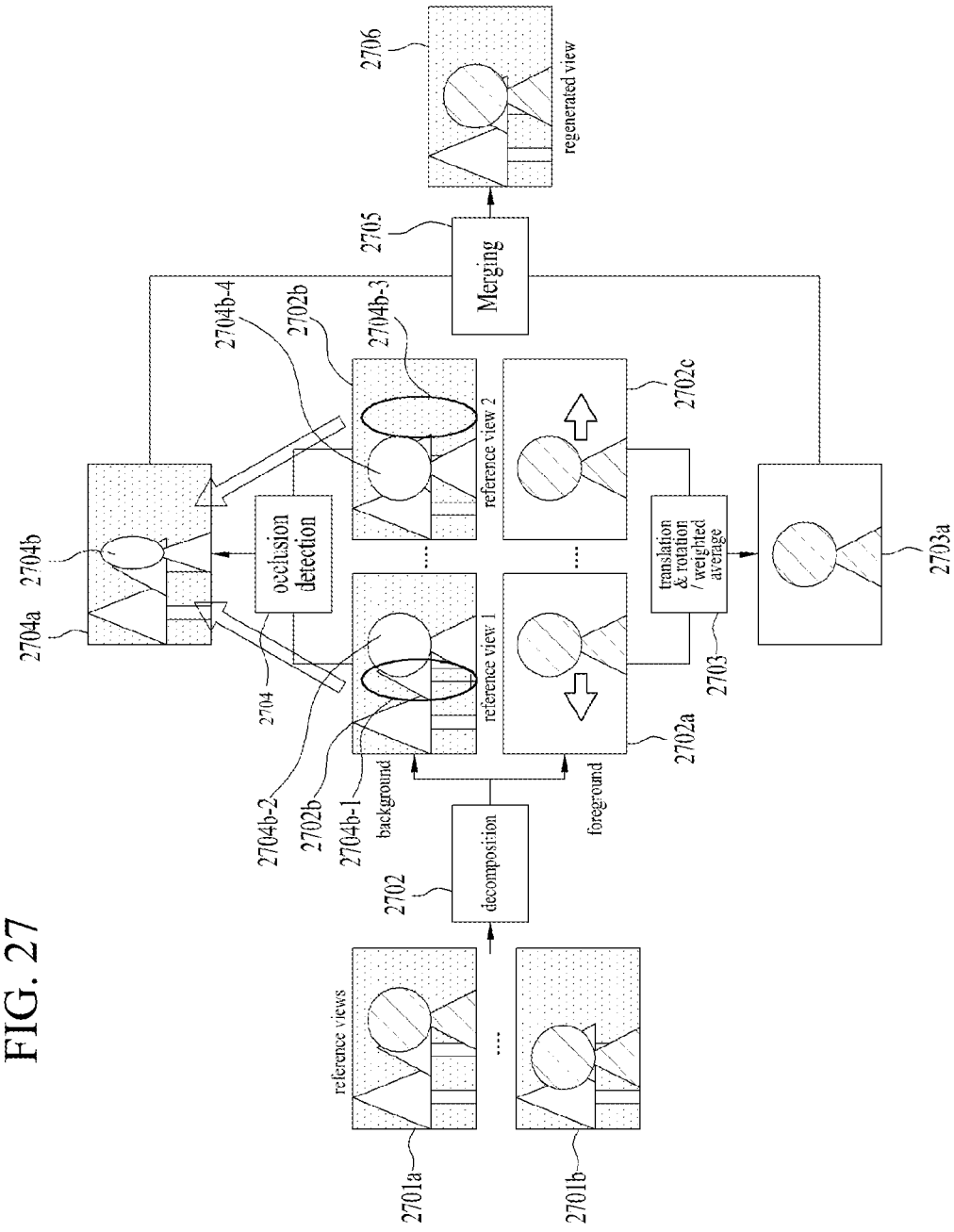
FIG. 27 is a flow chart showing texture depth regeneration processes (decomposition, translation & rotation, hole filling, merging) according to the embodiments of the present invention.

FIG. 27 is a flow chart showing texture depth regeneration processes (decomposition, translation & rotation, hole filling, merging) according to the embodiments of the present invention;

The flow chart of the texture depth regeneration process, especially for the decomposition, translation & rotation, hole filling, merging are described in FIG. 27.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

In other words, foreground/background decomposition may output pictures according to a depth level by performing decomposition for the selected source views and/or depth picture. The composition may be performed based on the number of decomposition levels. The decomposition may extract foreground or background of the selected source views in accordance with the decomposition level.

Occlusion detection may detect occlusion from the background. Portions of backgrounds covered from pictures or components (for example, foregrounds) having different depth levels may be detected. The occlusion detection may generate a background of a view, which will be regenerated, based on the detected portions of the covered backgrounds. The occlusion detection may be performed based on inter-view disparity information and viewing position and/or viewing direction of the viewer.

Foreground translation and rotation/weighted average may perform translation and rotation for each of foregrounds. View regeneration according to the embodiments of the present invention may modify extracted foregrounds. The foreground translation and rotation according to the embodiments of the present invention may be performed based on global_offset_y_axis and global_offset_z_axis.

Merging may generate a regenerated view by merging the background for which occlusion detection is performed with the foreground for which foreground translation and rotation/weighted average is performed.

Hereinafter, one embodiment of view regeneration according to the embodiments of the present invention will be described. Pictures unpacked by an unpacking operation according to the embodiments of the present invention may include reference views (2701a, 2701b). An example of the reference views within the unpacked pictures may include a first picture 2701a (or first reference view) and a second picture 2701b (or second reference view). View regeneration according to the embodiments of the present invention may perform decomposition 2702 for each of the first picture and the second picture. At this time, view regeneration according to the embodiments of the present invention may perform decomposition 2702 for the first picture and the second picture based on information for a decomposition level of each picture. The information for a decomposition level may be one of reconstruction parameters.

View regeneration according to the embodiments of the present invention may generate a third picture 2706 for a target viewing position based on the first picture for which decomposition is performed and the second picture for which decomposition is performed. If decomposition is performed for each of the first picture and the second picture (2702), a foreground 2702a of the first picture and a foreground 2702c of the second picture may be extracted. View generation according to the embodiments of the present invention may generate a foreground 2703a for generating the third picture by performing foreground translation and rotation 2703 for the foreground 2702a of the first picture and the foreground 2702c of the second picture based on offset information. Also, if decomposition is performed for each of the first picture and the second picture, the background 2702b of the first picture and the background 2702d of the second picture may be extracted. View generation according to the embodiments of the present invention may detect occlusion by performing occlusion detection 2704 for the background 2702b of the first picture and the background 2702d of the second picture based on the offset information, thereby generating a background 2704a for generating the third picture.

At this time, the occlusion is a region covered by foregrounds (objects or components), and may mean a region of background, which cannot be estimated from the foregrounds and backgrounds included in the reference views. For example, a first portion 2704b-2 covered by the foreground 2702a for the first picture may exist in the background 2702b for the first picture, and a second portion 2704b-4 covered by the foreground 2702c for the second picture may exist in the background 2702d for the second picture. At this time, the covered first portion 2704b-2 may be estimated by a region 2704b-3 corresponding to the first portion in the background 2702d for the second picture. Likewise, the covered second portion 2704b-4 may be estimated by a region 2704b-1 corresponding to the first portion in the background 2704b for the first picture. However, the region 2704b, which cannot be estimated even based on the background 2702b for the first picture and the background 2702d for the second picture, may exist. This region may be called occlusion. That is, the background for generating the third picture may be generated by estimation of the occlusion.

View regeneration according to the embodiments of the present invention may perform a hole filling operation for each of the foreground for generating the third picture and the background for generating the third picture. View regeneration according to the embodiments of the present invention may generate the third picture by merging the foreground for generating the third picture with the background for generating the third picture. View regeneration according to the embodiments of the present invention may perform the aforementioned crack removal and/or occlusion enhancement after merging is performed.

The offset information may mean the aforementioned inter-view disparity information.

Receivers could generate a video with head motion parallax and/or binocular disparity, or different viewpoints, which receivers could generate interactive video with changing locations. Therefore, by saving bandwidth to deliver the 3DoF+ video or the storage space, high quality of 3DoF+ video which could provide head motion parallax could be achieved. Due to this configuration, receiver can provide different viewing experience with viewer's action in the VR environment.

Figure 28:
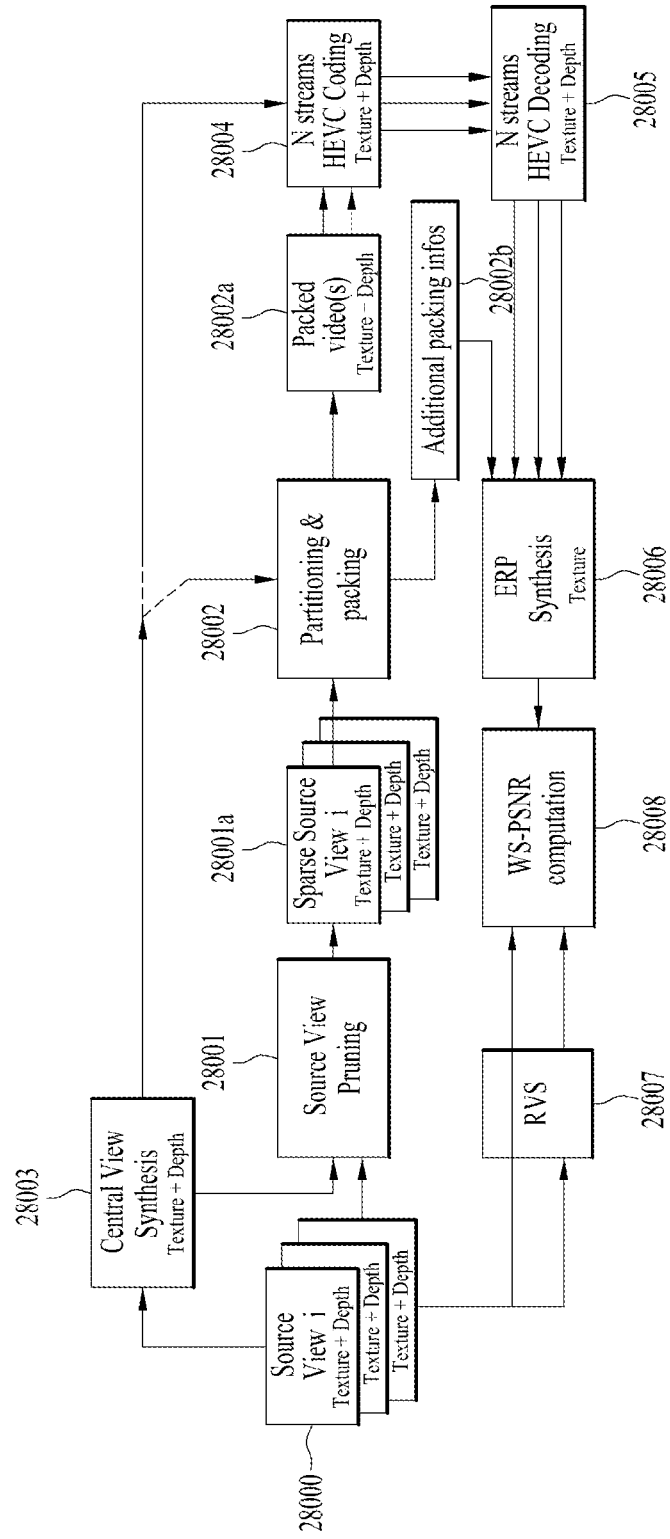
FIG. 28 is a block diagram showing 3DoF+ SW platform according to the embodiments of the present invention.

FIG. 28 is a block diagram showing 3DoF+ SW platform according to the embodiments of the present invention;

This drawing illustrates one embodiment of a platform implemented hardware combined with software or software, which can implement 3DoF+ system according to the embodiments of the present invention.

Central View Synthesis Module

This module will generate a plain and full ERP (texture+depth) view in charge of conveying most of the visual information. The parameters of this module will be at minimum:

Resolution of the Related Stream
Exact Position of the Central View
Source View Pruning Module This module will make use of the depth buffer output by the Central View Synthesis module, and discard any pixel already projected. The parameters of this module will be at minimum:

Resolution of the Related Stream
QP for the Texture and QP for the Depth
Partitioning & Packing Module When Activated, this Module Browses the Totality of the Sparse Source Views, and Implements the Following partitions each sparse source views
discards empty partitions
packs them in a patch atlas on one or more streams
generates additional information accordingly
View Synthesis Module This module generates the final viewport just as RVS does, but accepts as input a heterogeneous set of texture+depth videos complemented with the previously generated additional information. It then synthetizes the view in ERP or perspective mode.

In other words, source view i 28000 means i number of source views, and may be input images for the ith position. Each source view may include a texture picture and/or depth picture corresponding thereto.

A Source View Pruning module 28001 may perform the aforementioned inter-view redundancy removal operation according to the embodiments of the present invention based on at least one source view 28000 and a synthesized sensor view 28003. A spare source view i 28001a may mean a source view for which redundancy removal from the source view pruning module is performed.

A Partitioning & Packing module 28002 may perform packing according to the embodiments of the present invention for at least one sparse source view 28001a and/or a synthesized center view 28003. Packed pictures may mean pictures packed by the partitioning & packing module (28002a). The packed pictures may include a texture picture for which packing is performed and/or a depth picture for which packing is performed. Additional packing information may mean signaling information generated from the partitioning & packing module. The signaling information may be included as some or all of the aforementioned reconstruction parameters, the view synthesis parameters and the packing metadata.

A Central View Synthesis module 28003 or a center view synthesis module may perform center view regeneration or intermediate view synthesis. Intermediate view synthesis may mean the intermediate view generation or view synthesis operation described in FIG. 26. That is, the center view may be generated using at least one source view 28000. The center view may include a texture picture and/or depth picture corresponding thereto.

N streams HEVC Coding/Decoding modules 28004 and 28005 may encode the synthesized center view 28003 and/or the packed pictures, and may decode the encoded pictures.

The center view may include a texture picture and/or depth picture corresponding thereto.

An ERP Synthesis module 28006 may perform view synthesis according to the embodiments of the present invention for the decoded texture pictures, or may perform view regeneration and view synthesis. ERP synthesis may be performed based on the additional packing information.

RVS means a reference view synthesizer 28007. The RVS may synthesize views by using at least one source view. The RVS may perform a view synthesis operation according to the embodiments of the present invention.

WS-PSNR computation module 28008 may be a module for numerical comparison.

The WS-PSNR computation module may mean a processor for performing numerical computation by using the views synthesized by at least one source view, the views synthesized by the RVS and/or the views synthesized from the ERP synthesis module.

FIG. 29 is a view showing Texture depth regeneration information SEI message syntax according to the embodiments of the present invention;

The texture depth regeneration information SEI message provides information to enable regeneration of the texture and depth pictures for a viewing positions derived from pictures from other viewing positions and partial region or information from the viewing position.

That is, the texture depth regeneration information SEI message describes signaling information related to the view regeneration operation according to the embodiments of the present invention. The texture depth regeneration information SEI message may be included as some or all of the aforementioned reconstruction parameters, the view synthesis parameters and the packing metadata. That is, FIG. 29 shows one embodiment of a method for signaling the aforementioned reconstruction parameters, the aforementioned view synthesis parameters and the aforementioned packing metadata.

Following is focused on a format of SEI message syntax elements and semantics for MPEG video codec. However, other formats of video level, e.g., parameters sets, and/or future or current video codecs, system level, e.g., file format, DASH, MMT, and 3GPP, or digital interfaces, e.g., HDMI, DisplayPort, and VESA, could be possible with the same features described below.

texture_depth_regeneration_info_id contains an identifying number that may be used to identify the purpose of view regeneration. The value of texture_depth_regeneration_info_id may be used to indicate the different use cases of this SEI message, to support different receiver capabilities, etc.

When more than one view regeneration information SEI message is present with the same value of view_regeneration_info_id, the content of these view regeneration information SEI messages shall be the same. When view regeneration information SEI messages are present that have more than one value of view_regeneration_info_id, this may indicate that the information indicated by the different values of view_regeneration_info_id are alternatives that are provided for different purposes, for different component (such as texture, depth, etc.) or that a cascading of correction. The value of view_regeneration_info_id shall be in the range of 0 to $2^{12}-1$, inclusive.

texture_depth_regeneration_info_cancel_flag equal to 1 indicates that the texture depth regeneration information SEI message cancels the persistence of any previous texture depth regeneration information SEI message in output order that applies to the current layer. texture_depth_regeneration_info_cancel_flag equal to 0 indicates that texture depth regeneration information follows.

texture_depth_regeneration_info_persistence_flag specifies the persistence of the texture depth regeneration information SEI message for the current layer.

texture_depth_view_regeneration_info_persistence_flag equal to 0 specifies that the texture depth regeneration information applies to the current decoded picture only.

Let picA be the current picture. texture_depth_regeneration_info_persistence_flag to 1 specifies that the texture depth regeneration information SEI message persists for the current layer in output order until any of the following conditions are true:

A new CLVS of the current layer begins.
The bitstream ends.
A picture picB in the current layer in an access unit containing a texture depth regeneration information SEI message that is applicable to the current layer is output for which PicOrderCnt(picB) is greater than PicOrderCnt (picA), where PicOrderCnt(picB) and PicOrderCnt(picA) are the PicOrderCntVal values of picB and picA, respectively, immediately after the invocation of the decoding process for the picture order count of picB.

num_texture_depth_regeneration_minus1 plus 1 specifies the number of pictures which are to be regenerated by the SEI message.

regenerated_view_id specifies the i-th identifying number of the viewing position or head position of the regeneration process. This value should be one of the pre-defined identifying number of a viewing positions of a 3DoF+ video specified in the same or in the other SEI message, such as mrwp_view_id specified in the multiview region-wise packing SEI message.

view_location_x[i], view_location_y[i] and view_location_z[i] indicate the location of a viewing position in the units of $2^{-16}$ millimeters, respectively. The range of view_location_x[i], view_location_y[i] and view_location_z[i] shall be in the range of $-32\,768*2^{16}-1$ (i.e., $-2\,147\,483\,647$) to $32\,768*2^{16}$ (i.e., $2\,147\,483\,648$), inclusive.

view_rotation_yaw[i], view_rotation_pitch[i], and view_rotation_roll[i] indicate the yaw, pitch, and roll rotation angles, respectively, that is applied to the unit sphere of a viewing posotion head position related to view_location_x[i], view_location_y[i] and view_location_z[i] to convert the local coordinate axes to the global coordinate axes, in units of $2^{-16}$ degrees. The value of view_rotation_yaw[i] shall be in the range of $-180*2^{16}$ (i.e., $-11\,796\,480$) to $180*2^{16}-1$ (i.e., $11\,796\,479$), inclusive, the value of view_rotation_pitch[i] shall be in the range of $-90*2^{16}$ (i.e., $-5\,898\,240$) to $90*2^{16}$ (i.e., $5\,898\,240$), inclusive, and the value of view_rotation_roll[i] shall be in the range of $-180*2^{16}$ (i.e., $-11\,796\,480$) to $180*2^{16}-1$ (i.e., $11\,796\,479$), inclusive. view_rotation_yaw[i], view_rotation_pitch[i], and view_rotation_roll[i] could be used to indicate azimuth, elevation, and tilt, respectively.

num_components[i] specifies the number of the components that are related to the i-th view.

regenerated_component_id[i][j] specifies the identifying number of the j-th component of the i-th viewing position or head position of the regeneration process. This value should be one of the pre-defined identifying number of a component that belongs to a viewing positions of a 3DoF+ video specified in the same or in the other SEI message, such as mrwp_component_id specified in the multiview region-wise packing SEI message.

picture_width[i][j] and picture_height[i][j] specify the width and height, respectively, of the picture that is to be regenerated that is corresponding to the j-th component of the i-th viewing position or head position, in relative projected picture sample units. The values of picture_width and picture_height shall both be greater than 0.

projection_type[i][j] specifies the type of the projection used in generating the projected picture from a 360 sphere.

projection_type[i][j] equal to 0 indicates the type of the projection is unspecified.

projection_type[i][j] equal to 1 indicates the equirectangular projection.

projection_type[i][j] equal to 2 indicates the cube map projection.

projection_type[i][j] from 3 to 15, inclusive, are reserved for future use.

component_type[i][j] specifies the type of the i-th component.

component_type[i][j] equal to 0 indicates the type of the component is unspecified.

component_type[i][j] equal to 1 indicates the component is a video or texture component component_type[i][j] equal to 2 indicates the component is a depth map.

component_type[i][j] equal to 3 indicates the component is an alpha channel. When the value of a pixel equals to 1, the value in a texture picture at the corresponding pixel location is not transparent. When the value of a pixel equals to 0, the value in a texture picture at the corresponding pixel location is transparent.

component_type[i][j] equal to 4 indicates the component is an indication map for usability indication. When the value of a pixel equals to 1, the value in a texture or depth picture at the corresponding pixel location is used for occlusion enhancement process. When the value of a pixel equals to 1, the value in a texture or depth picture at the corresponding pixel location is not used for occlusion enhancement process.

component_type[i][j] equal to 5 indicates the component is a overlay.

component_type[i][j] from 6 to 15, inclusive, are reserved for future use.

depth_near[i] and depth_far[i] specifies the minimum and maximum distances from the image plane to objects of the i-th component, in units of $2^{-16}$ degrees, respectively.

texture_depth_regeneration_info_flag[i] equal to 1 indicate that the information for texture depth regeneration process of the i-th component. texture_depth_regeneration_flag[i] equal to 0 indicate that the information for texture depth regeneration process of the i-th picture is not provided.

reserved_zero_7bits[i] shall be equal to 0 and other values for reserved_zero_7bits[i] are reserved for future use. Decoders shall ignore the value of reserved_zero_7bits[i].

merging_flag[i] equal to 1 indicate the information for the merging module in the texture depth generation process of the i-th component is present in this SEI message. merging_flag[i] equal to 0 indicate the information for the merging module in the texture depth generation process of the i-th component is not present in this SEI message.

hole_filling_flag[i] equal to 1 indicate the information for the hole filling module in the texture depth generation process of the i-th component is present in this SEI message. merging_flag[i] equal to 0 indicate the information for the hole filling module in the texture depth generation process of the i-th component is not present in this SEI message.

In other words, view regeneration (or texture depth regeneration) according to the embodiments of the present invention may perform the foreground composition or background composition according to the embodiments of the present invention based on the hole_filling_flag parameter.

crack_removal_flag[i] equal to 1 indicate the information for the crack removal module in the texture depth generation process of the i-th component is present in this SEI message. crack_removal_flag[i] equal to 0 indicate the information for the crack removal module in the texture depth generation process of the i-th component is not present in this SEI message.

In other words, view regeneration (or texture depth regeneration) according to the embodiments of the present invention may perform the crack removal according to the embodiments of the present invention based on the crack_removal_flag parameter.

occlusion_enh_flag[i] equal to 1 indicate the information for the occlusion enhancement module in the texture depth generation process of the i-th component is present in this SEI message. occlusion_enh_flag[i] equal to 0 indicate the information for the occlusion enhancement module in the texture depth generation process of the i-th component is not present in this SEI message.

In other words, view regeneration (or texture depth regeneration) according to the embodiments of the present invention may perform the occlusion enhancement according to the embodiments of the present invention based on the occlusion_enh_flag parameter.

reserved_zero_4bits[i] shall be equal to 0 and other values for reserved_zero_4bits[i] are reserved for future use. Decoders shall ignore the value of reserved_zero_4bits[i].

num_ref_views_minus1[i] plus 1 specifies the number of reference views that are used for texture depth regeneration process.

ref_view_id[i][j] specifies the identifying number of the viewing position of the j-th reference picture that is used to estimate (to regenerate, to reconstruct, or to predict) the i-th component. This value should be one of the pre-defined identifying number of a viewing positions of a 3DoF+ video specified in the same or in the other SEI message, such as mrwp_view_id specified in the multiview region-wise packing SEI message.

ref_component_id[i][j] specifies the identifying number of the j-th component of a reference viewing position or head position that is used to estimate (to regenerate, to reconstruct, or to predict) the i-th component. This value should be one of the predefined identifying number of a component that belongs to a viewing positions of a 3DoF+ video specified in the same or in the other SEI message, such as mrwp_component_id specified in the multiview region-wise packing SEI message.

hor_min_fov[i][j], hor_max_fov[i][j], ver_min_fov[i][j], and ver_max_fov[i][j] specifies the minimum and maximum ranges of the horizontal and vertical FoV of the j-th component of a reference viewing position or head position that is used to estimate (to regenerate, to reconstruct, or to predict) the i-th component, respectively, in the units of $2^{-16}$ degrees.

global_offset_x_axis[i][j], global_offset_y_axis[i][j], and global_offset_z_axis[i][j] specify the offset between the location of the j-th component of a reference view from the i-th component of a view to be regenerated, in the direction of the x, y, z-axis, in the units of $2^{-16}$ meters.

At this time, global_offset_x_axis[i][j], global_offset_y_axis[i][j], and global_offset_z_axis[i][j] may mean inter-view disparity information. global_offset_x_axis[i][j], global_offset_y_axis[i][j], and global_offset_z_axis[i][j] may mean offset for a difference in position between the ith position (position of a view to be restored) and the jth position (position of a current component). The above three parameters are values for X-axis, Y-axis and Z-axis, respectively, mean a position difference on a 3D space, and may be used to infer a position difference on a 2D plane in accordance with a depth of foreground/background. That is, the three parameters may indicate a difference between a position of the ith component of a view to be regenerated and a position on x-axis, y-axis and Z-axis of the jth component of a reference view. Therefore, the three parameters may be used to infer a position difference on a 2D plane in accordance with a depth level of foreground and background.

num_depth_levels_minus1[i][j] plus 1 specifies the number of depth levels in the j-th component of the reference view for the regeneration of the i-th view.

At this time, num_depth_levels_minus1[i][j] may indicate the aforementioned level, and may mean information on the decomposition level.

num_angular_levels_minus1[i][j][k] plus 1 specifies the number of anglular levels to provide angular of the k-th depth level of the j-th component of the reference view for the regeneration of the i-th view.

weight_depth_level[i][j][k][l] specifies the weight factor of the l-th algular region of k-th depth level of a reference picture that is used to estimate (to regenerate, to reconstruct, or to predict) the j-th reference view for the i-th component. When the value of num_depth_levels_minus1[i][j] and num_angular_levels_minus1[i][j][k] are greater than zero, the pixel values of the target region is calculated by the weighted mean of the pixel values in the corresponding pixel location in the regions of the reference pictures, where the weighting value for the k-th reference picture is given by weight_depth_level [i][j][k]. When the values of num_depth_levels_minus1[i][j] and num_angular_levels_minus1[i][j][k] are equal to zero, the weight is assumed to be equal to one.

hole_filling_process_type[i] specifies the type of hole filling filter used for the texture depth regeneration process.

num_coeffs_minus1[i] specifies the number of coefficients of the hole filling process.

hole_filling_coeff[i][j] specifies the value of the filter coefficient in the units of $2^{-16}$. The value of hole_filling_coeff[i][j] shall be in the range of $-32768*2^{16}-1$ (i.e., −2147483647) to $32768*2^{16}$ (i.e., 2147483648), inclusive.

crack_removal_process_type[i] specifies the type of crack removal process used for the texture depth regeneration process.

num_coeffs_minus1[i] specifies the number of coefficients of the crack removal process.

crack_removal_process_coeff[i][j] specifies the value of the filter coefficient in the units of $2^{16}$. The value of crack_removal_process_coeff[i][j] shall be in the range of $-32768*2^{16}-1$ (i.e., −2147483647) to $32768*2^{16}$ (i.e., 2147483648), inclusive.

num_patched_blocks[i] specifies the number of patches which are to be used for the view regeneration of the i-th component.

regenerated_picture_top_left_index_x[i][j], regenerated_picture_top_left_index_y[i][j], regenerated_picture_bottom_right_index_x[i][j], and regenerated_picture_bottom_right_index_y[i][j] specifies the (x, y) pixel location of the top-left and bottom-right corner of the j-th block of the i-th component of regenerated picture, in the units of luma samples. The values of regenerated_picture_top_left_index_x[i][j], regenerated_picture_top_left_index_y[i][j], regenerated_picture_bottom_right_index_x[i][j], and regenerated_picture_bottom_right_index_y[i][j] shall be in the range of 0 to 65 535, inclusive.

patch_view_id specifies the i-th identifying number of the viewing position or head position of the regeneration process. This value should be one of the pre-defined identifying number of a viewing positions of a 3DoF+ video specified in the same or in the other SEI message, such as mrwp_view_id specified in the multiview region-wise packing SEI message.

patch_component_id specifies the i-th identifying number of a component of a viewing position or head position of the regeneration process. This value should be one of the pre-defined identifying number of a component that belongs to a viewing positions of a 3DoF+ video specified in the same or in the other SEI message, such as mrwp_component_id specified in the multiview region-wise packing SEI message.

patch_top_left_index_x[i][j], patch_top_left_index_y[i][j], patch_bottom_right_index_x[i][j], and patch_bottom_right_index_y[i][j] specifies the (x, y) pixel location of the top-left and bottom-right corner of the j-th patch block for the i-th component, in the units of luma samples. The values of patch_top_left_index_x[i][j], patch_top_left_index_y[i][j], patch_bottom_right_index_x[i][j], and patch_bottom_right_index_y[i][j] shall be in the range of 0 to 65 535, inclusive.

In the usage of the view regeneration information SEI message, the bit efficiency of the encoded 3DoF+ video is anticipated to be increased since the redundancy between multiple pictures are removed by using the spatial relationship of adjacent viewing position. By saving bandwidth to deliver the 3DoF+ video or the storage space, high quality of 3DoF+ video which could provide head motion parallax could be achieved. Also, due to this configuration, receiver can provide different viewing experience with viewer's action in the VR environment.

FIGS. 30 and 31 are views showing Multiview Packing and Texture Depth Regeneration information SEI message syntax according to the embodiments of the present invention.

In this embodiment, another example of defining texture depth regeneration information with the multi-view packing information. In some use cases, both view regeneration information and texture depth regeneration information could be used for different components: for example, the former for the depth regeneration and the latter for the texture regeneration, or vice versa.

The multiview packing and view regeneration SEI message provides information to enable remapping of the colour samples of a region in the cropped decoded pictures onto projected pictures for different viewing positions as well as information on the location and size of the guard bands, if any. In addition, this SEI message provides information to enable regeneration of the pictures for a viewing positions derived from pictures from other viewing positions and partial region or information from the viewing position.

Following is focused on a format of SEI message syntax elements and semantics for MPEG video codec. However, other formats of video level, e.g., parameters sets, and/or future or current video codecs, system level, e.g., file format, DASH, MMT, and 3GPP, or digital interfaces, e.g., HDMI, DisplayPort, and VESA, could be possible with the same features described below.

texture_depth_regeneration_flag[i] equal to 1 indicate that the i-th picture is not a full picture so texture depth regeneration process is needed in the decoder post-process to show or use the viewing position. Texture_depth_regeneration_flag[i] equal to 0 indicate that the i-th picture is a full picture so the view regeneration process could be skipped in the decoder post-process.

The other semantics follows the definitions of multiview region-wise packing SEI message and texture depth regeneration information SEI message semantics.

In other words, Multiview Packing and Texture Depth Regeneration information SEI message syntax may be included as some or all of the aforementioned reconstruction parameters, the aforementioned view synthesis parameters and the aforementioned packing metadata. Also, each of the aforementioned parameters may correspond to one or more of the aforementioned packing metadata, the aforementioned reconstruction parameters and the aforementioned view synthesis parameters. For example, one of the aforementioned parameters may not be limited to one of the packing metadata, the reconstruction parameters and the view synthesis parameters, and may involve in one or more of unpacking, view regeneration and view synthesis according to the embodiments of the present invention.

In the usage of the view regeneration information SEI message, the bit efficiency of the encoded 3DoF+ video is anticipated to be increased since the redundancy between multiple pictures are removed by using the spatial relationship of adjacent viewing position. By saving bandwidth to deliver the 3DoF+ video or the storage space, high quality of 3DoF+ video which could provide head motion parallax could be achieved. Also, due to this configuration, receiver can provide different viewing experience with viewer's action in the VR environment.

FIG. 32 is a flow chart showing a method for receiving bitstreams according to the embodiments of the present invention.

The method for receiving bitstreams according to the embodiments of the present invention may decode the bitstreams (S3200). Decoding according to the embodiments of the present invention may be performed based on viewing position information and/or viewport information. Decoding according to the embodiments of the present invention may output at least one picture by decoding the bitstreams. Decoding according to the embodiments of the present invention may output one or more of the packing metadata, the reconstruction parameters and the view synthesis parameters. Decoding according to the embodiments of the present invention may be performed by the decoder. The decoder according to the embodiments of the present invention may perform the decoding operation according to the aforementioned embodiments of the present invention.

The method for receiving bitstreams according to the embodiments of the present invention may unpack pictures within the decoded bitstreams (S3201). Unpacking according to the embodiments of the present invention may be performed based on the packing metadata. At this time, the unpacked pictures may include one or more of a texture picture, a depth picture, a texture patch and a texture residual. Unpacking according to the embodiments of the present invention may mean unpacking of post-processing or unpacking of post-decoding according to the embodiments of the present invention. Unpacking according to the embodiments of the present invention may be performed by an unpacker or an unpacking module. The unpacker according to the embodiments of the present invention may perform the unpacking operation according to the aforementioned embodiments of the present invention.

The method for receiving bitstreams according to the embodiments of the present invention may perform view regeneration (S3202) based on the unpacked pictures. View regeneration according to the embodiments of the present invention may mean view regeneration of post-processing or post-decoding according to the aforementioned embodiments of the present invention, or may mean texture depth regeneration.

The method for receiving bitstreams according to the embodiments of the present invention may perform view synthesis (S3203) for the pictures for which view regeneration according to the embodiments of the present invention is performed. View synthesis according to the embodiments of the present invention may be performed based on the view synthesis parameters.

FIG. 33 is a flow chart showing a method for transmitting pictures according to the embodiments of the present invention.

The method for transmitting pictures according to the embodiments of the present invention may perform inter-view redundancy removal S3300 according to the embodiments of the present invention for pictures for multiple viewing positions. At this time, the aforementioned reconstruction parameters may be generated. Also, the pictures may mean one of at least one texture picture, depth picture, texture patch and texture residual.

The method for transmitting pictures according to the embodiments of the present invention may perform packing S3301 according to the embodiments of the present invention for the pictures for which inter-view redundancy removal is performed. At this time, the aforementioned packing parameters may be generated. Also, inter-view redundancy removal S3300 and/or packing S3301 according to the embodiments of the present invention may mean the aforementioned pre-encoding, pre-processing, or encoder pre-processing.

The method for transmitting pictures according to the embodiments of the present invention may perform encoding S3302 for the packed pictures. Encoding according to the embodiments of the present invention may encode the packed pictures and/or metadata. Encoding according to the embodiments of the present invention may encode the packed pictures and/or the metadata. Encoding may be performed by a single layer video encoder or its corresponding device such as HEVC or future video codec.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

The apparatus for transmitting a video, the apparatus for receiving a video according to embodiments of the present invention and/or internal modules/blocks thereof may perform the above-described embodiments.

A description will be given of the apparatus and/or the method according to embodiments of the present invention The internal blocks/modules, etc. of the apparatus and/or the method described above may correspond to processors that execute continuous operations stored in a memory, or hardware elements positioned inside/outside the apparatuses according to a given embodiment, or software elements.

The above-described modules may be omitted according to a given embodiment or replaced by other modules that perform similar/the same operations.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description can be configured in a manner of being selectively combined with one another entirely or in part to enable various modifications.

In addition, a method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

MODE FOR THE INVENTION

Various embodiments have been described in the best mode for carrying out the invention.

INDUSTRIAL APPLICABILITY

The present invention is applicable to VR related fields.

The invention claimed is:

1. A method of receiving a video, the method comprising:
decoding (i) the video and (ii) signaling information;
unpacking the video based on the signaling information,
wherein the signaling information includes patch information representing position information for a patch,
wherein the signaling information further includes depth information representing a range of depth for the patch,
wherein the signaling information further includes size information for the patch, and wherein the signaling information further includes packing information;
based on the signaling information, view regenerating the unpacked video from which inter-view redundancy is removed; and
view synthesizing the view regenerated video.

2. The method of claim 1
wherein the unpacked video includes at least one of a texture picture, a depth picture, a texture patch, or a texture residual, and
wherein the synthesized video includes a picture of target viewing position.

3. The method of claim 2, wherein view regenerating the unpacked video includes:
performing translation and rotation on foreground of the unpacked video based on the signaling information including disparity information, viewing position, and viewing direction.

4. The method of claim 2, wherein view regenerating the unpacked video includes:
performing occlusion detection on background of the unpacked video based on the signaling information including viewing position and viewing direction.

5. The method of claim 2, wherein view regenerating the unpacked video includes:
merging foreground and background of the unpacked video;
crack removing the merged video; and
occlusion enhancing the merged video based on patch residual in the unpacked video.

6. The method of claim 1,
wherein reference views in the unpacked video include a first picture and a second picture,
wherein the first picture and the second picture are decomposed based on the signaling information including information for decomposition, so that a third picture for target viewing position is regenerated based on the decomposed first picture, the decomposed second picture, and the signaling information including offset information.

7. An apparatus configured to receive a video, the apparatus comprising:
a decoder configured to decode (i) the video and (ii) signaling information; and
an unpacker configured to unpack the video based on the signaling information,
wherein the video is reconstructed based on the signaling information,
wherein the signaling information includes patch information representing position information for a patch,
wherein the signaling information further includes depth information representing a range of depth for the patch,
wherein the signaling information further includes size information for the patch, and
wherein the signaling information further includes packing information,
a view regenerator configured to, based on the signaling information, regenerate the unpacked video from which inter-view redundancy is removed; and
a view synthesizer configured to view synthesize the view regenerated video.

8. The apparatus of claim 7,
wherein the unpacked video includes at least one of a texture picture, a depth picture, a texture patch, or a texture residual, and
wherein the synthesized video includes a picture of target viewing position.

9. The apparatus of claim 8, wherein the view regenerator performs:
translating and rotating foreground of the unpacked video based on the signaling information including disparity information, viewing position, and viewing direction.

10. The apparatus of claim 8, wherein the view regenerator performs:
occlusion detecting background of the unpacked video based on the signaling information including viewing position and viewing direction.

11. The apparatus of claim 8, wherein the view regenerator performs:
merging foreground and background of the unpacked video;
crack removing the merged video; and
occlusion enhancing the merged video based on patch residual in the unpacked video.

12. The apparatus of claim 7,
wherein reference views in the unpacked video include a first picture and a second picture,
wherein the first picture and the second picture are decomposed based on the signaling information including information for decomposition level, so that a third picture for target viewing position is regenerated based on the decomposed first picture, the decomposed second picture and the signaling information including offset information.

13. A method of transmitting a video, the method comprising:
removing inter-view redundancy for the video,
packing the video and generating signaling information for the video; and
encoding the packed video,
wherein the signaling information includes patch information representing position information for a patch,
wherein the signaling information further includes depth information representing a range of depth for the patch,
wherein the signaling information further includes size information for the patch, and
wherein the signaling information further includes packing information.

14. The method of claim 13, the method comprising:
wherein the packing information is generated by the packing the video, and
wherein the pictures include at least one of a texture picture, a depth picture, a texture patch, or a texture residual.

15. The method of claim 13, wherein the signaling information includes,
offset information representing an offset between location of a component of a reference view and location of a component of a view to be regenerated, and
information for decomposition level.

16. The method of claim 13, wherein the signaling information includes,
information for hole filling, information for crack removal and information for occlusion enhancement.

17. An apparatus configured to transmit a video, the apparatus comprising:
a remover configured to remove inter-view redundancy of pictures for the video;
a packer configured to pack the video and generate signaling information; and
an encoder configured to encode the packed video,
wherein the signaling information includes patch information representing position information for a patch, wherein the signaling information further includes depth information representing a range of depth for the patch, wherein the signaling information further includes size information for the patch, and wherein the signaling information further includes packing information.

18. The apparatus of claim 17, wherein the packing information is generated by the packer, and wherein the pictures include at least one of a texture picture, a depth picture, a texture patch, or a texture residual.

19. The apparatus of claim 17, wherein the signaling information includes, offset information representing an offset between location of a component of a reference view and location of a component of a view to be regenerated, and information for decomposition level.

20. The apparatus of claim 17, wherein the signaling information includes, information for hole filling, information for crack removal and information for occlusion enhancement.

* * * * *